United States Patent
Miyajima

(10) Patent No.: US 7,382,549 B2
(45) Date of Patent: Jun. 3, 2008

(54) ZOOM LENS AND IMAGING SYSTEM INCORPORATING IT

(75) Inventor: Toru Miyajima, Hachioji (JP)

(73) Assignee: Olympus Corporation, Tokyo (JP)

( * ) Notice: Subject to any disclaimer, the term of this patent is extended or adjusted under 35 U.S.C. 154(b) by 50 days.

(21) Appl. No.: 11/268,746

(22) Filed: Nov. 8, 2005

(65) Prior Publication Data

US 2006/0098301 A1    May 11, 2006

(30) Foreign Application Priority Data

Nov. 9, 2004 (JP) .............................. 2004-324593
Dec. 13, 2004 (JP) .............................. 2004-359492

(51) Int. Cl.
*G02B 15/14* (2006.01)
(52) U.S. Cl. ...................... 359/686; 359/687
(58) Field of Classification Search ................ 359/686, 359/687
See application file for complete search history.

(56) References Cited

U.S. PATENT DOCUMENTS

| | | | | |
|---|---|---|---|---|
| 5,572,277 | A | * | 11/1996 | Uzawa et al. ............... 359/686 |
| 6,483,648 | B1 | * | 11/2002 | Yamanashi ................. 359/683 |
| 2003/0227691 | A1 | | 12/2003 | Saruwatari |

FOREIGN PATENT DOCUMENTS

| JP | 07-005361 | 1/1995 |
|---|---|---|
| JP | 3008380 | 12/1999 |
| JP | 2004-012639 | 1/2004 |

* cited by examiner

*Primary Examiner*—William C Choi
(74) *Attorney, Agent, or Firm*—Kenyon & Kenyon LLP

(57) ABSTRACT

The invention relates to a high-performance, high-zoom-ratio zoom lens that is reduced in length upon received at a collapsible lens mount. The zoom lens is a four-group zoom lens comprising a first lens group G1 of positive refracting power, a second lens group G2 of negative refracting power, a third lens group G3 of positive refracting power and a fourth lens group G4. For zooming from the wide-angle end to the telephoto end, the $1^{st}$ G1 to the $4^{th}$ lens group G4 are each operable to move with a change in the space between adjacent lens groups. The second lens group G3 comprises three lenses, and an aperture stop S located between the second lens group G2 and the third lens group G3, wherein the aperture stop is positioned nearer to the image side at the wide-angle end than at the telephoto end. The zoom lens satisfies conditions (1) and (2).

$$7<(\beta_{2t}\cdot\beta_{3t}\cdot\beta_{4w})/(\beta_{2w}\cdot\beta_{3w}\cdot\beta_{4t})<15 \quad (1)$$

$$7<(\beta_{2t}\cdot\beta_{3t})/(\beta_{2w}\cdot\beta_{3w})<15 \quad (2)$$

Here, $\beta_{nt}$ is the magnification of an n-th lens group at the telephoto end, and $\beta_{nw}$ is the magnification of the n-th lens group at the wide-angle end.

27 Claims, 26 Drawing Sheets

ZOOM LENS AND IMAGING SYSTEM INCORPORATING IT

This application claims benefits of Japanese Application No. 2004-324593 filed in Japan on Nov. 9, 2004 and No. 2004-359492 filed in Japan Dec. 13, 2004, the contents of which are herein incorporated by this reference.

BACKGROUND OF THE INVENTION

The present invention relates generally to a zoom lens and an imaging system incorporating it, and more particularly to a high-zoom-ratio zoom lens lending itself to an electronic image pickup device such as a CCD or C-MOS and an imaging system incorporating it.

Zoom lens systems having a high zoom ratio, good image-formation capability and a short total length, which comprise, in order from the object side, a positive first lens group, a negative second lens group, a positive third lens group and a fourth lens group wherein all the lens groups are operable to move for zooming, are set forth typically in patent publications 1, 2 and 3.

Patent Publication 1
U.S. Pat. No. 3,008,380
Patent Publication 2
JP(A)7-5361
Patent Publication 3
JP(A)2004-12639

SUMMARY OF THE INVENTION

Such being the prior art, the primary object of the invention is to provide a high-zoom-ratio zoom lens that is reduced in length upon received at a collapsible lens mount and has improved performance, and an imaging system that incorporates it.

The zoom lens of the invention, with which the above object is accomplished, generally comes under two aspects, the first of which involves seven zoom lenses, described just below.

(1) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said zoom lens further comprises an aperture stop between said second lens group and said third lens group, wherein said aperture stop is positioned nearer to an image side of the zoom lens at the wide-angle end than at the telephoto end, and said zoom lens satisfies the following conditions:

$$7<(\beta_{2t}\cdot\beta_{3t}\cdot\beta_{4w})/(\beta_{2w}\cdot\beta_{3w}\cdot\beta_{4t})<15 \quad (1)$$

$$7<(\beta_{2t}\cdot\beta_{3t})/(\beta_{2w}\cdot\beta_{3w})<15 \quad (2)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

(2) A four-group zoom lens comprising, in order from its object side, a first lens group of positive refracting power, a second lens group of negative refracting power, a third lens group of positive refracting power and a fourth lens group, characterized in that:

for zooming from a wide-angle end to a telephoto end of the zoom lens, said first lens group, said second lens group, said third lens group and said fourth lens group are each operable to move with a varying space between adjacent lens groups, said first lens group comprises two lenses at most, said second lens group comprises three lenses, and said zoom lens satisfies the following condition:

$$7<(\beta_{2t}\cdot\beta_{3t}\cdot\beta_{4w})/(\beta_{2w}\cdot\beta_{3w}\cdot\beta_{4t})<15 \quad (1)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

(3) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said second lens group consists of a double-concave negative lens, an air separation, a negative lens, an air separation and a positive lens, and said zoom lens satisfies the following condition:

$$7<(\beta_{2t}\cdot\beta_{3t}\cdot\beta_{4w})/(\beta_{2w}\cdot\beta_{3w}\cdot\beta_{4t})<15 \quad (1)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

(4) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said zoom lens satisfies the following condition (1), and a third lens in said second lens group, as counted from its object side, is a convex lens that satisfies the following condition (10):

$$7<(\beta_{2t}\cdot\beta_{3t}\cdot\beta_{4w})/(\beta_{2w}\cdot\beta_{3w}\cdot\beta_{4t})<15 \quad (1)$$

$$1.86<n_{d23} \quad (10)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, $\beta_{4w}$ is the magnification of the fourth lens group at the wide-angle end, and $n_{d23}$ is the d-line refractive index of the third lens in the second lens group, as counted from its object side.

(5) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and said zoom lens satisfies the following conditions:

$$7<(\beta_{2t}\cdot\beta_{3t}\cdot\beta_{4w})/(\beta_{2w}\cdot\beta_{3w}\cdot\beta_{4t})<15 \quad (1)$$

$$0.64<f_2/f_3<0.73 \quad (19)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, $\beta_{4w}$ is the magnification of the fourth lens group at the wide-angle end, $f_2$ is the composite focal length of the second lens group, and $f_3$ is the composite focal length of the third lens group.

(6) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and said zoom lens satisfies the following conditions:

$$7<(\beta_{2t}\cdot\beta_{3t}\cdot\beta_{4w})/(\beta_{2w}\cdot\beta_{3w}\cdot\beta_{4t})<15 \quad (1)$$

$$-0.17<(\beta_{2t}/\beta_{2w})/(\beta_{3t}/\beta_{3w})<1.16 \quad (23)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

(7) A four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and said zoom lens satisfies the following condition:

$$-21<dt_{0.5dw}<-10.1 \quad (27)$$

where $dt_{0.5dw}$ is distortion in % of the maximum image height at the wide-angle end.

The second aspect of the invention involves six zoom lenses, set forth just below.

(1) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group consists of, in order from its object side, one negative lens and one positive lens, said second lens group consists of, in order from its object side, two negative lenses and one positive lens, said third lens group comprises up to four lenses, and said zoom lens satisfies the following condition:

$$0.3 < f_3/f_4 < 1.4 \qquad (31)$$

where:

$f_3$ is the focal length of the third lens group, and $f_4$ is the focal length of the fourth lens group.

(2) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$-23 < dt_{0.5dw} < -6.0 \qquad (32)$$

where $dt_{0.5dw}$ is distortion in % of the maximum image height at the wide-angle end.

(3) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, a double concave lens, an air separation, a negative lens, an air separation and a positive lens, and said third lens group comprises up to four lenses.

(4) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$2.4 < (\beta_{2t}/\beta_{2w}) < 5.7 \qquad (33)$$

where:

$\beta_{2t}$ is the transverse magnification of the second lens group at the telephoto end, and $\beta_{2w}$ is the transverse magnification of the second lens group at the wide-angle end.

(5) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$0.01 < f_1/f_t < 1.00 \qquad (34)$$

where:

$f_1$ is the focal length of the first lens group, and $f_t$ is the focal length of the zoom lens system at the telephoto end.

(6) A four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group consists of, in order from its object side, one negative lens and one positive lens, said second lens group consists of, in order from its object side, a double concave lens, an air separation, a negative lens, an air separation and a positive lens, said third lens group comprises up to four lenses, and said zoom lens satisfies the following conditions:

$$0.3 < f_3/f_4 < 1.4 \quad (31)$$

$$-23 < dt_{0.5dw} < -6.0 \quad (32)$$

$$2.4 < (\beta_{2t}/\beta_{2w}) < 5.7 \quad (33)$$

$$0.01 < f_1/f_t < 1.00 \quad (34)$$

where:
$f_1$ is the focal length of the first lens group,
$f_3$ is the focal length of the third lens group,
$f_4$ is the focal length of the fourth lens group,
$f_t$ is the focal length of the zoom lens system at the telephoto end,
$dt_{0.5dw}$ is distortion in % of the maximum image height at the wide-angle end,
$\beta_{2t}$ is the transverse magnification of the second lens group at the telephoto end, and
$\beta_{2w}$ is the transverse magnification of the second lens group at the wide-angle end.

The invention also encompasses an imaging system comprising any one of the above zoom lenses, and an image pickup device located on an image side thereof for converting an optical image into electric signals.

With the invention recited above, it is possible to provide a zoom lens that is much reduced in thickness upon received at a collapsible lens mount, has a high zoom ratio and maintains very stable image-formation capability all over the zoom range, and an electronic imaging system that incorporates such a zoom lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DECRIPTION OF THE DRAWINGS

DESCRIPTION OF THE PREFERRED EMBODIMENTS

Figure 1A:
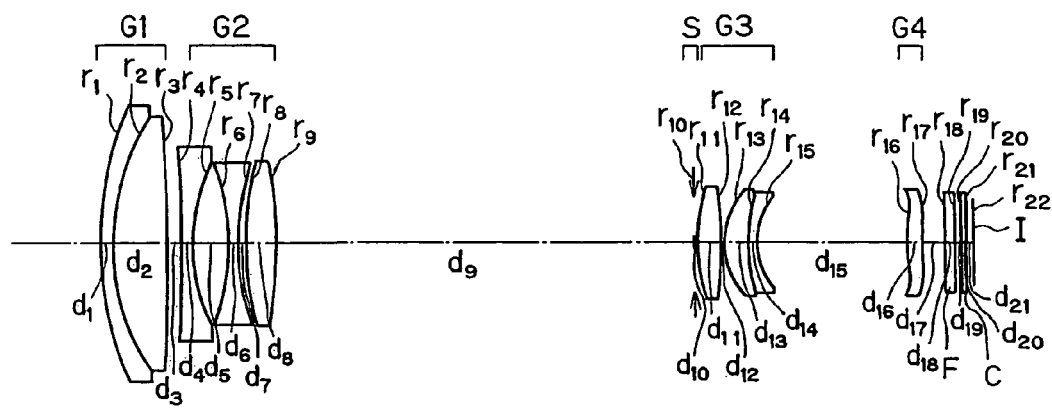
FIG. 1 is illustrative in lens arrangement section of Example 1 of the zoom lens according to the invention at the wide-angle end (a), in an intermediate setting (b) and at the telephoto end (c) upon focusing on an infinite object point.

Possible arrangements or embodiments of the zoom lens according to the invention are now explained in order with reference to the first, and the second aspect of the invention.

According to the first aspect of the invention, there is provided a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said zoom lens further comprises an aperture stop between said second lens group and said third lens group, wherein said aperture stop is positioned nearer to an image side of the zoom lens at the wide-angle end than at the telephoto end, and said zoom lens satisfies the following conditions:

$$7 < (\beta_{2t} \cdot \beta_{3t} \cdot \beta_{4w})/(\beta_{2w} \cdot \beta_{3w} \cdot \beta_{4t}) < 15 \quad (1)$$

$$7 < (\beta_{2t} \cdot \beta_{3t})/(\beta_{2w} \cdot \beta_{3w}) < 15 \quad (2)$$

where:
$\beta_{2t}$ is the magnification of the second lens group at the telephoto end,
$\beta_{3t}$ is the magnification of the third lens group at the telephoto end,
$\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

The advantage of, and the requirement for, the first zoom lens set up according to the first aspect of the invention is now explained.

The first zoom lens is of the type that comprises the positive first lens group, the negative second lens group, the positive third lens group and the fourth lens group, wherein all the lens groups are moved for zooming. In this case, as the second lens group is composed of three lenses, the second lens group is allowed to have an axial thickness so reduced that there is ensured a zooming space while having power enough to gain zoom ratios.

The second lens group and the third lens group share the substantial zooming function of the zoom lens while the fourth lens group is primarily operable to correct the zoom lens for aberrations.

Here, as the lower limit of 7 to both conditions (1) and (2) is not reached, it is impossible to gain any high zoom ratio. As the lower limit of 7 to condition (2) alone is not reached, there is a growing zooming load on the fourth lens group; the construction of the fourth lens group becomes too intrigue to achieve high performance and thickness reductions. As the upper limit of 15 to condition (1) is exceeded, the fourth lens group does not only work against efficient zooming, but also some space is needed for the movement of the fourth lens group, rendering it difficult to slim down the fourth lens group. As the upper limit of 15 to condition (2) is exceeded, there is a growing zooming load for which some moving space is needed, resulting in difficulty in thickness reductions.

The aperture stop is located between the second lens group and the third lens group in such a way as to be positioned nearer to the image side at the wide-angle end than at the telephoto end. Especially as the stop is positioned closer to the third lens group, it allows for a decrease in the lens diameter of the third lens group (this works for the structure of a camera body), and permits chief light rays to be incident at or near the optical axis of the zoom lens system from the wide-angle end to the telephoto end. It is thus possible to slim down the third lens group and achieve a zoom lens system improved in terms of image-formation capability albeit having a high zoom ratio.

The second zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said first lens group comprises two lenses at most, said second lens group comprises three lenses, and said zoom lens satisfies the following condition:

$$7<(\beta_{2t}\cdot\beta_{3t}\cdot\beta_{4w})/(\beta_{2w}\cdot\beta_{3w}\cdot\beta_{4t})<15 \quad (1)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

The advantage of, and the requirement for, the second zoom lens set up according to the first aspect of the invention is now explained.

The second zoom lens is of the type that comprises the positive first lens group, the negative second lens group, the positive third lens group and the fourth lens group, wherein all the lens groups are moved for zooming. Preferably in this case, the first lens group is composed of up to two lenses. If the first lens group comprises three or more lenses, it will never be axially slimmed down, and will increase in diameter as well. In the invention, if this requirement is combined with other requirements, it is possible to achieve a zoom lens improved in image-formation capability albeit having a high zoom ratio.

As the second lens group is composed of three lenses, it allows for a zooming space while the second lens group has power enough to gain zoom ratios, because the second lens group is axially slimmed down.

The second and the third lens group share the substantial zooming function of the zoom lens while the fourth lens group is primarily operable to make correction for aberrations.

As the lower limit of 7 to condition (1) is not reached, it is impossible to gain any high zoom ratios. As the upper limit of 15 to condition (1) is exceeded, the fourth lens group works against efficient zooming; some moving space is needed rendering slimming-down difficult.

The third zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said second lens group consists of a double-concave negative lens, an air separation, a negative lens, an air separation and a positive lens, and said zoom lens satisfies the following condition:

$$7<(\beta_{2t}\cdot\beta_{3t}\cdot\beta_{4w})/(\beta_{2w}\cdot\beta_{3w}\cdot\beta_{4t})<15 \quad (1)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

The advantage of, and the requirement for, the third zoom lens set up according to the first aspect of the invention is now explained.

The second zoom lens is of the type that comprises the positive first lens group, the negative second lens group, the positive third lens group and the fourth lens group, wherein all the lens groups are moved for zooming. Preferably in this case, the first lens group is composed of up to two lenses. If the first lens group comprises three or more lenses, it will never be axially slimmed down, and will increase in diameter as well. In the invention, if this requirement is combined with other requirements, it is possible to achieve a zoom lens improved in image-formation capability albeit having a high zoom ratio.

As the second lens group is composed of three lenses, it allows for a zooming space while the second lens group has power enough to gain zoom ratios, because the second lens group is axially slimmed down. Especially if the second lens group is composed of a double-concave negative lens, an air separation, a negative lens, an air separation and a positive lens, it allows the second lens group to have large negative power while reducing its axial thickness. The location of two air separations works for effective correction of aberrations, whether axial or off-axial, so that loads on the first and the third lens group can be alleviated, and their axial thickness can be reduced as well.

The second and the third lens group share the substantial zooming function of the zoom lens while the fourth lens group is primarily operable to make correction for aberrations.

As the lower limit of 7 to condition (1) is not reached, it is impossible to gain any high zoom ratios. As the upper limit of 15 to condition (1) is exceeded, the fourth lens group works against efficient zooming; some moving space is needed rendering slimming-down difficult.

The fourth zoom lens according to the first aspect of the invention is characterized in that said second lens group in the third zoom lens consists of, in order from its object side, a double-concave negative lens, a double-concave negative lens and a double-convex positive lens.

The advantage of, and the requirement for, the fourth zoom lens set up according to the first aspect of the invention is now explained. Such a lens arrangement works for correction of higher-order aberrations.

The fifth zoom lens according to the first aspect of the invention is characterized in that the fourth zoom lens satisfies the following condition:

$$0.1 < \Sigma d_{2g}/R_{2g2} < 2 \qquad (3)$$

where:

$\Sigma d_{2g}$ is the axial thickness of the second lens group from the lens surface nearest to the object side to the lens surface nearest to the image side, and $R_{2g2}$ is the paraxial radius of curvature of the double-concave lens on the object side of the second lens group.

The advantage of, and the requirement for, the fifth zoom lens set up according to the first aspect of the invention is now explained. As the lower limit of 0.1 to condition (3) is not reached, the power of the second lens group becomes small because the power of the first lens therein becomes small. As the upper limit of 2 is exceeded, the second lens group produces too large aberrations to correct at other lens groups.

The sixth zoom lens according to the first aspect of the invention is characterized in that any one of the 1st to 5th zoom lenses satisfies the following condition:

$$0.77 < (D_{1t} + D_{2w})/f_t < 0.99 \qquad (4)$$

where:

$D_{1t}$ is the air separation between the first lens group and the second lens group at the telephoto end, $D_{2w}$ is the air separation between the second lens group and the third lens group at the wide-angle end, and $f_t$ is the focal length of the zoom lens system at the telephoto end.

The advantage of, and the requirement for, the sixth zoom lens set up according to the first aspect of the invention is now explained. As the lower limit of 0.77 to condition (4) is not reached, the space necessary for zooming can never be ensured. As the upper limit of 0.99 is exceeded, the length of the zoom lens system at the telephoto end becomes long, resulting in an increased lens unit size.

The lower limit to condition (4) could be set at 0.85, or the upper limit to condition (4) could be set at 0.88.

The seventh zoom lens according to the first aspect of the invention is characterized in that the sixth zoom lens satisfies the following condition:

$$8.03 < (D_{1t} + D_{2w})/f_w < 11 \qquad (5)$$

where $f_w$ is the focal length of the zoom lens system at the wide-angle end.

The advantage of, and the requirement for, the seventh zoom lens set up according to the first aspect of the invention is now explained. As the lower limit of 8.03 to condition (5) is not reached, the space necessary for zooming can never be ensured. As the upper limit of 11 is exceeded, the length of the zoom lens system at the telephoto end becomes long, resulting in an increased lens unit size.

The lower limit to condition (5) could be set at 8.30, or the upper limit could be set at 9.92.

The eighth zoom lens according to the first aspect of the invention is characterized in that the first lens group in any one of the 1st to 7th zoom lenses comprises concave lenses that satisfy the following condition:

$$1.86 < n_{d1N} \qquad (6)$$

where $n_{d1N}$ is the d-line refractive index of the vitreous material of one of the concave lenses in the first lens group.

The advantage of, and the requirement for, the eighth zoom lens set up according to the first aspect of the invention is now explained. Falling short of the lower limit of 1.86 to condition (6) will render correction of chromatic aberrations difficult.

The lower limit to condition (6) could be set at 1.90.

The ninth zoom lens according to the first aspect of the invention is characterized in that the first lens group in any one of the 1st to 8th zoom lenses comprises concave lenses that satisfy the following condition:

$$25.8 < \nu_{d1N} \qquad (7)$$

where $\nu_{d1N}$ is the d-line base Abbe constant of the vitreous material of one of the concave lenses in the first lens group.

The advantage of, and the requirement for, the ninth zoom lens set up according to the first aspect of the invention is now explained. Falling short of the lower limit of 25.8 to condition (7) will render correction of chromatic aberrations difficult.

The lower limit to condition (7) could be set at 31.

The 10th zoom lens according to the first aspect of the invention is characterized in that the first lens in said second lens group, as counted from its object side, in any one of 1st to 9th zoom lenses is a concave lens that satisfies the following condition:

$$1.78 < n_{d21} \quad (8)$$

where $n_{d21}$ is the d-line refractive index of the vitreous material of the first lens in the second lens group, as counted from its object side.

The advantage of, and the requirement for, the 10th zoom lens set up according to the first aspect of the invention is now explained. Falling short of the lower limit of 1.78 to condition (8) will render the concave surface of that lens tight, resulting in an increase in the amount of aberrations produced. Further, the Petzval's sum will grow large in the negative direction, resulting in increased field curvature.

The lower limit to condition (8) could be set at 1.86.

The 11th zoom lens according to the first aspect of the invention is characterized in that the second lens in said second lens group, as counted from its object side, in any one of 1st to 10th zoom lenses is a concave lens that satisfies the following condition:

$$1.80 < n_{d22} \quad (9)$$

where $n_{d22}$ is the d-line refractive index of the vitreous material of the second lens in the second lens group, as counted from its object side.

The advantage of, and the requirement for, the 11th zoom lens set up according to the first aspect of the invention is now explained. Falling short of the lower limit of 1.80 to condition (9) will render the concave surface of that lens tight, resulting in an increase in the amount of aberrations produced. Further, the Petzval's sum will grow large in the negative direction, resulting in increased field curvature.

The lower limit to condition (9) could be set at 1.86.

The 12th zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, said zoom lens satisfies the following condition (1), and the third lens in said second lens group, as counted from its object side, is a convex lens that satisfies the following condition (10):

$$7 < (\beta_{2t} \cdot \beta_{3t} \cdot \beta_{4w}) / (\beta_{2w} \cdot \beta_{3w} \cdot \beta_{4t}) < 15 \quad (1)$$

$$1.86 < n_{d23} \quad (10)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, $\beta_{4w}$ is the magnification of the fourth lens group at the wide-angle end, and $n_{d23}$ is the d-line refractive index of the third lens in the second lens group, as counted from its object side.

The advantage of, and the requirement for, the 12th zoom lens set up according to the first aspect of the invention is now explained.

The 12th zoom lens is of the type that comprises the positive first lens group, the negative second lens group, the positive third lens group and the fourth lens group, wherein all the lens groups are moved for zooming. In this case, as the second lens group is composed of three lenses, the second lens group is allowed to have an axial thickness so reduced that there is ensured a zooming space while having power enough to gain zoom ratios.

The second and the third lens group share the substantial zooming function of the zoom lens while the fourth lens group is primarily operable to make correction for aberrations.

If, in this case, the lower limit of 7 to condition (1) is not reached, it will be impossible to achieve any high zoom ratio. If the upper limit of 15 to condition (1) is exceeded, the fourth lens group will work against efficient zooming; some moving space will be necessary, rendering slimming-down difficult.

Falling short of the lower limit of 1.86 to condition (10) will render correction of chromatic aberrations difficult. In addition, the Petzval's sum will grow large in the negative direction, resulting in an increased field curvature.

The lower limit to condition (10) could be set at 1.9.

The 13th zoom lens according to the first aspect of the invention is characterized in that the third lens in said second lens group, as counted from its object side, in any one of the 1st to 11th zoom lenses is a convex lens that satisfies the following condition (10):

$$1.86 < n_{d23} \quad (10)$$

where $n_{d23}$ is the d-line refractive index of the third lens in the second lens group, as counted from its object side.

The advantage of, and the requirement for, the 13th zoom lens set up according to the first aspect of the invention is now explained. Falling short of the lower limit of 1.86 to condition (10) will render correction of chromatic aberrations difficult. In addition, the Petzval's sum will grow large in the negative direction, resulting in an increased field curvature.

The lower limit to condition (10) could be set at 1.9.

The 14th zoom lens according to the first aspect of the invention is characterized in that said third lens group in any one of the 1st to 13th zoom lenses satisfies the following condition:

$$-2.1 < \beta_{3t} < -1.43 \quad (11)$$

The advantage of, and the requirement for, the 14th zoom lens set up according to the first aspect of the invention is now explained. As the upper limit of −2.1 to condition (11) is exceeded, it causes an increasing load to be applied to the third lens group, leading to an increase in the amount of its movement or requiring for it to have power and, hence, resulting in an increase in lens unit size. As the upper limit of −1.43 is exceeded, it causes the zooming load of the third lens group to become too small to achieve any high zoom ratio.

The upper limit to condition (11) could be set at −1.07.

The 15$^{th}$ zoom lens according to the first aspect of the invention is characterized in that said first lens group in any one of the 1$^{st}$ to 14$^{th}$ zoom lenses satisfies the following condition:

$$6.68 < f_1/f_w < 8.61 \quad (12)$$

where:

$f_1$ is the composite focal length of the first lens group, and $f_w$ is the focal length of the zoom lens system at the wide-angle end.

The advantage of, and the requirement for, the 15$^{th}$ zoom lens set up according to the first aspect of the invention is now explained. If the composite focal length $f_1$ of the first lens group is less than the lower limit of 6.68 to condition (12), the amount of aberrations occurring at the first lens group will grow large, rendering it difficult to obtain satisfactory image-formation capability without increasing the thickness of the first lens group. If $f_1$ is greater than the upper limit of 8.61, there will be difficulty in zooming at the second and third lens groups while maintaining compactness.

The lower limit to condition (12) could be set at 7.44, or the upper limit could be set at 8.4.

The 16$^{th}$ zoom lens according to the first aspect of the invention is characterized in that any one of the 1$^{st}$ to 15$^{th}$ zoom lenses satisfies the following condition:

$$1.1 < D_{3w}/f_w < 1.55 \quad (13)$$

where:

$D_{3w}$ is the air separation between the third lens group and the fourth lens group at the wide-angle end, and $f_w$ is the focal length of the zoom lens system at the wide-angle end.

The advantage of, and the requirement for, the 16$^{th}$ zoom lens set up according to the first aspect of the invention is now explained. If the lower limit of 1.1 to condition (13) is not reached, the pupil position will shift toward the image side, resulting in an increase in the front lens size. If the upper limit of 1.55 is exceeded, it will be impossible to gain any zoom ratio at the third lens group.

The lower limit to condition (13) could be set at 1.16, or the upper limit could be set at 1.46.

The 17$^{th}$ zoom lens according to the first aspect of the invention is characterized in that any one of the 1$^{st}$ to 16$^{th}$ zoom lenses satisfies the following condition:

$$0.4 < D_{1t}/f_t < 0.53 \quad (14)$$

where:

$D_{1t}$ is the air separation between the first lens group and the second lens group at the telephoto end, and $f_t$ is the focal length of the zoom lens system at the telephoto end.

The advantage of, and the requirement for, the 17$^{th}$ zoom lens set up according to the first aspect of the invention is now explained. If the lower limit of 0.4 to condition (14) is not reached, it will be impossible to gain any zoom ratio at the second lens group. If the upper limit of 0.53 is exceeded, the zoom lens system will not only become long at the telephoto end, but also the F-number will grow large.

The upper limit to condition (14) could be set at 0.46.

The 18$^{th}$ zoom lens according to the first aspect of the invention is characterized in that any one of the 1$^{st}$ to 17$^{th}$ zoom lenses satisfies the following condition:

$$0.3 < D_{3t}/f_t < 0.45 \quad (15)$$

where:

$D_{3t}$ is the air separation between the third lens group and the fourth lens group at the telephoto end, and $f_t$ is the focal length of the zoom lens system at the telephoto end.

The advantage of, and the requirement for, the 18$^{th}$ zoom lens set up according to the first aspect of the invention is now explained. If the lower limit of 0.3 to condition (15) is not reached, it will be impossible to gain any zoom ratio at the third lens group. If the upper limit of 0.45 is exceeded, the zoom lens system will not only become long at the telephoto end, but also the F-number will grow large. Otherwise, it will be difficult to figure out any practical cam mechanism for the movement of the lens groups.

The lower limit to condition (15) could be set at 0.4.

The 19$^{th}$ zoom lens according to the first aspect of the invention is characterized in that any one of the 1$^{st}$ to 18$^{th}$ zoom lenses satisfies the following condition:

$$1.68 < D_{2w}/D_{3w} < 3.68 \quad (16)$$

where:

$D_{2w}$ is the air separation between the second lens group and the third lens group at the wide-angle end, and $D_{3w}$ is the air separation between the third lens group and the fourth lens group at the wide-angle end.

The advantage of, and the requirement for, the 19$^{th}$ zoom lens set up according to the first aspect of the invention is now explained. If the lower limit of 1.68 to condition (16) is not reached, the zoom lens system at the wide-angle end will become short, resulting in an increased aberration leading to underperformance. Otherwise, the zoom lens system at the telephoto end will become long, resulting in an increased lens unit size and an increased F-number as well. If the upper limit of 3.68 is exceeded, the zoom lens system at the wide-angle end will become long, resulting in an increased front lens diameter. Otherwise, the zoom lens system at the telephoto end will become long, resulting in an increased lens unit size and an increased F-number as well.

The lower limit to condition (16) could be set at 2.81.

The 20$^{th}$ zoom lens according to the first aspect of the invention is characterized in that the second lens group in any one of the 1$^{st}$ to 19$^{th}$ zoom lenses is moved nearer to the image side at the telephoto end than at the wide-angle end in such a way as to satisfy the following condition:

$$1.2 < \Delta_{s2g}/\Delta_{t2g} < 1.89 \quad (17)$$

where, on condition that the "intermediate focal length setting" is defined by a state that provides the geometric mean focal length of a wide-angle end focal length and a telephoto end focal length, $\Delta_{s2g}$ is the amount of movement of the second lens group from the wide-angle end to the intermediate focal length setting, and $\Delta_{t2g}$ is the amount of movement of the second lens group from the wide-angle end to the telephoto end with the proviso that the amount of movement in an object direction is taken as positive.

The advantage of, and the requirement for, the 20$^{th}$ zoom lens set up according to the first aspect of the invention is now explained. If the lower limit of 1.2 to condition (17) is not reached, any zoom ratio will never be gained at the second lens group. If the upper limit of 1.89 is exceeded, the amount of movement of the second lens group will become too large to figure out any practical cam mechanism.

The lower limit to condition (17) could be set at 1.4.

The 21$^{st}$ zoom lens according to the first aspect of the invention is characterized in that the third lens group in any one of the 1$^{st}$ to 20$^{th}$ zoom lenses is moved nearer to the image side at the telephoto end than at the wide-angle end in such a way as to satisfy the following condition:

$$0<\Delta_{s3g}/\Delta_{t3g}<0.44 \tag{18}$$

where, on condition that the "intermediate focal length setting" is defined by a state that provides the geometric mean focal length of a wide-angle end focal length and a telephoto end focal length, $\Delta_{s3g}$ is the amount of movement of the third lens group from the wide-angle end to the intermediate focal length setting, and $\Delta_{t3g}$ is the amount of movement of the third lens group from the wide-angle end to the telephoto end with the proviso that the amount of movement in an object direction is taken as positive.

The advantage of, and the requirement for, the 21$^{st}$ zoom lens set up according to the first aspect of the invention is now explained. If the upper limit of 0 to condition (18) is not reached, the pupil position will shift to the image side, resulting in an increased front lens diameter. If the upper limit of 0.44 is exceeded, a lot more increased zooming load will be applied to the third lens group, resulting in a lot more increased aberrations.

The lower limit to condition (18) could be set at 0.3, or the upper limit could be set at 0.39.

The 22$^{nd}$ zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and said zoom lens satisfies the following conditions:

$$7<(\beta_{2t}\cdot\beta_{3t}\cdot\beta_{4w})/(\beta_{2w}\cdot\beta_{3w}\cdot\beta_{4t})<15 \tag{1}$$

$$0.64<f_2/f_3<0.73 \tag{19}$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, $\beta_{4w}$ is the magnification of the fourth lens group at the wide-angle end, $f_2$ is the composite focal length of the second lens group, and $f_3$ is the composite focal length of the third lens group.

The advantage of, and the requirement for, the 22$^{nd}$ zoom lens set up according to the second aspect of the invention is now explained.

The 22$^{nd}$ zoom lens is of the type that comprises the positive first lens group, the negative second lens group, the positive third lens group and the fourth lens group, wherein all the lens groups are moved for zooming. In this case, as the second lens group is composed of three lenses, the second lens group is allowed to have an axial thickness so reduced that there is ensured a zooming space while having power enough to gain zoom ratios.

The second lens group and the third lens group share the substantial zooming function of the zoom lens while the fourth lens group is primarily operable to make correction for aberrations.

If, in this case, the lower limit of 7 to condition (1) is not reached, it will be impossible to achieve any high zoom ratio. If the upper limit of 15 to condition (1) is exceeded, the fourth lens group will work against efficient zooming; some moving space will be necessary, rendering slimming-down difficult.

Falling short of the lower limit of 0.64 to condition (19) will render it difficult to obtain satisfactory image-formation capability because of an increase in the amount of aberrations occurring at the second lens group. Exceeding the upper limit of 0.73 will again render it difficult to obtain satisfactory image-formation capability because of an increase in the amount of aberrations occurring at the third lens group.

The 23$^{rd}$ zoom lens according to the first aspect of the invention is characterized in that any one of the 1$^{st}$ to 21$^{st}$ zoom lenses satisfies the following condition:

$$0.64<f_2/f_3<0.73 \tag{19}$$

where:

$f_2$ is the composite focal length of the second lens group, and $f_3$ is the composite focal length of the third lens group.

The advantage of, and the requirement for, the 23$^{rd}$ zoom lens set up according to the first aspect of the invention is now explained. Falling short of the lower limit of 0.64 to condition (19) will render it difficult to obtain satisfactory image-formation capability because of an increase in the amount of aberrations occurring at the second lens group. Exceeding the upper limit of 0.73 will again render it difficult to obtain satisfactory image-formation capability because of an increase in the amount of aberrations occurring at the third lens group.

The 24$^{th}$ zoom lens according to the first aspect of the invention is characterized in that the third lens group in any one of the 1$^{st}$ to 23$^{rd}$ zoom lenses satisfies the following condition:

$$0.26<\Delta_{t3g}/f_t<0.37 \tag{20}$$

where:

$\Delta_{t3g}$ is the amount of the third lens group from the wide-angle end to the telephoto end with the proviso that the amount of movement in an object direction is taken as positive, and $f_t$ is the focal length of the zoom lens system at the telephoto end.

The advantage of, and the requirement for, the 24$^{th}$ zoom lens set up according to the first aspect of the invention is now explained. Falling short of the lower limit of 0.26 to condition (20) will cause the pupil position to shift to the image side, resulting in an increased front lens diameter. Otherwise, the zoom lens system at the telephoto end will become long, resulting in an increased F-number. Exceeding the upper limit of 0.37 will cause a lot more zooming load to be applied to the third lens group, ending up with a lot more increased aberrations.

The lower limit to condition (20) could be set at 0.28, or the upper limit could be set at 0.34.

The 25$^{th}$ zoom lens according to the first aspect of the invention is characterized in that the third lens group in any one of the 1$^{st}$ to 24$^{th}$ zoom lenses satisfies the following condition:

$$2.8 < \Delta_{t3g}/f_w < 3.21 \qquad (21)$$

where, on condition that the amount of movement in an object direction is taken as positive, $\Delta_{t3g}$ is the amount of the third lens group from the wide-angle end to the telephoto end with the proviso that the amount of movement in an object direction is taken as positive, and, $f_w$ is the focal length of the zoom lens system at the wide-angle end.

The advantage of, and the requirement for, the 25$^{th}$ zoom lens set up according to the first aspect of the invention is now explained. As the lower limit of 2.8 to condition (21) is not reached, the power of the third lens group grows large to gain zoom ratios, resulting in a lot more aberrations and, hence, underperformance. As the upper limit of 3.21 is exceeded, the pupil position shifts to the image side, resulting in an increased front lens diameter. Otherwise, the zoom lens system at the telephoto end will become long, and the F-number will increase as well.

The 26$^{th}$ zoom lens according to the first aspect of the invention is characterized in that the third lens group in any one of the 1$^{st}$ to 25$^{th}$ zoom lenses satisfies the following condition:

$$2.64 < (\beta_{3t}/\beta_{3w}) < 3.26 \qquad (22)$$

The advantage of, and the requirement for, the 26$^{th}$ zoom lens set up according to the first aspect of the invention is now explained. If the lower limit of 2.64 to condition (22) is not reached, the amount of movement of the second lens group will grow large, resulting in an increased lens unit size. Otherwise, the power of the second lens group will grow large, resulting in a lot more aberrations and, hence, underperformance. If the upper limit of 3.26 is exceeded, the amount of movement of the third lens group will grow large, again resulting in an increased lens unit size. Otherwise, the power of the third lens group will grow large, resulting in a lot more aberrations and, hence, underperformance.

The lower limit to condition (22) could be set at 2.87, or the upper limit could be set at 3.24.

The 27$^{th}$ zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and
said zoom lens satisfies the following conditions:

$$7 < (\beta_{2t} \cdot \beta_{3t} \cdot \beta_{4w})/(\beta_{2w} \cdot \beta_{3w} \cdot \beta_{4t}) < 15 \qquad (1)$$

$$-0.17 < (\beta_{2t}/\beta_{2w})/(\beta_{3t}/\beta_{3w}) < 1.16 \qquad (23)$$

where:

$\beta_{2t}$ is the magnification of the second lens group at the telephoto end, $\beta_{3t}$ is the magnification of the third lens group at the telephoto end, $\beta_{4t}$ is the magnification of the fourth lens group at the telephoto end, $\beta_{2w}$ is the magnification of the second lens group at the wide-angle end, $\beta_{3w}$ is the magnification of the third lens group at the wide-angle end, and $\beta_{4w}$ is the magnification of the fourth lens group at the wide-angle end.

The advantage of, and the requirement for, the 27$^{th}$ zoom lens set up according to the first aspect of the invention is now explained.

The 27$^{th}$ zoom lens is of the type that comprises the positive first lens group, the negative second lens group, the positive third lens group and the fourth lens group, wherein all the lens groups are moved for zooming. In this case, as the second lens group is composed of three lenses, the second lens group is allowed to have an axial thickness so reduced that there is ensured a zooming space while having power enough to gain zoom ratios.

The second and the third lens group share the substantial zooming function of the zoom lens while the fourth lens group is primarily operable to make correction for aberrations.

If, in this case, the lower limit of 7 to condition (1) is not reached, any high zoom ratio will never be gained. If the upper limit of 15 to condition (1) is exceeded, the fourth lens group will work against efficient zooming; some moving space will be necessary, rendering slimming-down difficult.

If the lower limit of −0.17 to condition (23) is not reached, an increased zooming load will be applied to the third lens group, resulting in an increase in the amount of movement of the third lens group and, hence, an increased lens unit size. When a lot more zooming load is allocated to the fourth lens group, aberrations at the fourth lens group will grow large, resulting in under-performance. As the upper limit of 1.16 is exceeded, the power of the second lens group grows large, resulting in a lot more aberrations leading to underperformance. Otherwise, there is an increase in the amount of movement of the second lens group, which in turn causes incident light rays to have height at the wide-angle end, incurring an increase in the lens diameter of the first lens group.

The lower limit to condition (23) could be set at 0.84, or the upper limit could be set at 1.15.

The 28$^{th}$ zoom lens according to the first aspect of the invention is characterized in that any one of the 1$^{st}$ to 26$^{th}$ zoom lenses satisfies the following condition:

$$-0.17 < (\beta_{2t}/\beta_{2w})/(\beta_{3t}/\beta_{3w}) < 1.16 \qquad (23)$$

The advantage of, and the requirement for, the 28$^{th}$ zoom lens set up according to the first aspect of the invention is now explained. If the lower limit of −0.17 to condition (23) is not reached, a lot more zooming load will be applied to the third lens group, resulting in an increase in the amount of movement of the third lens group and, hence, an increased lens unit size. When a lot more zooming load is allocated to the fourth lens group, aberrations at the fourth lens group will grow large, resulting in under-performance. As the upper limit of 1.16 is exceeded, the power of the second lens group grows large, resulting in a lot more aberrations leading to underperformance. Otherwise, there is an increase in the amount of movement of the second lens group, which in turn causes incident light rays to have height at the wide-angle end, incurring an increase in the lens diameter of the first lens group.

The lower limit to condition (23) could be set at 0.84, or the upper limit could be set at 1.15.

The 29th zoom lens according to the first aspect of the invention is characterized in that the first lens group in any one of the 1st to 28th zoom lenses satisfies the following condition:

$$0 < \Sigma d_{1g}/L_t < 0.09 \quad (24)$$

where:

$\Sigma d_{1g}$ is the axial thickness of the first lens group from the lens surface nearest to its object side to the lens surface nearest to its image side, and Lt is the length of the zoom lens from its entrance surface to an image plane at the telephoto end.

The advantage of, and the requirement for, the 29th zoom lens set up according to the first aspect of the invention is now explained. As $\Sigma d_{1g}$ is less than the lower limit of 0 to condition (24), it renders zooming at the second and third lens groups difficult while maintaining compactness. Otherwise, it is difficult to ensure lens edge thickness. As $\Sigma d_{1g}$ is greater than the upper limit of 0.09 to condition (24), it causes the zoom lens to become thick upon received at a collapsible lens mount.

The lower limit to condition (24) could be set at 0.06.

The 30th zoom lens according to the first aspect of the invention is characterized in that the first lens group in any one of the 1st to 29th zoom lenses satisfies the following condition:

$$0 < \Sigma d_{1g}/f_t < 0.11 \quad (25)$$

where:

$\Sigma d_{1g}$ is the axial thickness of the first lens group from the lens surface nearest to its object side to the lens surface nearest to its image side, and ft is the focal length of the zoom lens system at the telephoto end.

The advantage of, and the requirement for, the 30th zoom lens set up according to the first aspect of the invention is now explained. As $\Sigma d_{1g}$ is less than the lower limit of 0 to condition (25), it renders zooming at the second and third lens groups difficult while maintaining compactness. Otherwise, it is difficult to ensure lens edge thickness. As $\Sigma d_{1g}$ is greater than the upper limit of 0.11 to condition (25), it causes the zoom lens to become thick upon received at a collapsible lens mount.

The lower limit to condition (25) could be set at 0.08.

The 31st zoom lens according to the first aspect of the invention is characterized by further comprising an aperture stop having an aperture diameter that becomes larger at the telephoto end than at the wide-angle end.

The advantage of, and the requirement for, the 31st zoom lens set up according to the first aspect of the invention is now explained. The incorporation of such an aperture stop helps prevent axial aberrations from deteriorating or ambient light from decreasing due to too small an F-number at the wide-angle end, or the F-number at the telephoto end from growing large.

The 32nd zoom lens according to the first aspect of the invention is characterized in that any one of the 1st to 31st zoom lenses satisfies the following condition:

$$7 < f_t/f_w < 15 \quad (26)$$

where:

$f_t$ is the focal length of the zoom lens system at the telephoto end, and $f_w$ is the focal length of the zoom lens system at the wide-angle end.

The advantage of, and the requirement for, the 32nd zoom lens set up according to the first aspect of the invention is now explained. If the lower limit of 7 to condition (26) is not reached, the zoom ratio will become low and so expressive power become down on taking. If the upper limit of 15 is exceeded, difficulty will be encountered in achieving compactness while maintaining high performance and so mobility on taking become down.

The 33rd zoom lens according to the first aspect of the invention is characterized in that any one of the 1st to 32nd zoom lenses satisfies the following condition:

$$-21 < dt_{0.5dw} < -10.1 \quad (27)$$

where $dt_{0.5dw}$ is distortion in % of the maximum image height at the wide-angle end.

The advantage of, and the requirement for, the 33rd zoom lens set up according to the first aspect of the invention is now explained. As the lower limit of −21 to condition (27) is not reached, it causes aberrations to be ill-balanced, ending up with underperformance. Otherwise, not only will much time be taken for correction by image processing, but also that correction will be difficult in itself. If the upper limit of −10.1 is exceeded, there will be an increase in the amount of chromatic aberrations occurring at the first lens group, which will come off underperformance.

The upper limit to condition (27) could be set at −10.3.

The 34th zoom lens according to the first aspect of the invention is a four-group zoom lens comprising, in order from its object side, a first lens group of positive refracting power, a second lens group of negative refracting power, a third lens group of positive refracting power and a fourth lens group, characterized in that:

for zooming from the wide-angle end to the telephoto end of the zoom lens, said first lens group, said second lens group, said third lens group and said fourth lens group are each operable to move with a varying space between adjacent lens groups, said second lens group comprises three lenses, and
said zoom lens satisfies the following condition:

$$-21 < dt_{0.5dw} < -10.1 \quad (27)$$

where $dt_{0.5dw}$ is distortion in % of the maximum image height at the wide-angle end.

The advantage of, and the requirement for, the 34th zoom lens set up according to the first aspect of the invention is now explained.

The 34th zoom lens is of the type that comprises the positive first lens group, the negative second lens group, the positive third lens group and the fourth lens group, wherein all the lens groups are moved for zooming. In this case, as the second lens group is composed of three lenses, the second lens group is allowed to have an axial thickness so reduced that there is ensured a zooming space while having power enough to gain zoom ratios.

The second and the third lens group share the substantial zooming function of the zoom lens while the fourth lens group is primarily operable to make correction for aberrations.

If, in this case, the lower limit of −21 to condition (27) is not reached, it will cause aberrations to be ill-balanced, ending up with underperformance. Otherwise, not only will much time be taken for correction by image processing, but also that correction will be difficult in itself. If the upper limit of −10.1 is exceeded, there will be an increase in the amount of chromatic aberrations occurring at the first lens group, which will come off underperformance.

The upper limit to condition (27) could be set at −10.3.

The 35$^{th}$ embodiment of the first aspect of the invention is an electronic imaging system, characterized by comprising a zoom lens as recited in any one of the 1$^{st}$ to 34$^{th}$ embodiments of the invention and an electronic image pickup device located on its image side.

The advantage of, and the requirement for, the electronic imaging system set up according to the first aspect of the invention is now explained. The zoom lens of the invention is preferably used with an electronic imaging system, because its size, performance and zoom ratio can be improved.

The above zoom lens is reduced in length upon received at a collapsible lens mount, and has improved performance and high zoom ratios. Therefore, if such a zoom lens is used as an imaging optical system on an imaging system, it is then possible to achieve size reductions and multi-functional performance. Notice here that the imaging system could be embodied in the form of not only digital cameras but also video cameras, digital video units or the like.

The zoom lenses of the invention, if used in any desired combination, can provide more favorable advantages. Throughout the conditions described above, only the upper or lower limits to the narrower conditions could be applied as the upper or lower limits to the broader conditions.

With the above conditions applied in any desired combinations, the advantages of the invention could be more enhanced.

Reference is now made to the embodiments of the zoom lens according to the second aspect of the invention.

The first zoom lens of the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group consists of, in order from its object side, one negative lens and one positive lens, said second lens group consists of, in order from its object side, two negative lenses and one positive lens, said third lens group comprises up to four lenses, and said zoom lens satisfies the following condition:

$$0.3 < f_3/f_4 < 1.4 \tag{31}$$

where:

$f_3$ is the focal length of the third lens group, and
$f_4$ is the focal length of the fourth lens group.

The advantage of, and the requirement for, the first zoom lens set up according to the second aspect of the invention is now explained.

With a zoom lens of the type having negative power at the front, that is, wherein the first lens group has negative refracting power, a zoom ratio of barely about 4 is obtainable.

The first zoom lens of the second aspect is a four-group zoom lens comprising, in order from its object side, the first lens group of positive refracting power, the second lens group of negative refracting power, the third lens group of positive refracting power and the fourth lens group of positive refracting power, and designed to have a zoom ratio of at least about 8.

Upon zooming from the wide-angle end to the telephoto end, the respective lens groups move such that the air separation between the first lens group and the second lens group becomes wide, the air separation between the second lens group and the third lens group becomes narrow and the air separation between the third lens group and the fourth lens group becomes wide, so that both the second lens group and the third lens group share the zooming function of the zoom lens.

With such a lens group power profile and moving mode as described above, the first lens group is likely to increase in diameter. In other words, if the first lens group is comprised of three or more lenses, that group will never be slimmed down. Therefore, the first lens group is composed of one negative lens and one positive lens.

To gain some zoom ratio at the second lens group, that group must be slimmed down while having power, thereby allowing for zooming space. Therefore, the second lens group is composed of two negative lenses and one positive lens.

The third lens group is composed of up to four lenses so as to give an image-formation function to it and slim down it while aberrations are well held back.

The third lens group and the fourth lens group then satisfy the following condition:

$$0.3 < f_3/f_4 < 1.4 \tag{31}$$

where:

$f_3$ is the focal length of the third lens group, and
$f_4$ is the focal length of the fourth lens group.

As the lower limit of 0.3 to condition (31) is not reached, the power of the fourth lens group becomes too weak, and so there is an increase in the amount of movement for field curvature correction and focusing, which works against making the lens barrel structurally compact. As the upper limit of 1.4 is exceeded, the power of the third lens group becomes weak. This renders it difficult to obtain effects on zooming, and works against obtaining high zoom ratios.

The second zoom lens according to the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$-23 < dt_{0.5dw} < -6.0 \tag{32}$$

where $dt_{0.5dw}$ is distortion in % of the maximum image height at the wide-angle end.

The advantage of, and the requirement for, the second zoom lens set up according to the second aspect of the invention is now explained.

With a zoom lens of the type having negative power at the front, that is, wherein the first lens group has negative refracting power, a zoom ratio of barely about 4 is obtainable.

The second zoom lens of the second aspect is a four-group zoom lens comprising, in order from its object side, the first lens group of positive refracting power, the second lens group of negative refracting power, the third lens group of positive refracting power and the fourth lens group of positive refracting power, and designed to attain a zoom ratio of at least about 8.

Upon zooming from the wide-angle end to the telephoto end, the respective lens groups move such that the air separation between the first lens group and the second lens group becomes wide, the air separation between the second lens group and the third lens group becomes narrow and the air separation between the third lens group and the fourth lens group becomes wide, so that both the second lens group and the third lens group share the zooming function of the zoom lens.

With such a lens group power profile and moving mode as described above, the first lens group is likely to increase in diameter. In other words, if the first lens group is comprised of three or more lenses, that group will never be slimmed down. Therefore, the first lens group is composed of up to two lenses.

To gain some zoom ratio at the second lens group, that group must be slimmed down while having power, thereby allowing for zooming space. Therefore, the second lens group is composed of two negative lenses and one positive lens.

The third lens group is composed of up to four lenses so as to give an image-formation function to it and slim down it while aberrations are well held back.

This zoom lens then satisfies the following condition with respect to distortion of the maximum image height at the wide-angle end.

$$-23 < dt_{0.5dw} < -6.0 \tag{32}$$

where $dt_{0.5dw}$ is distortion in % of the maximum image height at the wide-angle end. As the lower limit of −23 to condition (32) is not reached, it causes aberrations to be ill-balanced, ending up with underperformance. Otherwise, not only will much time be taken for correction by image processing, but also that correction will be difficult in itself. If the upper limit of −6.0 is exceeded, there will be an increase in the amount of chromatic aberrations occurring at the first lens group, which will come off underperformance.

More preferably, the lower limit to condition (32) should be set at −13.0, or the upper limit to condition (32) should be set at −9.0.

The third zoom lens according to the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, a double concave lens, an air separation, a negative lens, an air separation and a positive lens, and said third lens group comprises up to four lenses.

The advantage of, and the requirement for, the third zoom lens set up according to the second aspect of the invention is now explained.

With a zoom lens of the type having negative power at the front, that is, wherein the first lens group has negative refracting power, a zoom ratio of barely about 4 is obtainable.

The third zoom lens of the second aspect is a four-group zoom lens comprising, in order from its object side, the first lens group of positive refracting power, the second lens group of negative refracting power, the third lens group of positive refracting power and the fourth lens group of positive refracting power, and designed to attain a zoom ratio of at least about 8.

Upon zooming from the wide-angle end to the telephoto end, the respective lens groups move such that the air separation between the first lens group and the second lens group becomes wide, the air separation between the second lens group and the third lens group becomes narrow and the air separation between the third lens group and the fourth lens group becomes wide, so that both the second lens group and the third lens group share the zooming function of the zoom lens.

With such a lens group power profile and moving mode as described above, the first lens group is likely to increase in diameter. In other words, if the first lens group is comprised of three or more lenses, that group will never be slimmed down. Therefore, the first lens group is composed of up to two lenses.

To gain some zoom ratio at the second lens group, that group must be slimmed down while having power, thereby allowing for zooming space. The location of two air separations in the second lens group ensures that aberrations, whether axial or off-axial, are well corrected, and loads on the first and third lens groups are so lessened that their thickness can be decreased. Therefore, the second lens group is composed of, in order from its object side, a double-concave lens, an air separation, a negative lens, an air separation and a positive lens.

The third lens group is composed of up to four lenses so as to give an image-formation function to it and slim down it while aberrations are well held back.

The fourth zoom lens according to the second aspect of the invention is characterized in that the second lens group in the third zoom lens consists of, in order from its object side, said double-concave lens, an air separation, a double-concave lens as said negative lens, an air separation and said positive lens.

The advantage of, and the requirement for, the fourth zoom lens set up according to the second aspect of the invention is now explained. The use of two double-concave lenses in the second lens group and the location of an air separation between them ensure that aberrations are more easily corrected.

The fifth zoom lens according to the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$2.4<(\beta_{2t}/\beta_{2w})<5.7 \tag{33}$$

where:

$\beta_{2t}$ is the transverse magnification of the second lens group at the telephoto end, and $\beta_{2w}$ is the transverse magnification of the second lens group at the wide-angle end.

The advantage of, and the requirement for, the fifth zoom lens set up according to the second aspect of the invention is now explained.

With a zoom lens of the type having negative power at the front, that is, wherein the first lens group has negative refracting power, a zoom ratio of barely about 4 is obtainable.

The fifth zoom lens of the second aspect is a four-group zoom lens comprising, in order from its object side, the first lens group of positive refracting power, the second lens group of negative refracting power, the third lens group of positive refracting power and the fourth lens group of positive refracting power, and designed to attain a zoom ratio of at least about 8.

Upon zooming from the wide-angle end to the telephoto end, the respective lens groups move such that the air separation between the first lens group and the second lens group becomes wide, the air separation between the second lens group and the third lens group becomes narrow and the air separation between the third lens group and the fourth lens group becomes wide, so that both the second lens group and the third lens group share the zooming function of the zoom lens.

With such a lens group power profile and moving mode as described above, the first lens group is likely to increase in diameter. In other words, if the first lens group is comprised of three or more lenses, that group will never be slimmed down. Therefore, the first lens group is composed of up to two lenses.

To gain some zoom ratio at the second lens group, that group must be slimmed down while having power, thereby allowing for zooming space. Therefore, the second lens group is composed of two negative lenses and one positive lens.

The third lens group is composed of up to four lenses so as to give an image-formation function to it and slim down it while aberrations are well held back.

This zoom lens then satisfies the following condition with respect to the transverse magnification at the telephoto and wide-angle ends.

$$2.4<(\beta_{2t}/\beta_{2w})<5.7 \tag{33}$$

where:

$\beta_{2t}$ is the transverse magnification of the second lens group at the telephoto end, and $\beta_{2w}$ is the transverse magnification of the second lens group at the wide-angle end.

If the lower limit of 2.4 to condition (33) is not reached, a lot more zooming load will be applied to the third lens group, resulting in an increase in the amount of movement of the third lens group and, hence, an increased lens unit size. When a lot more zooming load is allocated to the fourth lens group, aberrations at the fourth lens group will grow large, resulting in under-performance. As the upper limit of 5.7 to condition (33) is exceeded, the power of the second lens group grows large, resulting in a lot more aberrations leading to underperformance. Otherwise, there is an increase in the amount of movement of the second lens group, which in turn causes incident light rays to have height at the wide-angle end, incurring an increase in the lens diameter of the first lens group.

More preferably, the upper limit to condition (33) should be set at 3.5.

The sixth zoom lens according to the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group comprises up to two lenses, said second lens group consists of, in order from its object side, two negative lenses and one positive lens, said third lens group comprises up to four lenses, and said zoom lens satisfies the following condition:

$$0.01<f_1/f_t<1.00 \tag{34}$$

where:

$f_1$ is the focal length of the first lens group, and $f_t$ is the focal length of the zoom lens system at the telephoto end.

The advantage of, and the requirement for, the sixth zoom lens set up according to the second aspect of the invention is now explained.

With a zoom lens of the type having negative power at the front, that is, wherein the first lens group has negative refracting power, a zoom ratio of barely about 4 is obtainable.

The fifth zoom lens of the second aspect is a four-group zoom lens comprising, in order from its object side, the first lens group of positive refracting power, the second lens group of negative refracting power, the third lens group of positive refracting power and the fourth lens group of positive refracting power, and designed to attain a zoom ratio of at least about 8.

Upon zooming from the wide-angle end to the telephoto end, the respective lens groups move such that the air separation between the first lens group and the second lens group becomes wide, the air separation between the second lens group and the third lens group becomes narrow and the air separation between the third lens group and the fourth lens group becomes wide, so that both the second lens group and the third lens group share the zooming function of the zoom lens.

With such a lens group power profile and moving mode as described above, the first lens group is likely to increase in diameter. In other words, if the first lens group is comprised of three or more lenses, that group will never be slimmed down. Therefore, the first lens group is composed of up to two lenses.

To gain some zoom ratio at the second lens group, that group must be slimmed down while having power, thereby allowing for zooming space. Therefore, the second lens group is composed of two negative lenses and one positive lens.

The third lens group is composed of up to four lenses so as to give an image-formation function to it and slim down it while aberrations are well held back.

This zoom lens then satisfies the following condition:

$$0.01 < f_1/f_t < 1.00 \quad (34)$$

where:
$f_1$ is the focal length of the first lens group, and
$f_t$ is the focal length of the zoom lens system at the telephoto end.

If the lower limit to condition (34) is less than 0.01, the amount of aberrations produced at the first lens group will grow too large to obtain satisfactory image-formation capability. Exceeding the upper limit of 1.00 to condition (34) will render zooming at the second and third lens groups difficult while keeping compactness.

More preferably, the lower limit to condition (34) should be set at 0.2, especially 0.7.

More preferably, the upper limit to condition (34) should be set at 0.9.

The seventh zoom lens according to the second aspect of the invention is a four-group zoom lens comprising, in order from its object side, a first lens group of positive refracting power, a second lens group of negative refracting power, a third lens group of positive refracting power and a fourth lens group of positive refracting power, characterized in that:

upon zooming from the wide-angle end to the telephoto end of the zoom lens, said first lens group, said second lens group, said third lens group and said fourth lens group are each operable to move such that:

the air separation between said first lens group and said second lens group becomes wide, the air separation between said second lens group and said third lens group becomes narrow, and the air separation between said third lens group and said fourth lens group becomes wide, said first lens group consists of, in order from its object side, one negative lens and one positive lens, said second lens group consists of, in order from its object side, a double-concave lens, an air separation, a negative lens, an air separation and a positive lens, said third lens group comprises up to four lenses, and said zoom lens satisfies the following conditions:

$$0.3 < f_3/f_4 < 1.4 \quad (31)$$

$$-23 < dt_{0.5dw} < -6.0 \quad (32)$$

$$2.4 < (\beta_{2t}/\beta_{2w}) < 5.7 \quad (33)$$

$$0.01 < f_1/f_t < 1.00 \quad (34)$$

where:
$f_1$ is the focal length of the first lens group,
$f_3$ is the focal length of the third lens group,
$f_4$ is the focal length of the fourth lens group,
$f_t$ is the focal length of the zoom lens system at the telephoto end,
$dt_{0.5dw}$ is distortion in % of the maximum image height at the wide-angle end,
$\beta_{2t}$ is the transverse magnification of the second lens group at the telephoto end, and
$\beta_{2w}$ is the transverse magnification of the second lens group at the wide-angle end.

The advantage of, and the requirement for, the seventh zoom lens set up according to the second aspect of the invention is now explained.

It is more preferable to have some of the features of the above $1^{st}$ to $3^{rd}$ zoom lenses and the above $5^{th}$ to $6^{th}$ zoom lenses at the same time.

For instance, the features of the first zoom lens could be combined with those of the second zoom lens.

The features of the first zoom lens could be combined with those of the third zoom lens.

The features of the first zoom lens could be combined with those of the fifth zoom lens.

The features of the first zoom lens could be combined with those of the sixth zoom lens.

The features of the second zoom lens could be combined with those of the third zoom lens.

The features of the second zoom lens could be combined with those of the fifth zoom lens.

The features of the second zoom lens could be combined with those of the sixth zoom lens.

The features of the third zoom lens could be combined with those of the fifth zoom lens.

The features of the third zoom lens could be combined with those of the sixth zoom lens.

The features of the fifth zoom lens could be combined with those of the sixth zoom lens.

The seventh zoom lens is particularly preferable because of being a four-group zoom lens having all the features of the first to third zoom lenses and the fifth to sixth zoom lenses.

The eighth zoom lens according to the second aspect of the invention is characterized in that any one of the $1^{st}$ to $7^{th}$ zoom lenses satisfies the following condition:

$$0.01 < f_2/f_t < 0.2 \quad (35)$$

where:

f$_2$ is the focal length of the second lens group, and f$_t$ is the focal length of the zoom lens system at the telephoto end.

The advantage of, and the requirement for, the 8$^{th}$ zoom lens set up according to the second aspect of the invention is now explained. If the lower limit to condition (35) is less than 0.01, the amount of aberrations produced at the second lens group will grow too large to obtain satisfactory image-formation capability. If the upper limit is greater than 0.2, the amount of zooming movement will grow large, resulting in an increased total length.

More preferably, the lower limit to condition (35) should be set at 0.1, especially 0.15.

The 9$^{th}$ zoom lens according to the second aspect of the invention is characterized in that any one of the 1$^{st}$ to 8$^{th}$ zoom lenses satisfies the following condition:

$$0.01 < f_3/f_t < 0.3 \quad (36)$$

where:

f$_3$ is the focal length of the third lens group, and f$_t$ is the focal length of the zoom lens system at the telephoto end.

The advantage of, and the requirement for, the 9$^{th}$ zoom lens set up according to the second aspect of the invention is now explained. If the lower limit to condition (36) is less than 0.01, the amount of aberrations occurring at the third lens group will grow too large to obtain satisfactory image-formation capability and sufficient back focus. If the upper limit is greater than 0.3, the zooming function of the third lens group will wane, leading to an increased total length upon zooming to the telephoto side. In addition, large fluctuations of the exit pupil position will cause large fluctuations of the angle of incidence of light on an image pickup device such as a CCD at an off-axial image plane position, adversely affecting shading.

More preferably, the lower limit to condition (36) should be set at 0.1, especially 0.2.

The 10$^{th}$ zoom lens according to the second aspect of the invention is characterized in that any one of the 1$^{st}$ to 9$^{th}$ zoom lenses satisfies the following condition:

$$0.01 < f_4/f_t < 0.55 \quad (37)$$

where:

f$_4$ is the focal length of the fourth lens group, and f$_t$ is the focal length of the zoom lens system at the telephoto end.

The advantage of, and the requirement for, the 10$^{th}$ zoom lens set up according to the second aspect of the invention is now explained. If the lower limit to condition (37) is less than 0.01, the amount of aberrations occurring at the fourth lens group will grow large to obtain satisfactory image-formation capability. If the upper limit is greater than 0.55, the focal length of the fourth lens group will increase, rendering zooming difficult while maintaining compactness.

More preferably, the lower limit to condition (37) should be set at 0.1, especially 0.25, or the upper limit to condition (37) should be set at 0.4.

The 11$^{th}$ zoom lens according to the second aspect of the invention is characterized in that any one of the 1$^{st}$ to 10$^{th}$ zoom lenses satisfies the following condition:

$$0.5 < L_t/f_t < 1.5 \quad (38)$$

where:

L$_t$ is the axial total length of the zoom lens from its entrance surface to the image plane at the telephoto end, and f$_t$ is the focal length of the zoom lens system at the telephoto end.

The advantage of, and the requirement for, the 11$^{th}$ zoom lens set up according to the second aspect of the invention is now explained. If the lower limit of 1.5 to condition (38) is not reached or satisfied, the space between the first lens group and the second lens group, and between the third lens group and the fourth lens group will become narrow, failing to ensure the space necessary for zooming. If the upper limit of 1.5 is exceeded, the total length of the zoom lens at the telephoto end will become long, rendering the lens unit bulky.

The 12$^{th}$ zoom lens according to the second aspect of the invention is characterized in that any one of the 1$^{st}$ to 11$^{th}$ zoom lenses satisfies the following condition:

$$2.20 < \Delta_{t1g}/f_w < 5.0 \quad (39)$$

where:

$\Delta_{t1g}$ is the difference in the position of the first lens group between at the wide-angle end and at the telephoto end, and f$_w$ is the focal length of the zoom lens system at the wide-angle end.

The advantage of, and the requirement for, the 12$^{th}$ zoom lens set up according to the second aspect of the invention is now explained. As the lower limit of 2.20 to condition (39) is not reached, it causes incident light rays to gain height at the wide-angle end, incurring an increase in the lens diameter of the first lens group or failing to ensure the space necessary for zooming. As the upper limit of 5.0 is exceeded, it causes the total length of the zoom lens to become long at the telephoto end, resulting in an increased lens unit size.

The 13$^{th}$ zoom lens according to the second aspect of the invention is characterized in that any one of the 1$^{st}$ to 12$^{th}$ zoom lenses satisfies the following condition:

$$8.0 < (D_{1t} + D_{2w})/f_w < 10.0 \quad (40)$$

where:

D$_{1t}$ is the air separation between the first lens group and the second lens group at the telephoto end, D$_{2w}$ is the air separation between the second lens group and the third lens group at the wide-angle end, and f$_w$ is the focal length of the zoom lens system at the wide-angle end.

The advantage of, and the requirement for, the 13$^{th}$ zoom lens set up according to the second aspect of the invention is now explained. Falling short of the lower limit of 8.0 to condition (40) will be unable to ensure the space necessary for zooming, and exceeding the upper limit of 10.0 will cause an increase in the whole length of the zoom lens system at the telephoto end, ending up with an increased lens unit size.

The 14$^{th}$ zoom lens according to the second aspect of the invention is characterized in that any one of the 1$^{st}$ to 13$^{th}$ zoom lenses satisfies the following condition:

$$1.05 < (\beta_{2t}/\beta_{2w})/(\beta_{3t}/\beta_{3w}) < 5.7 \quad (41)$$

where:

$\beta_{2t}$ is the transverse magnification of the second lens group at the telephoto end, $\beta_{2w}$ is the transverse magnification of the second lens group at the wide-angle end, $\beta_{3t}$ is the transverse magnification of the third lens group at the telephoto end, and $\beta_{3w}$ is the transverse magnification of the third lens group at the wide-angle end.

The advantage of, and the requirement for, the 14$^{th}$ zoom lens set up according to the second aspect of the invention is now explained. If the lower limit of 1.05 to condition (41) is not reached, a lot more zooming load will be applied to the third lens group, resulting in an increase in the amount of movement of the third lens group and, hence, an increased lens unit size. When a lot more zooming load is allocated to the fourth lens group, aberrations at the fourth lens group will grow large, resulting in underperformance. As the upper limit of 5.7 is exceeded, the power of the second lens group grows large, resulting in a lot more aberrations leading to underperformance. Otherwise, there is an increase in the amount of movement of the second lens group, which in turn causes incident light rays to have height at the wide-angle end, incurring an increase in the lens diameter of the first lens group.

More preferably, the upper limit to condition (41) should be set at 3.5.

The 15$^{th}$ zoom lens according to the second aspect of the invention is characterized in that any one of the 1$^{st}$ to 14$^{th}$ zoom lenses satisfies the following condition:

$$0.82 < \Sigma d_{1g}/f_w < 1.5 \tag{42}$$

where:

$\Sigma d_{1g}$ is the axial thickness of the first lens group, and $f_w$ is the focal length of the zoom lens system at the wide-angle end.

The advantage of, and the requirement for, the 15$^{th}$ zoom lens set up according to the second aspect of the invention is now explained. As the axial thickness of the first lens group is less than the lower limit of 0.82 to condition (42), it renders zooming at the second and third lens groups difficult while maintaining compactness. Otherwise, it is difficult to ensure lens edge thickness. As the axial thickness of the first lens group is greater than the upper limit of 1.5, it causes the zoom lens to become thick upon received at a collapsible lens mount.

More preferably, the lower limit to condition (42) should be set at 0.85, or the upper limit to condition (42) should be set at 1.1.

The 16$^{th}$ zoom lens according to the second aspect of the invention is characterized in that any one of the 1$^{st}$ to 15$^{th}$ zoom lenses satisfies the following condition:

$$0.05 < \Sigma d_{2g}/f_t < 0.15 \tag{43}$$

where:

$\Sigma d_{2g}$ is the axial thickness of the second lens group, and $f_t$ is the focal length of the zoom lens system at the telephoto end.

The advantage of, and the requirement for, the 16$^{th}$ zoom lens set up according to the second aspect of the invention is now explained. As the axial thickness of the second lens group is less than the lower limit of 0.05 to condition (43), it renders zooming difficult while maintaining compactness. Otherwise, it is difficult to ensure lens edge thickness. As the axial thickness of the second lens group is greater than the upper limit of 0.15, it causes the zoom lens to become thick upon received at a collapsible lens mount.

More preferably, the lower limit to condition (43) should be set at 0.1.

The 17$^{th}$ zoom lens according to the second aspect of the invention is characterized in that any one of the 1$^{st}$ to 16$^{th}$ zoom lenses satisfies the following condition:

$$0.05 < \Sigma d_{3g}/f_t < 0.12 \tag{44}$$

where:

$\Sigma d_{3g}$ is the axial thickness of the third lens group, and $f_t$ is the focal length of the zoom lens system at the telephoto end.

The advantage of, and the requirement for, the 17$^{th}$ zoom lens set up according to the second aspect of the invention is now explained. As the axial thickness of the third lens group is less than the lower limit of 0.05 to condition (44), it renders zooming difficult while maintaining compactness. Otherwise, it is difficult to ensure lens edge thickness. As the axial thickness of the third lens group is greater than the upper limit of 0.12, it causes the zoom lens to become thick upon received at a collapsible lens mount.

More preferably, the lower limit to condition (44) should be set at 0.1.

The 18$^{th}$ zoom lens according to the second aspect of the invention is characterized in that any one of the 1$^{st}$ to 17$^{th}$ zoom lenses satisfies the following condition:

$$0.1 < \Sigma d/f_t < 0.43 \tag{45}$$

where:

$\Sigma d$ is the total axial thickness of the first lens group, the second lens group, the third lens group and the fourth lens group, and $f_t$ is the focal length of the zoom lens system at the telephoto end.

The advantage of, and the requirement for, the 18$^{th}$ zoom lens set up according to the second aspect of the invention is now explained. As $\Sigma d$ is less than the lower limit of 0.1 to condition (45), it renders zooming difficult while maintaining compactness. Otherwise, it is difficult to ensure lens edge thickness. As $\Sigma d$ is greater than the upper limit of 0.43, it causes the zoom lens to become thick upon received at a collapsible lens mount.

More preferably, the lower limit to condition (45) should be set at 0.2, especially 0.3, or the upper limit of 0.4 to condition (45) should be set at 0.4.

The 19$^{th}$ zoom lens according to the second aspect of the invention is characterized in that the number of the negative lens in the first lens group in any one of the 1$^{st}$ to 18$^{th}$ zoom lenses is 1, wherein said negative lens satisfies the following condition:

$$n_d \geq 1.90 \tag{46}$$

where $n_d$ is the d-line refractive index of the material of the negative lens in the first lens group.

Referring to the advantage of, and the requirement for, the 19$^{th}$ zoom lens set up according to the second aspect of the invention, falling short of the lower limit of 1.90 to condition (46) will render correction of chromatic aberrations difficult.

The 20$^{th}$ embodiment of the second aspect of the invention is an electronic imaging system, characterized by comprising a zoom lens as recited in any one of the 1$^{st}$ to 19$^{th}$ embodiments according to the second aspect of the invention and an electronic image pickup device located on its image side to convert an optical image to electric signals.

The advantage of, and the requirement for, the electronic imaging system set up according to the 20$^{th}$ embodiment according to the second aspect of the invention is now explained. The zoom lens according to the second aspect of the invention is favorable to have high zoom ratios while the exit pupil is spaced away from the image plane. Therefore, as this zoom lens is incorporated in an imaging system using an image pickup device for converting an optical image to electric signals such as CCD or C-MOS, it makes the imaging system less susceptible of chromatic shading.

The above zoom lens is reduced in length upon received at a collapsible lens mount, and has improved performance and high zoom ratios. Therefore, if such a zoom lens is used as an imaging optical system on an imaging system, it is then possible to achieve size reductions and multi-functional performance. Notice here that the imaging system could be embodied in the form of not only digital cameras but also video cameras, digital video units or the like.

The zoom lenses of the invention, if used in any desired combination, can provide more favorable advantages. Throughout the conditions described above, only the upper or lower limits to the narrower conditions could be applied as the upper or lower limits to the broader conditions.

With the above conditions applied in any desired combinations, the advantages of the invention could be more enhanced.

With the invention described above, it is possible to obtain a zoom lens that is much more reduced in thickness upon housed in (or received at) a collapsible lens mount and has a high zoom ratio all over the zooming range and very stable image-formation capabilities, and an imaging system incorporating such a zoom lens.

Next, the zoom lens of the invention is explained with reference to Examples 1 to 12. FIGS. 1 to 12 are illustrative in lens arrangement sections of Examples 1 to 12 in the wide-angle ends (a), in the intermediate settings (b) and at the telephoto ends (c), respectively, upon focusing on an infinite object point. Throughout the drawings, the first lens group is indicated by G1, the second lens group by G2, the aperture stop by S, the third lens group by G3, the fourth lens group by G4, the plane-parallel plate that forms a low-pass filter applied with an IR cut coating, etc. by F, the plane-parallel plate for the cover glass of the electronic image pickup device by C, and the image plane by I. Notice here that the cover glass C could be provided on its surface with a wavelength range-limiting multilayer film, or it could have a low-pass filter function.

EXAMPLE 1

Figure 1B:
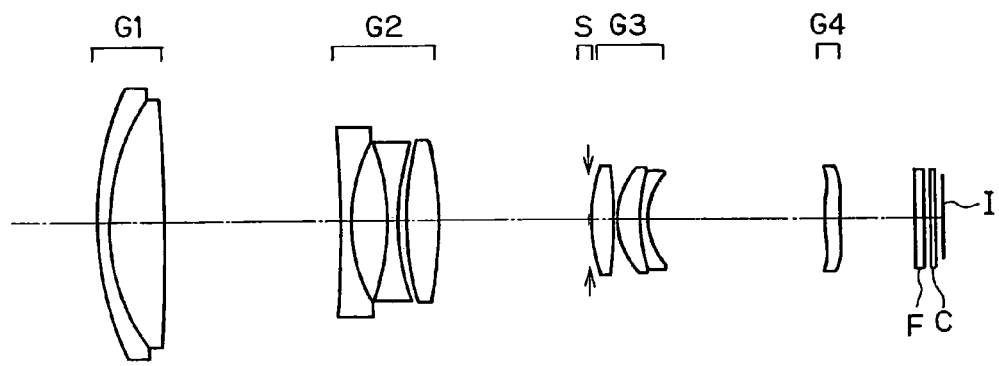
Figure 1C:
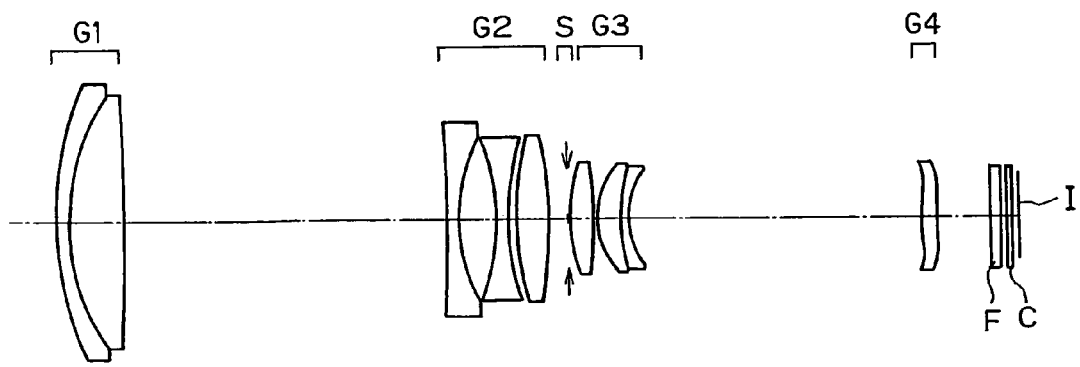

As shown in FIG. 1(*a-c*), this example is directed to a zoom lens made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves in a convex locus toward the image side of the zoom lens and is positioned nearer to the object side at the telephoto end than at the wide-angle end; the second lens group G2 moves toward the image side; the aperture stop S and the third lens group G3 move in unison toward the object side; and the fourth lens group G4 moves in a convex locus toward the object side and is positioned nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one positive meniscus lens convex on its object side.

Three aspheric surfaces are used: one at the object-side surface of the double-convex positive lens in the third lens group G3 and two at both surfaces of the positive meniscus lens that forms the fourth lens group G4.

EXAMPLE 2

Figure 2A:
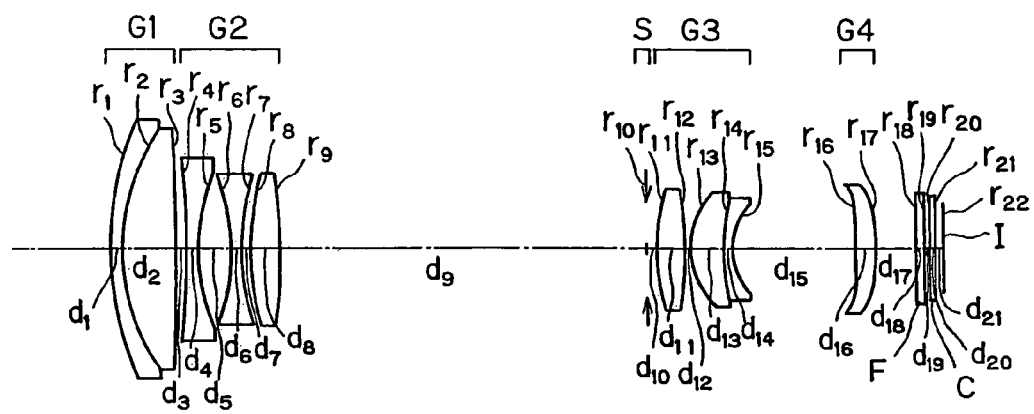
FIG. 2 is illustrative of Example 2 of the zoom lens according to the invention, as in FIG. 1.
Figure 2B:
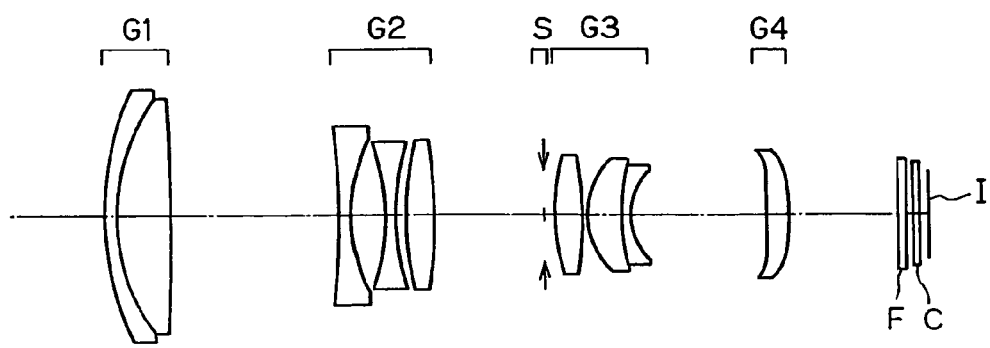
Figure 2C:
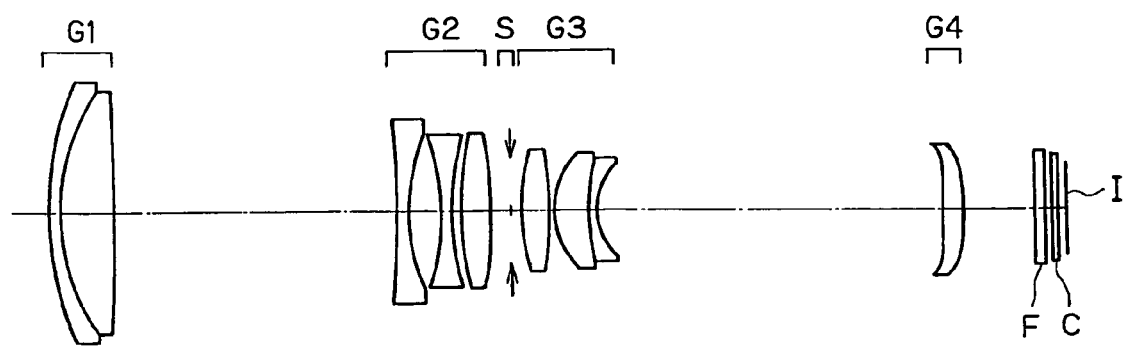

As shown in FIG. 2(*a-c*), this example is directed to a zoom lens made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves in a convex locus toward the image side of the zoom lens and is positioned nearer to the object side at the telephoto end than at the wide-angle end; the second lens group G2 moves in a convex locus toward the image side with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Three aspheric surfaces are used: one at the object-side surface of the double-convex positive lens in the third lens group G3 and two at both surfaces of the double-convex positive lens that forms the fourth lens group G4.

EXAMPLE 3

Figure 3A:
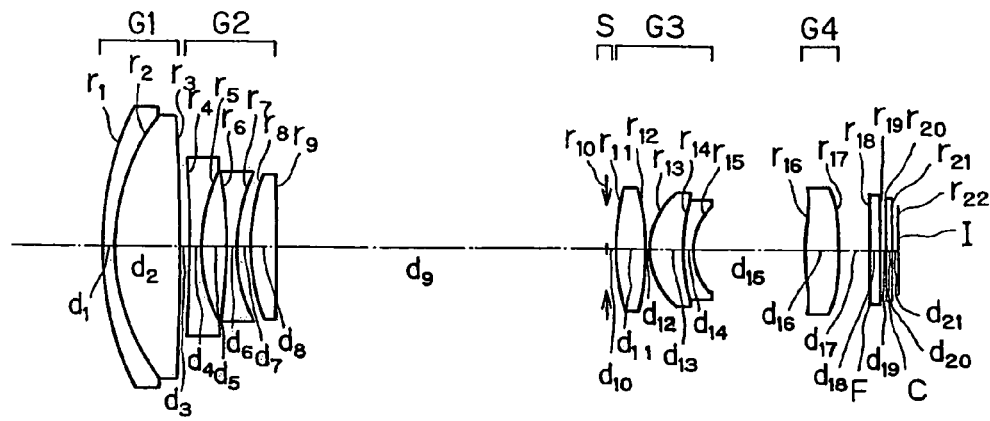
FIG. 3 is illustrative of Example 3 of the zoom lens according to the invention, as in FIG. 1.
Figure 3B:
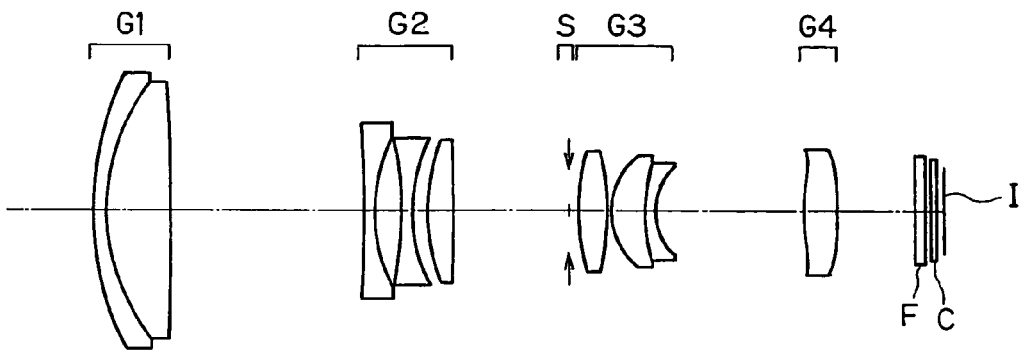
Figure 3C:
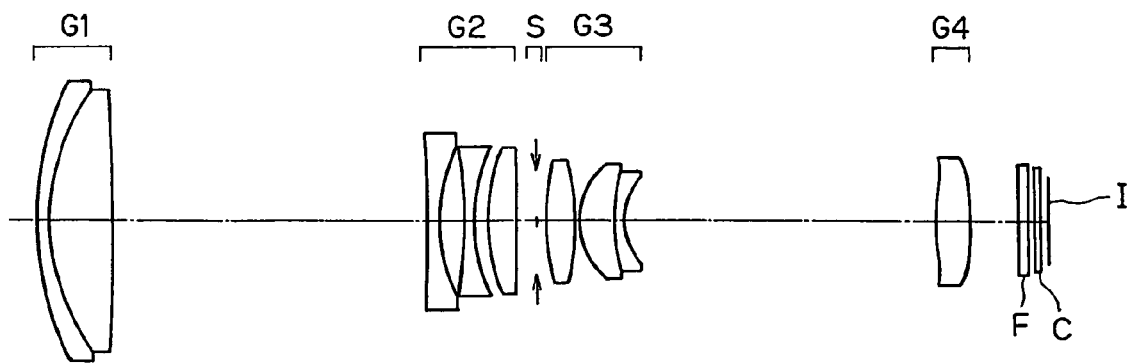

As shown in FIG. 3(*a-c*), this example is directed to a zoom lens made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves to the object side; the second lens group G2 moves in a convex locus toward the image side with a widening space between the first lens group G1 and it and is positioned nearer the image side at the telephoto end than at the wide-angle end; the aperture stop S and the third lens group G3 move in unison toward the object side; and the fourth lens group G4 moves in a convex locus toward the object side and is positioned nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Four aspheric surfaces are used: two at both surfaces of the double-convex positive lens in the third lens group G3 and two at both surfaces of the double-convex positive lens that forms the fourth lens group G4.

EXAMPLE 4

Figure 4A:
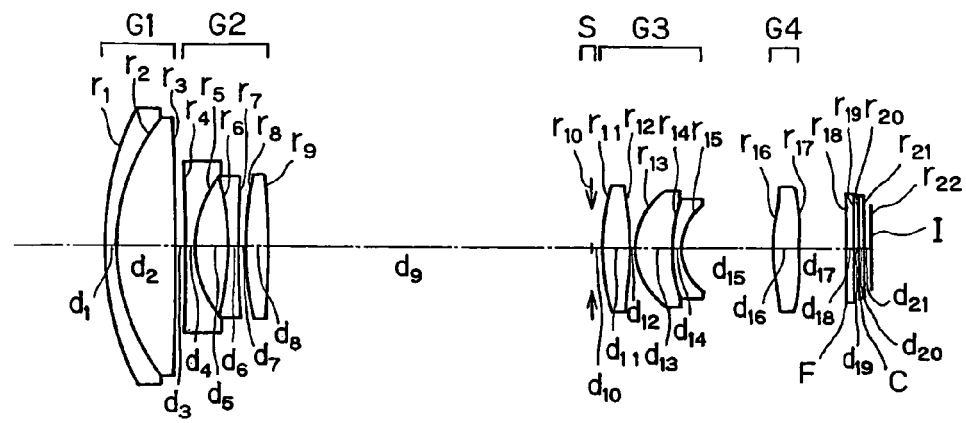
FIG. 4 is illustrative of Example 4 of the zoom lens according to the invention, as in FIG. 1.
Figure 4B:
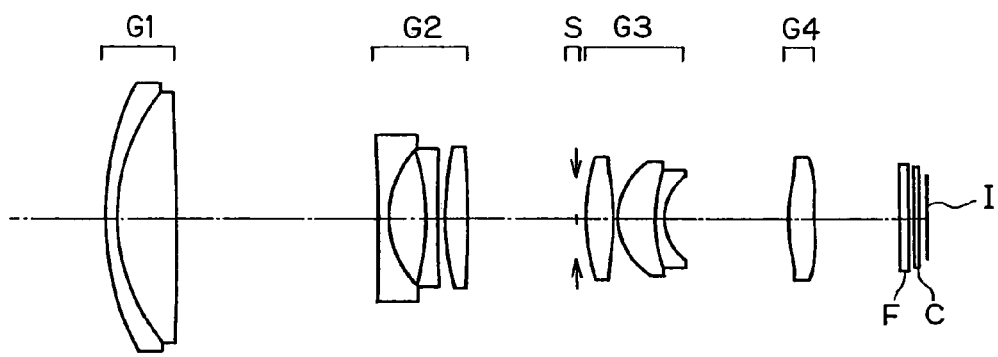
Figure 4C:
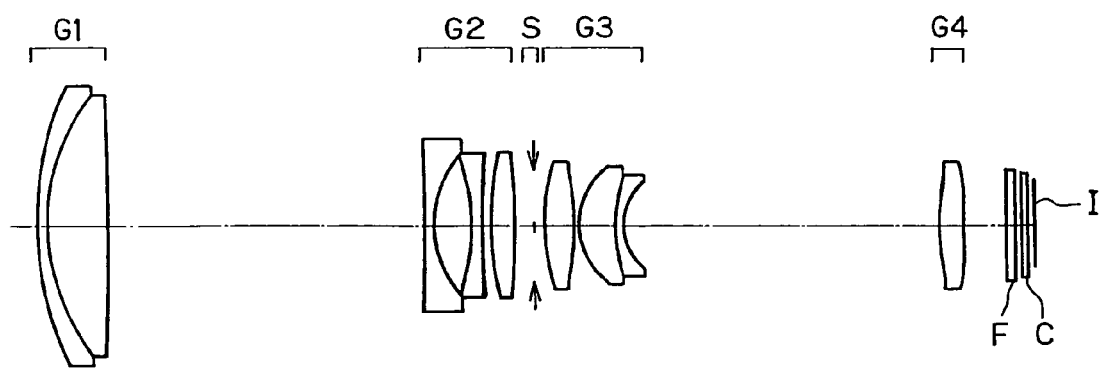

As shown in FIG. 4(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the image side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Four aspheric surfaces are used: two at both surfaces of the double-convex positive lens in the third lens group G3 and two at both surfaces of the double-convex positive lens that forms the fourth lens group G4.

EXAMPLE 5

Figure 5A:
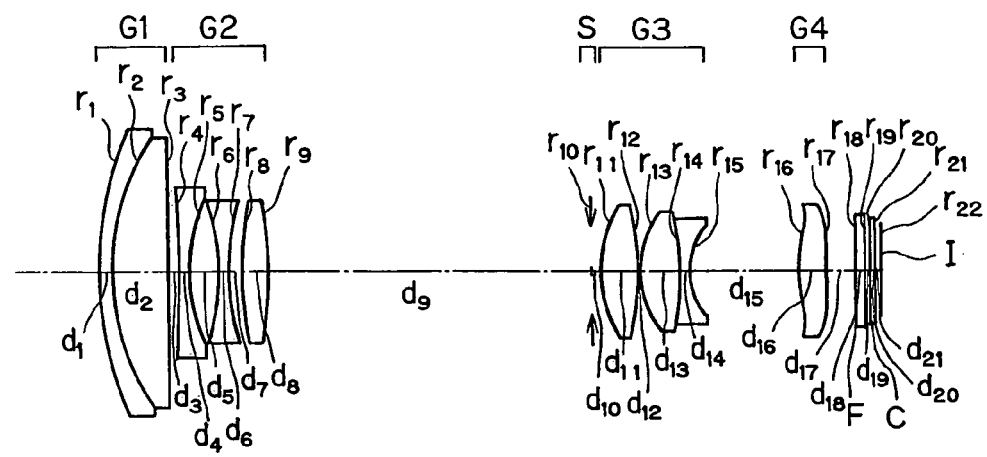
FIG. 5 is illustrative of Example 5 of the zoom lens according to the invention, as in FIG. 1.
Figure 5B:
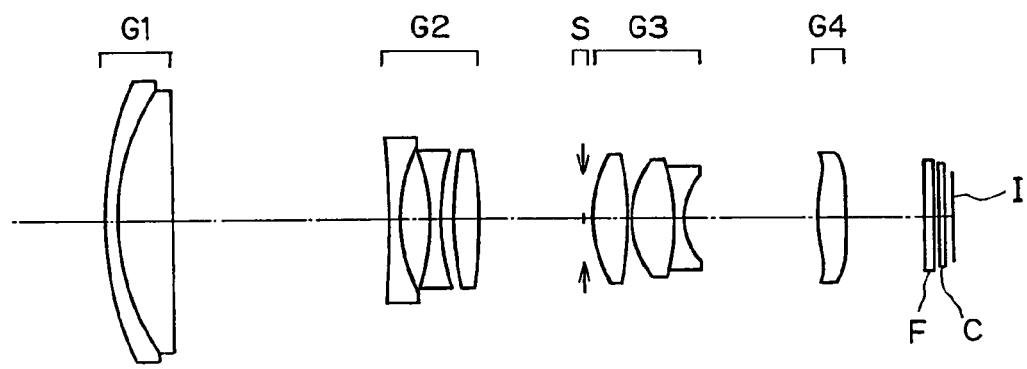
Figure 5C:
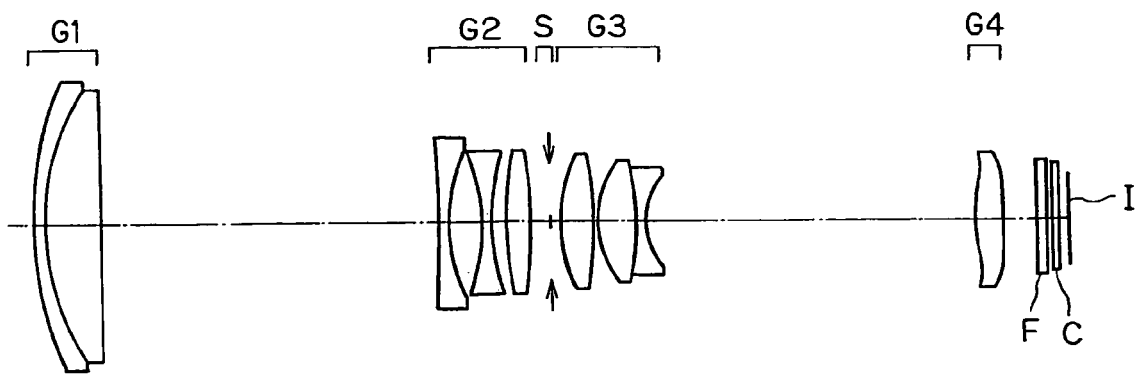

As shown in FIG. 5(a-c), this example is directed to a zoom made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a double-convex positive lens and a double-concave negative lens; and the fourth lens group G4 is composed of one positive meniscus lens convex on its object side.

Four aspheric surfaces are used: two at both surfaces of the double-convex positive lens in the third lens group G3 and two at both surfaces of the positive meniscus lens that forms the fourth lens group G4.

EXAMPLE 6

Figure 6A:
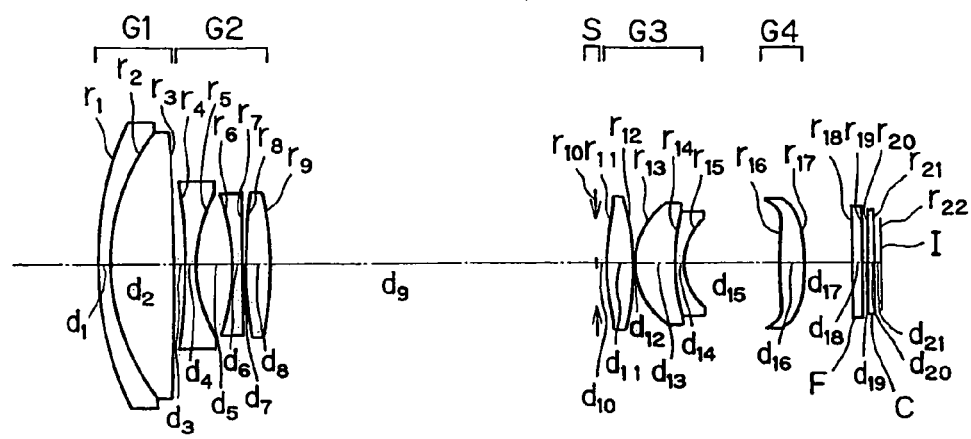
FIG. 6 is illustrative of Example 6 of the zoom lens according to the invention, as in FIG. 1.
Figure 6B:
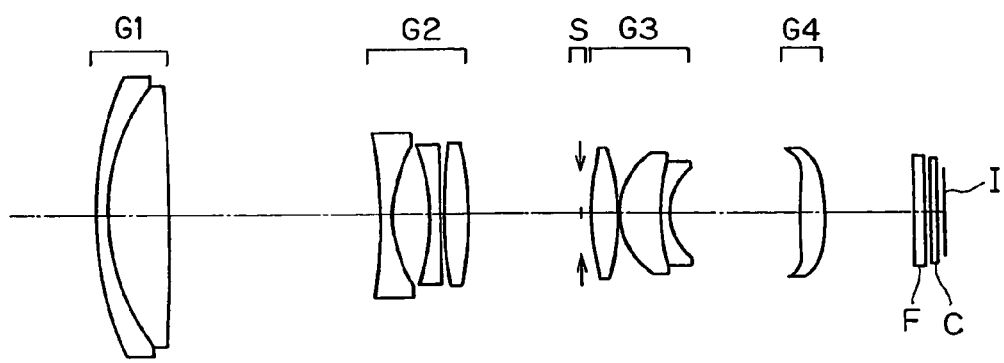
Figure 6C:
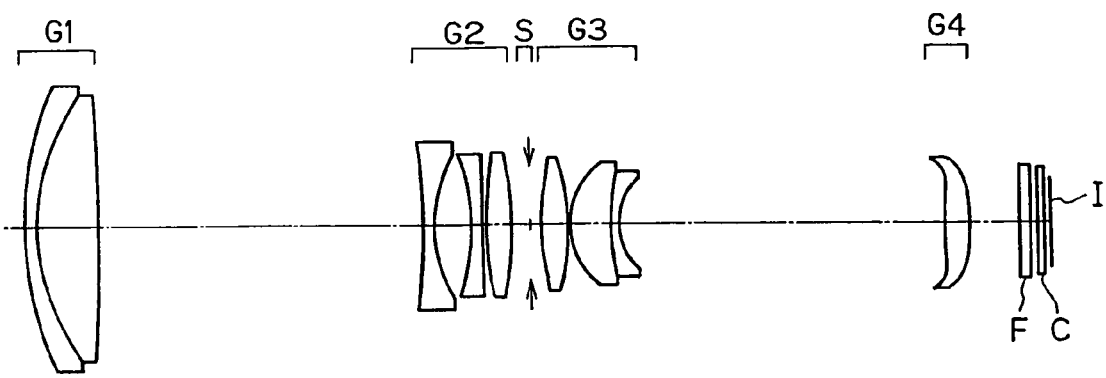

As shown in FIG. 6(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Four aspheric surfaces are used: two at both surfaces of the double-convex positive lens in the third lens group G3 and two at both surfaces of the double-convex positive lens that forms the fourth lens group G4.

EXAMPLE 7

Figure 7A:
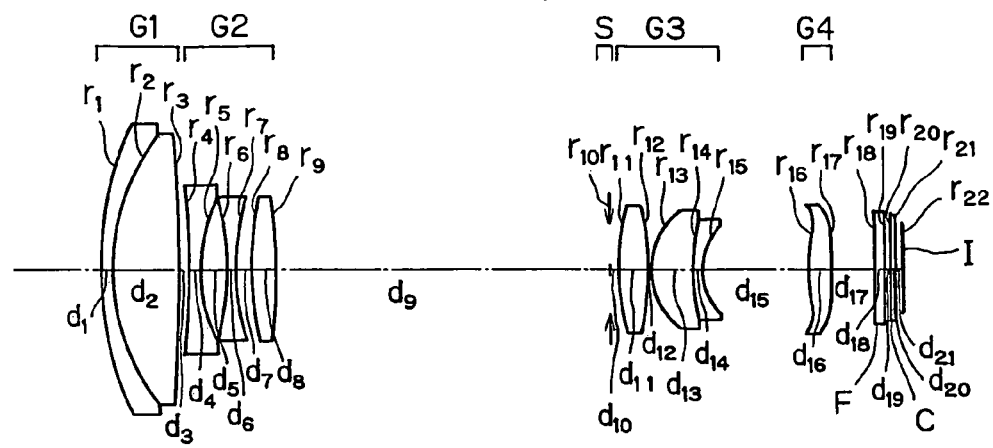
FIG. 7 is illustrative of Example 7 of the zoom lens according to the invention, as in FIG. 1.
Figure 7B:
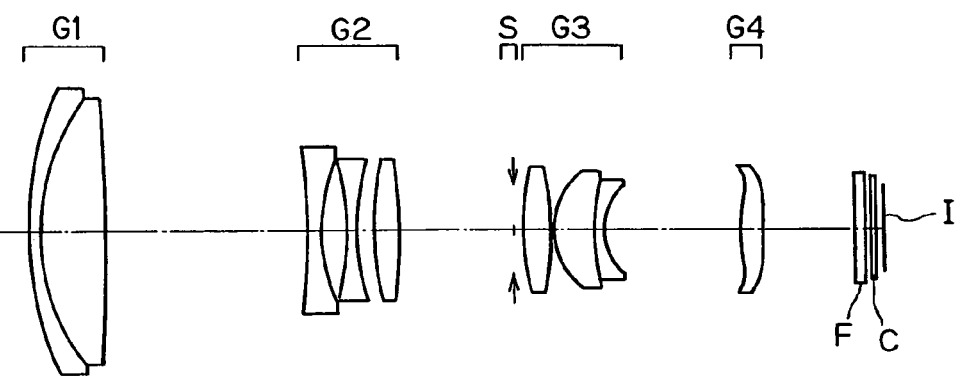
Figure 7C:
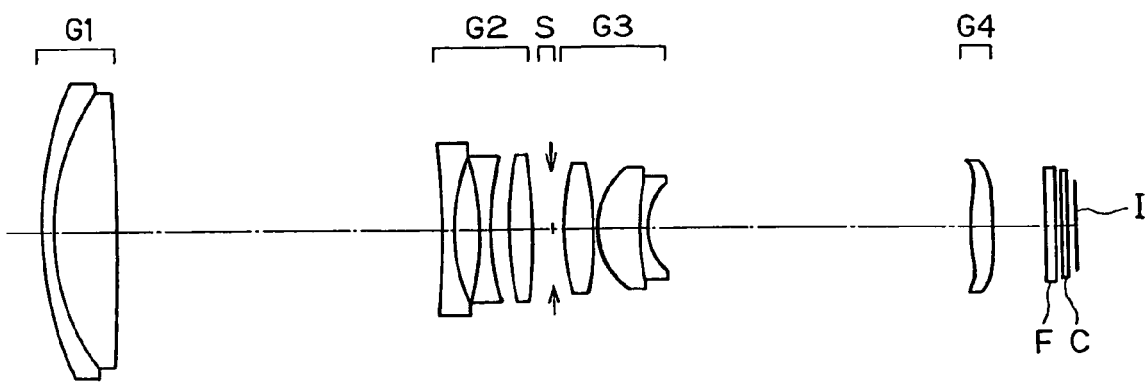

As shown in FIG. 7(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the object side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Four aspheric surfaces are used: two at both surfaces of the double-convex positive lens in the third lens group G3 and two at both surfaces of the double-convex positive lens that forms the fourth lens group G4.

EXAMPLE 8

Figure 8A:
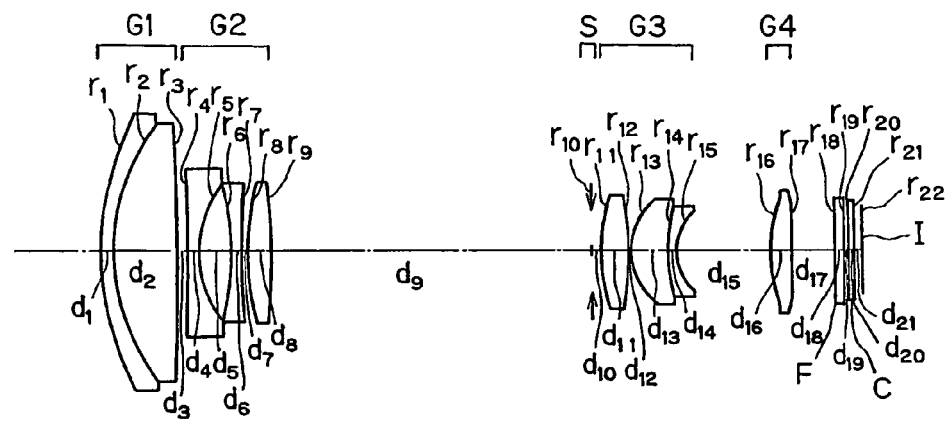
FIG. 8 is illustrative of Example 8 of the zoom lens according to the invention, as in FIG. 1.
Figure 8B:
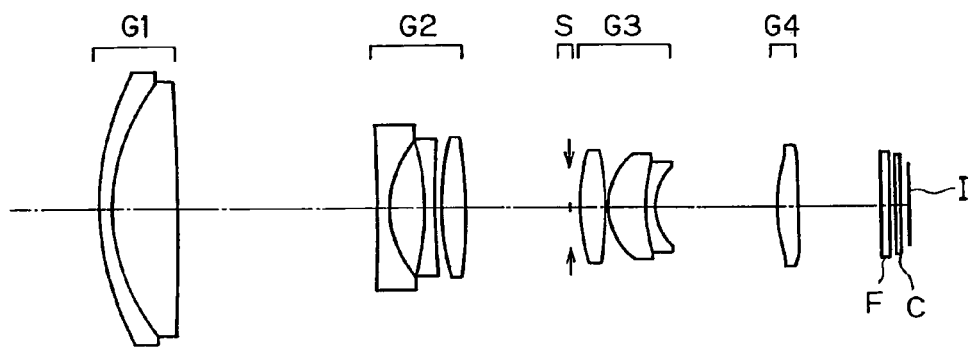
Figure 8C:
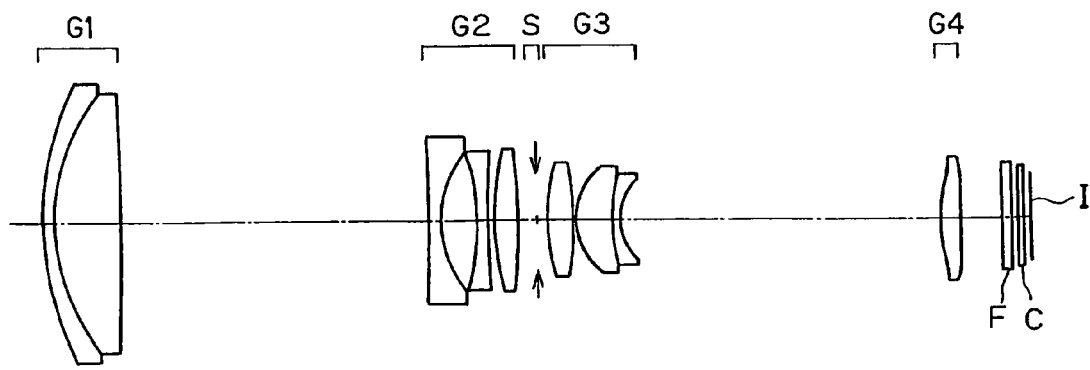

As shown in FIG. 8(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the image side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Four aspheric surfaces are used: two at both surfaces of the double-convex positive lens in the third lens group G3 and two at both surfaces of the double-convex positive lens that forms the fourth lens group G4.

EXAMPLE 9

Figure 9A:
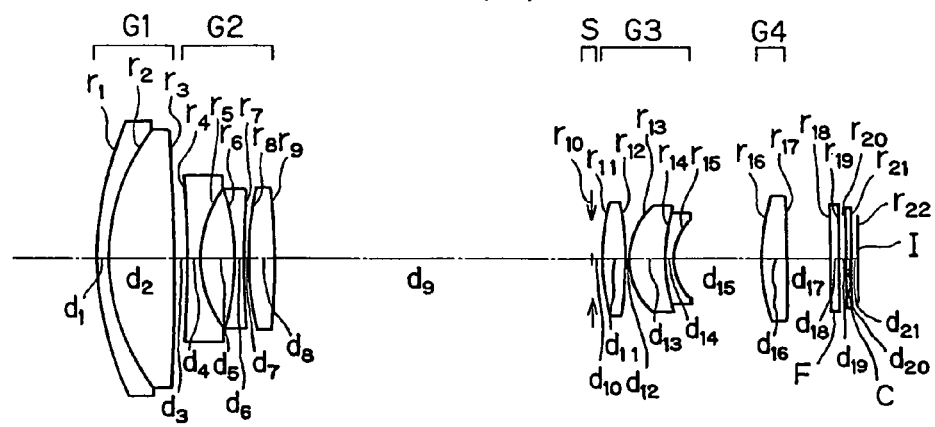
FIG. 9 is illustrative of Example 9 of the zoom lens according to the invention, as in FIG. 1.
Figure 9B:
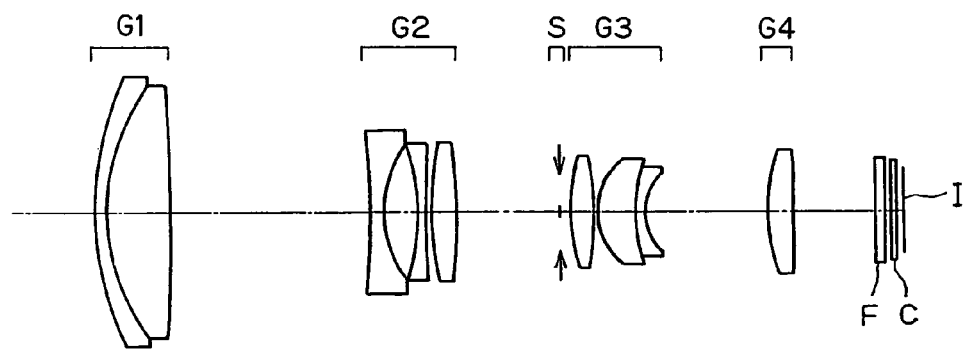
Figure 9C:
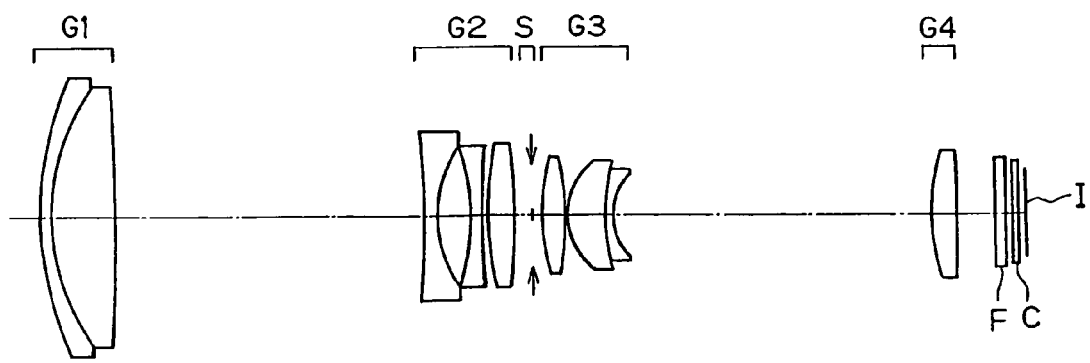

As shown in FIG. 9(a-c), this example is directed to a zoom made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned nearer to the image side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one positive meniscus lens convex on its object side.

Four aspheric surfaces are used: two at both surfaces of the double-convex positive lens in the third lens group G3 and two at both surfaces of the positive meniscus lens that forms the fourth lens group G4.

EXAMPLE 10

Figure 10A:
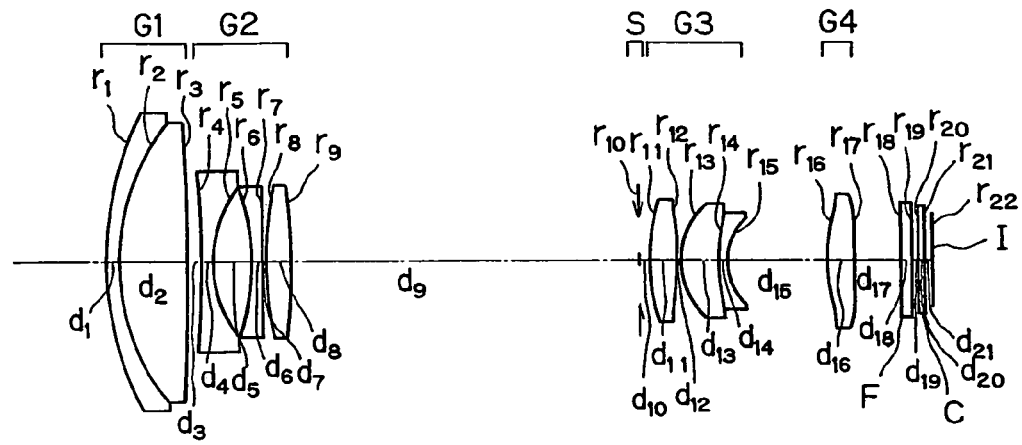
FIG. 10 is illustrative of Example 10 of the zoom lens according to the invention, as in FIG. 1.
Figure 10B:
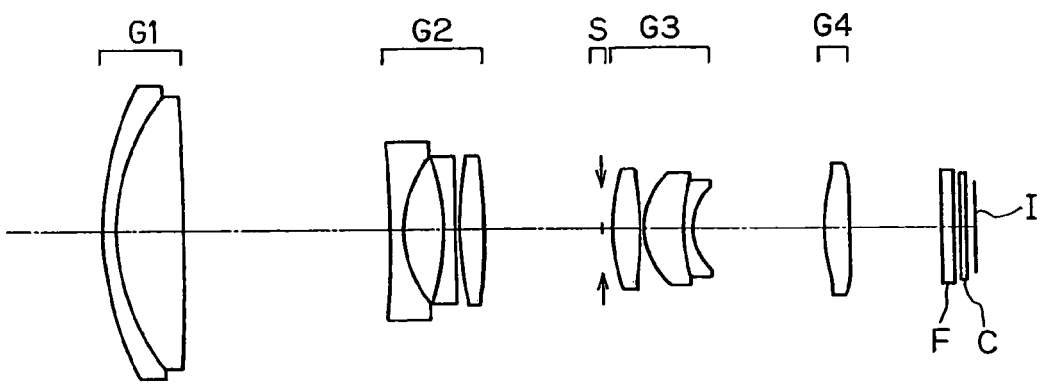
Figure 10C:
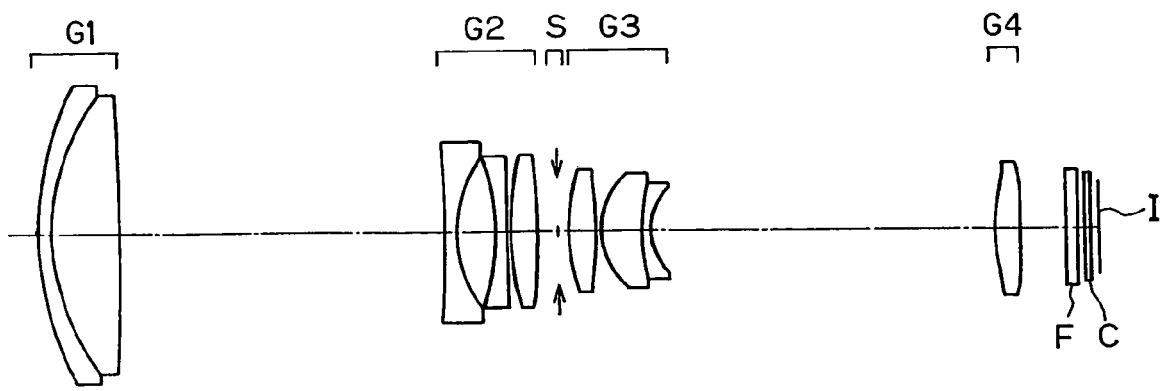

As shown in FIG. 10(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the image side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one positive meniscus lens convex on its object side.

Four aspheric surfaces are used: two at both surfaces of the double-convex positive lens in the third lens group G3 and two at both surfaces of the positive meniscus lens that forms the fourth lens group G4.

EXAMPLE 11

Figure 11A:
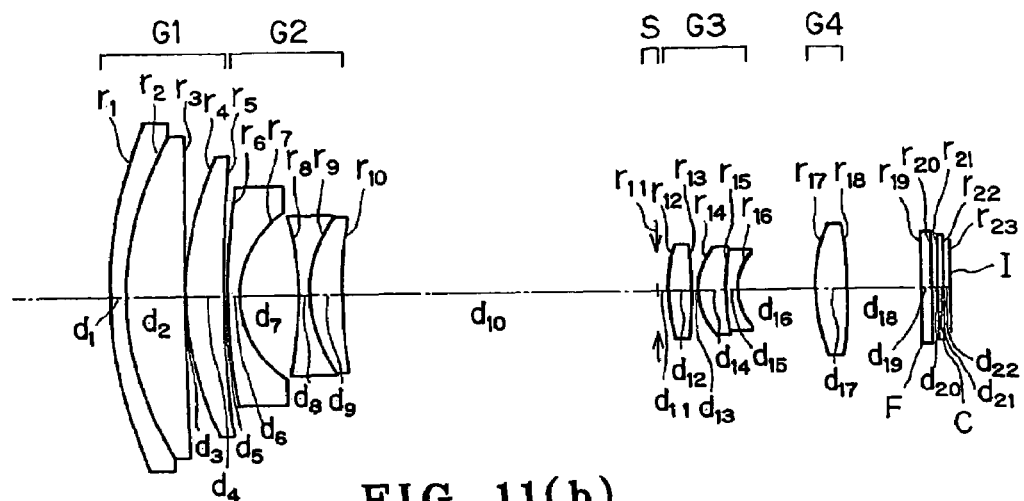
FIG. 11 is illustrative of Example 11 of the zoom lens according to the invention, as in FIG. 1.
Figure 11B:
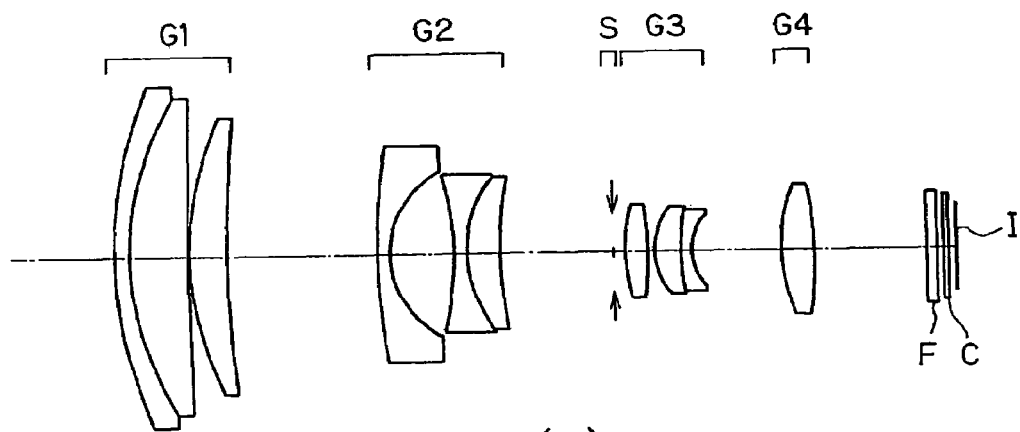
Figure 11C:
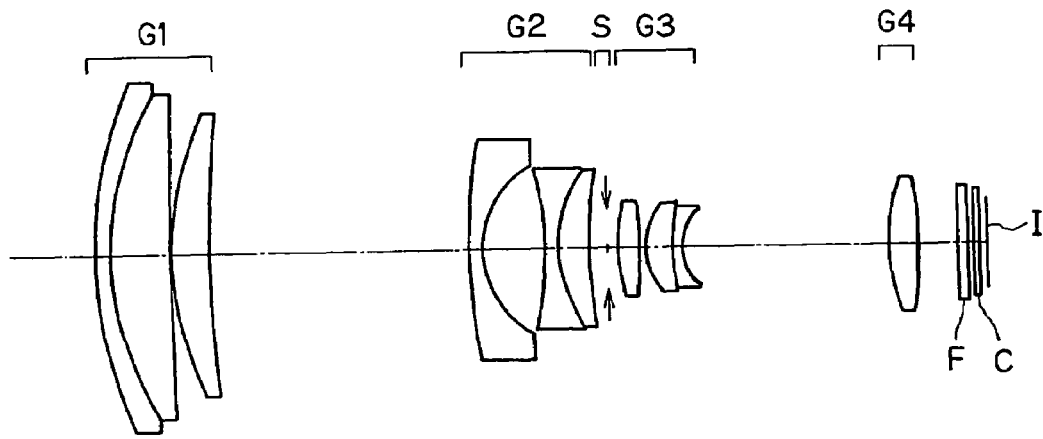

As shown in FIG. 11(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 remains substantially fixed from the wide-angle end to an intermediate setting and moves toward the object side from the intermediate setting to the telephoto end; the second lens group G2 moves toward the image side of the zoom lens; the aperture stop S and the third lens group G3 move in unison toward the object side; and the fourth lens group G4 moves in a convex locus toward the object side and is positioned somewhat nearer to the image side at the telephoto end than at the wide-angle end.

In order from the object side, the first lens group G1 is composed of a doublet consisting of a negative meniscus lens convex on its object side and a positive meniscus lens convex on its object side; the second lens group G2 is composed of a negative meniscus lens convex on its object side and a doublet consisting of a double-concave negative lens and a positive meniscus lens convex on its object side; the third lens group G3 is composed of a double-convex positive lens and a doublet consisting of a positive meniscus lens convex on its object side and a negative meniscus lens convex on its object side; and the fourth lens group G4 is composed of one double-convex positive lens.

Three aspheric surfaces are used: one at the object-side surface of the double-convex positive lens in the third lens group G3 and two at both surfaces of the double-convex positive lens that forms the fourth lens group G4.

EXAMPLE 12

Figure 12A:
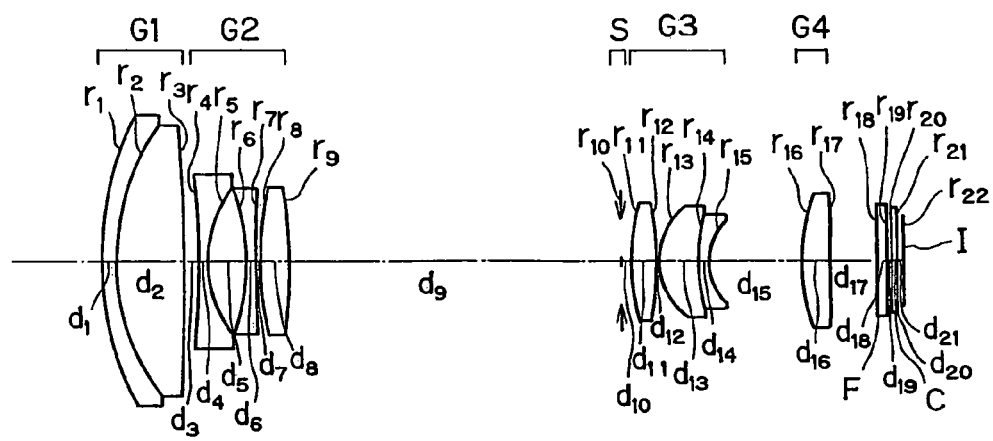
FIG. 12 is illustrative of Example 12 of the zoom lens according to the invention, as in FIG. 1.
Figure 12B:
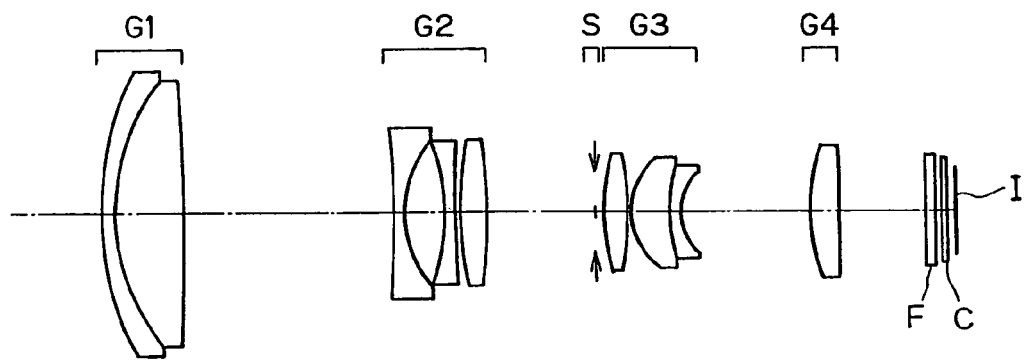
Figure 12C:
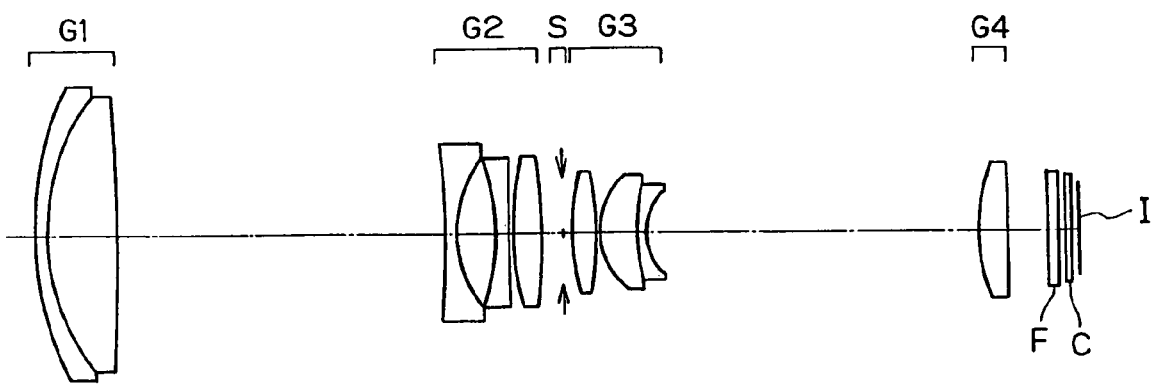

As shown in FIG. 12(a-c), this example is directed to a zoom lens made up of, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end of the zoom lens, the first lens group G1 moves toward the object side; the second lens group G2 moves in a convex locus toward the image side of the zoom lens with a widening space between the first lens group G1 and it and is positioned nearer to the image side at the telephoto end than at the wide-angle end; the aperture stop S and the third lens group G3 move in unison toward the object side; and the fourth lens group G4 moves in a convex locus toward the object side and is positioned somewhat nearer to the image side at the telephoto end than at the wide-angle end.

In order from the object side, the first lens group G1 is composed of a doublet consisting of a negative meniscus lens convex on its object side and a double-convex positive lens; the second lens group G2 is composed of two double-concave negative lenses and a double-convex positive lens; the third lens group G3 is composed of a double-convex positive lens and a doublet consisting of a positive meniscus lens convex on its object side and a negative meniscus lens convex on its object side; and the fourth lens group G4 is composed of one positive meniscus lens convex on its object side.

Four aspheric surfaces are used: two at both surfaces of the double-convex positive lens in the third lens group G3 and two at both surfaces of the double-convex positive lens that forms the fourth lens group G4.

Numerical data on Examples 1-12 are set out below. The symbols used hereinafter but not hereinbefore have the following meanings.

IH: image height,
f: focal length of the zoom lens system,
$F_{NO}$: F-number,
WE: wide-angle end,
ST: intermediate setting,
TE: telephoto end,
$r_1, r_2, \ldots$: radius of curvature of each lens surface,
$d_1, d_2, \ldots$: spacing between adjacent lens surfaces,
$n_{d1}, n_{d2}, \ldots$: d-line refractive index of each lens, and
$\nu_{d1}, \nu_{d2}, \ldots$: Abbe constant of each lens.

Here let x be an optical axis provided that the direction of travel of light is positive, and y be a direction orthogonal to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

Here r is a paraxial radius of curvature, K is a conical coefficient, and $A_4$, $A_6$, $A_8$ and $A_{10}$ are the fourth-, sixth-, eighth- and tenth-order aspheric coefficients, respectively.

EXAMPLE 1

| IH = 3.6 mm | | | |
|---|---|---|---|
| $r_1$ = 29.61 | $d_1$ = 1.0 | $n_{d1}$ = 1.90366 | $\nu_{d1}$ = 31.31 |
| $r_2$ = 19.42 | $d_2$ = 4.8 | $n_{d2}$ = 1.58913 | $\nu_{d2}$ = 61.14 |
| $r_3$ = −162.69 | $d_3$ = (Variable) | | |
| $r_4$ = −158.26 | $d_4$ = 0.9 | $n_{d3}$ = 1.883 | $\nu_{d3}$ = 40.76 |
| $r_5$ = 15.23 | $d_5$ = 3.1 | | |
| $r_6$ = −19.30 | $d_6$ = 0.9 | $n_{d4}$ = 1.883 | $\nu_{d4}$ = 40.76 |
| $r_7$ = 22.55 | $d_7$ = 0.6 | | |
| $r_8$ = 27.02 | $d_8$ = 2.7 | $n_{d5}$ = 1.92286 | $\nu_{d5}$ = 20.88 |
| $r_9$ = −37.27 | $d_9$ = (Variable) | | |
| $r_{10}$ = ∞(Stop) | $d_{10}$ = 0.1 | | |
| $r_{11}$ = 13.51(Aspheric) | $d_{11}$ = 2.1 | $n_{d6}$ = 1.6935 | $\nu_{d6}$ = 53.21 |
| $r_{12}$ = −37.16 | $d_{12}$ = 0.3 | | |
| $r_{13}$ = 6.88 | $d_{13}$ = 1.9 | $n_{d7}$ = 1.497 | $\nu_{d7}$ = 81.54 |
| $r_{14}$ = 15.52 | $d_{14}$ = 0.8 | $n_{d8}$ = 1.84666 | $\nu_{d8}$ = 23.78 |
| $r_{15}$ = 6.28 | $d_{15}$ = (Variable) | | |
| $r_{16}$ = 14.33(Aspheric) | $d_{16}$ = 1.4 | $n_{d9}$ = 1.6935 | $\nu_{d9}$ = 53.21 |
| $r_{17}$ = 26.77(Aspheric) | $d_{17}$ = (Variable) | | |
| $r_{18}$ = ∞ | $d_{18}$ = 0.9 | $n_{d10}$ = 1.54771 | $\nu_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $\nu_{d11}$ = 64.14 |
| $r_{21}$ = ∞ | $d_{21}$ = 0.6 | | |
| $r_{22}$ = ∞(Image plane) | | | |

| Aspherical Coefficients |
|---|
| 11th surface |
| K = 0.519 |
| $A_4$ = −1.14 × 10$^{-4}$ |
| $A_6$ = 4.21 × 10$^{-7}$ |
| $A_8$ = −4.73 × 10$^{-8}$ |
| $A_{10}$ = 8.80 × 10$^{-10}$ |
| 16th surface |
| K = 0 |
| $A_4$ = −1.08 × 10$^{-3}$ |
| $A_6$ = −3.68 × 10$^{-5}$ |
| $A_8$ = 8.89 × 10$^{-7}$ |
| $A_{10}$ = −7.24 × 10$^{-8}$ |
| 17th surface |
| K = 0 |
| $A_4$ = −1.22 × 10$^{-3}$ |
| $A_6$ = −2.94 × 10$^{-5}$ |
| $A_8$ = 4.32 × 10$^{-7}$ |
| $A_{10}$ = −2.89 × 10$^{-8}$ |

| Zooming Data (∞) | | | |
|---|---|---|---|
| | WE | ST | TE |
| f (mm) | 6.5 | 20.1 | 62.6 |
| $F_{NO}$ | 2.8 | 3.5 | 4.4 |
| $d_3$ | 1.1 | 15.4 | 27.9 |
| $d_9$ | 35.9 | 12.6 | 1.5 |
| $d_{15}$ | 12.8 | 14.8 | 25.1 |
| $d_{17}$ | 2.0 | 6.7 | 4.7 |

EXAMPLE 2

| IH = 3.6 mm | | | |
|---|---|---|---|
| $r_1 = 24.41$ | $d_1 = 1.0$ | $n_{d1} = 1.90366$ | $\nu_{d1} = 31.31$ |
| $r_2 = 16.58$ | $d_2 = 4.6$ | $n_{d2} = 1.58313$ | $\nu_{d2} = 59.38$ |
| $r_3 = -195.75$ | $d_3 = $ (Variable) | | |
| $r_4 = -75.95$ | $d_4 = 0.9$ | $n_{d3} = 1.883$ | $\nu_{d3} = 40.76$ |
| $r_5 = 15.49$ | $d_5 = 2.7$ | | |
| $r_6 = -17.31$ | $d_6 = 0.9$ | $n_{d4} = 1.883$ | $\nu_{d4} = 40.76$ |
| $r_7 = 20.77$ | $d_7 = 0.7$ | | |
| $r_8 = 24.96$ | $d_8 = 2.4$ | $n_{d5} = 1.92286$ | $\nu_{d5} = 20.88$ |
| $r_9 = -39.40$ | $d_9 = $ (Variable) | | |
| $r_{10} = \infty$(Stop) | $d_{10} = 0.8$ | | |
| $r_{11} = 15.77$(Aspheric) | $d_{11} = 2.4$ | $n_{d6} = 1.6935$ | $\nu_{d6} = 53.21$ |
| $r_{12} = -28.03$ | $d_{12} = 0.3$ | | |
| $r_{13} = 6.46$ | $d_{13} = 2.8$ | $n_{d7} = 1.497$ | $\nu_{d7} = 81.54$ |
| $r_{14} = 19.27$ | $d_{14} = 0.8$ | $n_{d8} = 1.78472$ | $\nu_{d8} = 25.68$ |
| $r_{15} = 5.47$ | $d_{15} = $ (Variable) | | |
| $r_{16} = 40.61$(Aspheric) | $d_{16} = 1.9$ | $n_{d9} = 1.6935$ | $\nu_{d9} = 53.21$ |
| $r_{17} = -29.25$(Aspheric) | $d_{17} = $ (Variable) | | |
| $r_{18} = \infty$ | $d_{18} = 0.9$ | $n_{d10} = 1.54771$ | $\nu_{d10} = 62.84$ |
| $r_{19} = \infty$ | $d_{19} = 0.5$ | | |
| $r_{20} = \infty$ | $d_{20} = 0.5$ | $n_{d11} = 1.51633$ | $\nu_{d11} = 64.14$ |
| $r_{21} = \infty$ | $d_{21} = 0.6$ | | |
| $r_{22} = \infty$(Image plane) | | | |

Aspherical Coefficients

11th surface $K = 0.519$
$A_4 = -9.82 \times 10^{-5}$
$A_6 = -4.32 \times 10^{-7}$
$A_8 = 1.54 \times 10^{-8}$
$A_{10} = -3.64 \times 10^{-10}$ 16th surface $K = 0$
$A_4 = -6.23 \times 10^{-4}$
$A_6 = -2.49 \times 10^{-6}$
$A_8 = -5.58 \times 10^{-7}$
$A_{10} = -1.52 \times 10^{-8}$ 17th surface $K = 0$
$A_4 = -6.63 \times 10^{-4}$
$A_6 = 3.78 \times 10^{-6}$
$A_8 = -8.83 \times 10^{-7}$
$A_{10} = 4.50 \times 10^{-9}$

Zooming Data ($\infty$)

| | WE | ST | TE |
|---|---|---|---|
| f (mm) | 6.5 | 20.1 | 62.6 |
| $F_{NO}$ | 2.8 | 3.3 | 4.4 |
| $d_3$ | 0.8 | 13.6 | 23.2 |
| $d_9$ | 29.6 | 8.9 | 1.5 |
| $d_{15}$ | 10.2 | 11.1 | 28.1 |
| $d_{17}$ | 3.4 | 9.4 | 6.1 |

EXAMPLE 3

| IH = 3.6 mm | | | |
|---|---|---|---|
| $r_1 = 26.07$ | $d_1 = 1.0$ | $n_{d1} = 1.90366$ | $\nu_{d1} = 31.31$ |
| $r_2 = 17.64$ | $d_2 = 5.4$ | $n_{d2} = 1.58313$ | $\nu_{d2} = 59.38$ |
| $r_3 = -234.53$ | $d_3 = $ (Variable) | | |
| $r_4 = -131.56$ | $d_4 = 0.9$ | $n_{d3} = 1.883$ | $\nu_{d3} = 40.76$ |
| $r_5 = 13.77$ | $d_5 = 2.2$ | | |
| $r_6 = -36.80$ | $d_6 = 0.9$ | $n_{d4} = 1.883$ | $\nu_{d4} = 40.76$ |
| $r_7 = 14.36$ | $d_7 = 1.1$ | | |
| $r_8 = 17.74$ | $d_8 = 2.2$ | $n_{d5} = 1.92286$ | $\nu_{d5} = 20.88$ |
| $r_9 = -219.11$ | $d_9 = $ (Variable) | | |
| $r_{10} = \infty$(Stop) | $d_{10} = 0.8$ | | |
| $r_{11} = 17.26$(Aspheric) | $d_{11} = 2.4$ | $n_{d6} = 1.6935$ | $\nu_{d6} = 53.21$ |
| $r_{12} = -23.49$(Aspheric) | $d_{12} = 0.3$ | | |
| $r_{13} = 6.09$ | $d_{13} = 2.9$ | $n_{d7} = 1.497$ | $\nu_{d7} = 81.54$ |
| $r_{14} = 16.54$ | $d_{14} = 0.8$ | $n_{d8} = 1.78472$ | $\nu_{d8} = 25.68$ |
| $r_{15} = 5.07$ | $d_{15} = $ (Variable) | | |
| $r_{16} = 19.94$(Aspheric) | $d_{16} = 2.7$ | $n_{d9} = 1.6935$ | $\nu_{d9} = 53.21$ |
| $r_{17} = -67.41$(Aspheric) | $d_{17} = $ (Variable) | | |
| $r_{18} = \infty$ | $d_{18} = 0.9$ | $n_{d10} = 1.54771$ | $\nu_{d10} = 62.84$ |
| $r_{19} = \infty$ | $d_{19} = 0.5$ | | |
| $r_{20} = \infty$ | $d_{20} = 0.5$ | $n_{d11} = 1.51633$ | $\nu_{d11} = 64.14$ |
| $r_{21} = \infty$ | $d_{21} = 0.6$ | | |
| $r_{22} = \infty$(Image plane) | | | |

Aspherical Coefficients

11th surface $K = 0.519$
$A_4 = -1.09 \times 10^{-4}$
$A_6 = -2.60 \times 10^{-6}$
$A_8 = -6.22 \times 10^{-8}$
$A_{10} = 3.79 \times 10^{-9}$ 12th surface $K = 0$
$A_4 = 4.04 \times 10^{-8}$
$A_6 = -3.45 \times 10^{-6}$
$A_8 = -2.25 \times 10^{-9}$
$A_{10} = 2.87 \times 10^{-9}$ 16th surface $K = 0$
$A_4 = -4.28 \times 10^{-4}$
$A_6 = 3.80 \times 10^{-6}$
$A_8 = -6.83 \times 10^{-7}$
$A_{10} = 6.53 \times 10^{-9}$ 17th surface $K = 0$
$A_4 = -5.04 \times 10^{-4}$
$A_6 = 3.47 \times 10^{-6}$
$A_8 = -6.12 \times 10^{-7}$
$A_{10} = 9.23 \times 10^{-9}$

Zooming Data ($\infty$)

| | WE | ST | TE |
|---|---|---|---|
| f (mm) | 6.5 | 20.1 | 62.6 |
| $F_{NO}$ | 2.8 | 3.4 | 4.0 |
| $d_3$ | 0.8 | 15.9 | 26.2 |
| $d_9$ | 27.2 | 9.5 | 1.5 |
| $d_{15}$ | 9.4 | 12.5 | 26.2 |
| $d_{17}$ | 2.6 | 6.3 | 3.9 |

EXAMPLE 4

| IH = 3.6 mm | | | |
|---|---|---|---|
| $r_1 = 25.58$ | $d_1 = 1.0$ | $n_{d1} = 1.90366$ | $\nu_{d1} = 31.31$ |
| $r_2 = 17.47$ | $d_2 = 5.1$ | $n_{d2} = 1.58313$ | $\nu_{d2} = 59.38$ |
| $r_3 = -342.91$ | $d_3 = $ (Variable) | | |
| $r_4 = -576.31$ | $d_4 = 0.9$ | $n_{d3} = 1.883$ | $\nu_{d3} = 40.76$ |
| $r_5 = 9.13$ | $d_5 = 2.9$ | | |
| $r_6 = -21.14$ | $d_6 = 0.9$ | $n_{d4} = 1.883$ | $\nu_{d4} = 40.76$ |
| $r_7 = 115.83$ | $d_7 = 0.6$ | | |
| $r_8 = 25.49$ | $d_8 = 2.0$ | $n_{d5} = 1.92286$ | $\nu_{d5} = 20.88$ |
| $r_9 = -67.34$ | $d_9 = $ (Variable) | | |
| $r_{10} = \infty$(Stop) | $d_{10} = 0.8$ | | |

-continued

| | | | |
|---|---|---|---|
| $r_{11}$ = 17.57(Aspheric) | $d_{11}$ = 2.4 | $n_{d6}$ = 1.6935 | $v_{d6}$ = 53.21 |
| $r_{12}$ = −26.57(Aspheric) | $d_{12}$ = 0.3 | | |
| $r_{13}$ = 5.81 | $d_{13}$ = 3.2 | $n_{d7}$ = 1.497 | $v_{d7}$ = 81.54 |
| $r_{14}$ = 14.50 | $d_{14}$ = 0.8 | $n_{d8}$ = 1.78472 | $v_{d8}$ = 25.68 |
| $r_{15}$ = 4.67 | $d_{15}$ = (Variable) | | |
| $r_{16}$ = 15.68(Aspheric) | $d_{16}$ = 2.3 | $n_{d9}$ = 1.6935 | $v_{d9}$ = 53.21 |
| $r_{17}$ = −653.44 (Aspheric) | $d_{17}$ = (Variable) | | |
| $r_{18}$ = ∞ | $d_{18}$ = 0.9 | $n_{d10}$ = 1.54771 | $v_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $v_{d11}$ = 64.14 |
| $r_{21}$ = ∞ | $d_{21}$ = 0.6 | | |
| $r_{22}$ = ∞(Image plane) | | | |

Aspherical Coefficients

11th surface

K = 0.519
$A_4$ = −9.24 × 10$^{-5}$
$A_6$ = −4.28 × 10$^{-6}$
$A_8$ = 2.11 × 10$^{-7}$
$A_{10}$ = 1.85 × 10$^{-9}$

12th surface

K = 0
$A_4$ = 5.00 × 10$^{-6}$
$A_6$ = −3.16 × 10$^{-6}$
$A_8$ = 1.45 × 10$^{-7}$
$A_{10}$ = 3.96 × 10$^{-9}$

16th surface

K = 0
$A_4$ = −2.65 × 10$^{-4}$
$A_6$ = 2.63 × 10$^{-6}$
$A_8$ = −4.45 × 10$^{-7}$
$A_{10}$ = 8.52 × 10$^{-10}$

17th surface

K = 0
$A_4$ = −3.73 × 10$^{-4}$
$A_6$ = 1.05 × 10$^{-5}$
$A_8$ = −9.45 × 10$^{-7}$
$A_{10}$ = 1.30 × 10$^{-8}$

Zooming Data (∞)

| | WE | ST | TE |
|---|---|---|---|
| f (mm) | 6.5 | 20.1 | 62.6 |
| $F_{NO}$ | 2.8 | 3.4 | 4.0 |
| $d_3$ | 0.8 | 16.9 | 26.7 |
| $d_9$ | 26.7 | 9.2 | 1.5 |
| $d_{15}$ | 7.5 | 10.1 | 26.4 |
| $d_{17}$ | 4.0 | 7.3 | 3.6 |

EXAMPLE 5

IH = 3.6 mm

| | | | |
|---|---|---|---|
| $r_1$ = 28.41 | $d_1$ = 1.0 | $n_{d1}$ = 1.92286 | $v_{d1}$ = 20.88 |
| $r_2$ = 19.57 | $d_2$ = 4.6 | $n_{d2}$ = 1.6393 | $v_{d2}$ = 44.87 |
| $r_3$ = −2730.27 | $d_3$ = (Variable) | | |
| $r_4$ = −130.63 | $d_4$ = 0.9 | $n_{d3}$ = 1.883 | $v_{d3}$ = 40.76 |
| $r_5$ = 13.93 | $d_5$ = 2.4 | | |
| $r_6$ = −18.16 | $d_6$ = 0.9 | $n_{d4}$ = 1.883 | $v_{d4}$ = 40.76 |
| $r_7$ = 19.90 | $d_7$ = 1.0 | | |
| $r_8$ = 26.52 | $d_8$ = 2.2 | $n_{d5}$ = 1.92286 | $v_{d5}$ = 20.88 |
| $r_9$ = −36.36 | $d_9$ = (Variable) | | |
| $r_{10}$ = ∞(Stop) | $d_{10}$ = 0.8 | | |
| $r_{11}$ = 11.21(Aspheric) | $d_{11}$ = 2.8 | $n_{d6}$ = 1.58913 | $v_{d6}$ = 61.14 |
| $r_{12}$ = −24.26(Aspheric) | $d_{12}$ = 0.2 | | |
| $r_{13}$ = 7.79 | $d_{13}$ = 3.3 | $n_{d7}$ = 1.497 | $v_{d7}$ = 81.54 |

-continued

| | | | |
|---|---|---|---|
| $r_{14}$ = −20.65 | $d_{14}$ = 0.8 | $n_{d8}$ = 1.64769 | $v_{d8}$ = 33.79 |
| $r_{15}$ = 5.75 | $d_{15}$ = (Variable) | | |
| $r_{16}$ = 13.49(Aspheric) | $d_{16}$ = 2.4 | $n_{d9}$ = 1.58913 | $v_{d9}$ = 61.14 |
| $r_{17}$ = 469.95(Aspheric) | $d_{17}$ = (Variable) | | |
| $r_{18}$ = ∞ | $d_{18}$ = 0.9 | $n_{d10}$ = 1.54771 | $v_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $v_{d11}$ = 64.14 |
| $r_{21}$ = ∞ | $d_{21}$ = 0.6 | | |
| $r_{22}$ = ∞(Image plane) | | | |

Aspherical Coefficients

11th surface

K = 0.519
$A_4$ = −5.31 × 10$^{-5}$
$A_6$ = −5.00 × 10$^{-6}$
$A_8$ = 1.33 × 10$^{-7}$
$A_{10}$ = 2.70 × 10$^{-10}$

12th surface

K = 0
$A_4$ = 1.26 × 10$^{-4}$
$A_6$ = −5.15 × 10$^{-6}$
$A_8$ = 1.64 × 10$^{-7}$
$A_{10}$ = 2.51 × 10$^{-10}$

16th surface

K = 0
$A_4$ = −4.42 × 10$^{-4}$
$A_6$ = 3.82 × 10$^{-6}$
$A_8$ = −7.84 × 10$^{-7}$
$A_{10}$ = −1.75 × 10$^{-9}$

17th surface

K = 0
$A_4$ = −5.82 × 10$^{-4}$
$A_6$ = 1.50 × 10$^{-5}$
$A_8$ = −1.56 × 10$^{-6}$
$A_{10}$ = 2.12 × 10$^{-8}$

Zooming Data (∞)

| | WE | ST | TE |
|---|---|---|---|
| f (mm) | 6.5 | 20.1 | 62.6 |
| $F_{NO}$ | 2.8 | 3.4 | 4.0 |
| $d_3$ | 0.8 | 17.3 | 27.5 |
| $d_9$ | 25.8 | 8.5 | 1.5 |
| $d_{15}$ | 9.0 | 10.9 | 26.6 |
| $d_{17}$ | 2.3 | 6.6 | 2.8 |

EXAMPLE 6

IH = 3.6 mm

| | | | |
|---|---|---|---|
| $r_1$ = 28.32 | $d_1$ = 1.0 | $n_{d1}$ = 1.84666 | $v_{d1}$ = 23.78 |
| $r_2$ = 18.21 | $d_2$ = 5.1 | $n_{d2}$ = 1.58267 | $v_{d2}$ = 46.42 |
| $r_3$ = −170.41 | $d_3$ = (Variable) | | |
| $r_4$ = −45.40 | $d_4$ = 0.9 | $n_{d3}$ = 1.883 | $v_{d3}$ = 40.76 |
| $r_5$ = 11.39 | $d_5$ = 3.0 | | |
| $r_6$ = −16.65 | $d_6$ = 0.9 | $n_{d4}$ = 1.883 | $v_{d4}$ = 40.76 |
| $r_7$ = 237.30 | $d_7$ = 0.3 | | |
| $r_8$ = 37.64 | $d_8$ = 2.1 | $n_{d5}$ = 1.92286 | $v_{d5}$ = 20.88 |
| $r_9$ = −30.87 | $d_9$ = (Variable) | | |
| $r_{10}$ = ∞(Stop) | $d_{10}$ = 0.8 | | |
| $r_{11}$ = 16.54(Aspheric) | $d_{11}$ = 2.2 | $n_{d6}$ = 1.6935 | $v_{d6}$ = 53.21 |
| $r_{12}$ = −25.07(Aspheric) | $d_{12}$ = 0.2 | | |
| $r_{13}$ = 6.16 | $d_{13}$ = 3.2 | $n_{d7}$ = 1.497 | $v_{d7}$ = 81.54 |
| $r_{14}$ = 16.22 | $d_{14}$ = 0.8 | $n_{d8}$ = 1.80518 | $v_{d8}$ = 25.42 |
| $r_{15}$ = 4.91 | $d_{15}$ = (Variable) | | |
| $r_{16}$ = 25.09(Aspheric) | $d_{16}$ = 2.1 | $n_{d9}$ = 1.58913 | $v_{d9}$ = 61.14 |
| $r_{17}$ = −26.13(Aspheric) | $d_{17}$ = (Variable) | | |

-continued

| | | | |
|---|---|---|---|
| $r_{18} = \infty$ | $d_{18} = 0.9$ | $n_{d10} = 1.54771$ | $\nu_{d10} = 62.84$ |
| $r_{19} = \infty$ | $d_{19} = 0.5$ | | |
| $r_{20} = \infty$ | $d_{20} = 0.5$ | $n_{d11} = 1.51633$ | $\nu_{d11} = 64.14$ |
| $r_{21} = \infty$ | $d_{21} = 0.6$ | | |
| $r_{22} = \infty$(Image plane) | | | |

Aspherical Coefficients

11th surface $K = 0.519$
$A_4 = -1.80 \times 10^{-4}$
$A_6 = -3.29 \times 10^{-6}$
$A_8 = 1.90 \times 10^{-7}$
$A_{10} = -8.64 \times 10^{-9}$ 12th surface $K = 0$
$A_4 = -8.27 \times 10^{-5}$
$A_6 = -2.10 \times 10^{-6}$
$A_8 = 1.13 \times 10^{-7}$
$A_{10} = -6.56 \times 10^{-9}$ 16th surface $K = 0$
$A_4 = -9.20 \times 10^{-4}$
$A_6 = 2.48 \times 10^{-6}$
$A_8 = -2.85 \times 10^{-7}$
$A_{10} = -4.99 \times 10^{-8}$ 17th surface $K = 0$
$A_4 = -1.08 \times 10^{-3}$
$A_6 = 2.08 \times 10^{-5}$
$A_8 = -1.40 \times 10^{-6}$
$A_{10} = 7.26 \times 10^{-10}$ Zooming Data ($\infty$)

| | WE | ST | TE |
|---|---|---|---|
| f (mm) | 6.5 | 20.1 | 62.6 |
| $F_{NO}$ | 2.8 | 3.4 | 4.0 |
| $d_3$ | 0.8 | 17.2 | 26.9 |
| $d_9$ | 26.4 | 9.1 | 1.5 |
| $d_{15}$ | 8.0 | 10.8 | 26.7 |
| $d_{17}$ | 3.7 | 7.3 | 3.9 |

EXAMPLE 7

IH = 3.6 mm

| | | | |
|---|---|---|---|
| $r_1 = 27.28$ | $d_1 = 1.0$ | $n_{d1} = 1.90366$ | $\nu_{d1} = 31.31$ |
| $r_2 = 18.07$ | $d_2 = 5.4$ | $n_{d2} = 1.58313$ | $\nu_{d2} = 59.38$ |
| $r_3 = -155.43$ | $d_3$ = (Variable) | | |
| $r_4 = -68.18$ | $d_4 = 0.9$ | $n_{d3} = 1.883$ | $\nu_{d3} = 40.76$ |
| $r_5 = 14.19$ | $d_5 = 2.1$ | | |
| $r_6 = -21.23$ | $d_6 = 0.9$ | $n_{d4} = 1.883$ | $\nu_{d4} = 40.76$ |
| $r_7 = 22.35$ | $d_7 = 1.2$ | | |
| $r_8 = 27.68$ | $d_8 = 2.0$ | $n_{d5} = 1.92286$ | $\nu_{d5} = 20.88$ |
| $r_9 = -44.07$ | $d_9$ = (Variable) | | |
| $r_{10} = \infty$(Stop) | $d_{10} = 0.8$ | | |
| $r_{11} = 18.31$(Aspheric) | $d_{11} = 2.4$ | $n_{d6} = 1.6935$ | $\nu_{d6} = 53.21$ |
| $r_{12} = -23.97$(Aspheric) | $d_{12} = 0.2$ | | |
| $r_{13} = 6.11$ | $d_{13} = 3.4$ | $n_{d7} = 1.497$ | $\nu_{d7} = 81.54$ |
| $r_{14} = 19.17$ | $d_{14} = 0.8$ | $n_{d8} = 1.78472$ | $\nu_{d8} = 25.68$ |
| $r_{15} = 4.99$ | $d_{15}$ = (Variable) | | |
| $r_{16} = 16.47$(Aspheric) | $d_{16} = 1.9$ | $n_{d9} = 1.6935$ | $\nu_{d9} = 53.21$ |
| $r_{17} = -241.03$(Aspheric) | $d_{17}$ = (Variable) | | |
| $r_{18} = \infty$ | $d_{18} = 0.9$ | $n_{d10} = 1.54771$ | $\nu_{d10} = 62.84$ |
| $r_{19} = \infty$ | $d_{19} = 0.5$ | | |
| $r_{20} = \infty$ | $d_{20} = 0.5$ | $n_{d11} = 1.51633$ | $\nu_{d11} = 64.14$ |
| $r_{21} = \infty$ | $d_{21} = 0.6$ | | |
| $r_{22} = \infty$(Image plane) | | | |

Aspherical Coefficients

11th surface $K = 0.519$
$A_4 = -8.04 \times 10^{-5}$
$A_6 = -4.78 \times 10^{-6}$
$A_8 = 1.84 \times 10^{-7}$
$A_{10} = 1.76 \times 10^{-11}$ 12th surface $K = 0$
$A_4 = 2.15 \times 10^{-5}$
$A_6 = -5.10 \times 10^{-6}$
$A_8 = 2.05 \times 10^{-7}$
$A_{10} = -1.06 \times 10^{-10}$ 16th surface $K = 0$
$A_4 = -4.43 \times 10^{-4}$
$A_6 = -1.95 \times 10^{-5}$
$A_8 = -8.33 \times 10^{-7}$
$A_{10} = -4.74 \times 10^{-8}$ 17th surface $K = 0$
$A_4 = -5.76 \times 10^{-4}$
$A_6 = -6.53 \times 10^{-6}$
$A_8 = -2.10 \times 10^{-7}$
$A_{10} = -1.10 \times 10^{-8}$ Zooming Data ($\infty$)

| | WE | ST | TE |
|---|---|---|---|
| f (mm) | 6.5 | 20.1 | 62.6 |
| $F_{NO}$ | 2.8 | 3.4 | 4.0 |
| $d_3$ | 0.8 | 16.4 | 26.5 |
| $d_9$ | 26.8 | 9.1 | 1.5 |
| $d_{15}$ | 8.6 | 11.1 | 26.2 |
| $d_{17}$ | 3.4 | 7.3 | 4.2 |

EXAMPLE 8

IH = 3.6 mm

| | | | |
|---|---|---|---|
| $r_1 = 25.93$ | $d_1 = 1.0$ | $n_{d1} = 1.90366$ | $\nu_{d1} = 31.31$ |
| $r_2 = 17.69$ | $d_2 = 5.7$ | $n_{d2} = 1.58313$ | $\nu_{d2} = 59.38$ |
| $r_3 = -312.64$ | $d_3$ = (Variable) | | |
| $r_4 = -235.08$ | $d_4 = 0.9$ | $n_{d3} = 1.883$ | $\nu_{d3} = 40.76$ |
| $r_5 = 9.25$ | $d_5 = 3.0$ | | |
| $r_6 = -21.51$ | $d_6 = 0.9$ | $n_{d4} = 1.883$ | $\nu_{d4} = 40.76$ |
| $r_7 = 94.67$ | $d_7 = 0.5$ | | |
| $r_8 = 25.18$ | $d_8 = 2.0$ | $n_{d5} = 1.92286$ | $\nu_{d5} = 20.88$ |
| $r_9 = -61.09$ | $d_9$ = (Variable) | | |
| $r_{10} = \infty$(Stop) | $d_{10} = 0.8$ | | |
| $r_{11} = 16.74$(Aspheric) | $d_{11} = 2.3$ | $n_{d6} = 1.6935$ | $\nu_{d6} = 53.21$ |
| $r_{12} = -27.26$(Aspheric) | $d_{12} = 0.2$ | | |
| $r_{13} = 5.85$ | $d_{13} = 3.1$ | $n_{d7} = 1.497$ | $\nu_{d7} = 81.54$ |
| $r_{14} = 15.30$ | $d_{14} = 0.8$ | $n_{d8} = 1.78472$ | $\nu_{d8} = 25.68$ |
| $r_{15} = 4.70$ | $d_{15}$ = (Variable) | | |
| $r_{16} = 13.75$(Aspheric) | $d_{16} = 1.8$ | $n_{d9} = 1.6935$ | $\nu_{d9} = 53.21$ |
| $r_{17} = 127.03$(Aspheric) | $d_{17}$ = (Variable) | | |
| $r_{18} = \infty$ | $d_{18} = 0.9$ | $n_{d10} = 1.54771$ | $\nu_{d10} = 62.84$ |
| $r_{19} = \infty$ | $d_{19} = 0.5$ | | |
| $r_{20} = \infty$ | $d_{20} = 0.5$ | $n_{d11} = 1.51633$ | $\nu_{d11} = 64.14$ |
| $r_{21} = \infty$ | $d_{21} = 0.6$ | | |
| $r_{22} = \infty$(Image plane) | | | |

-continued

Aspherical Coefficients

11th surface

K = 0.519
$A_4 = -8.55 \times 10^{-5}$
$A_6 = -6.39 \times 10^{-6}$
$A_8 = 4.07 \times 10^{-7}$
$A_{10} = -2.94 \times 10^{-9}$ 12th surface K = 0
$A_4 = 2.03 \times 10^{-5}$
$A_6 = -6.27 \times 10^{-6}$
$A_8 = 4.08 \times 10^{-7}$
$A_{10} = -2.32 \times 10^{-9}$ 16th surface K = 0
$A_4 = 6.58 \times 10^{-5}$
$A_6 = -2.74 \times 10^{-5}$
$A_8 = 1.36 \times 10^{-6}$
$A_{10} = -3.53 \times 10^{-8}$ 17th surface K = 0
$A_4 = 6.45 \times 10^{-5}$
$A_6 = -2.94 \times 10^{-5}$
$A_8 = 1.35 \times 10^{-6}$
$A_{10} = -3.35 \times 10^{-8}$ Zooming Data (∞)

|  | WE | ST | TE |
|---|---|---|---|
| f (mm) | 6.5 | 20.1 | 62.6 |
| $F_{NO}$ | 2.8 | 3.4 | 4.4 |
| $d_3$ | 0.9 | 17.0 | 26.3 |
| $d_9$ | 27.0 | 9.1 | 1.5 |
| $d_{15}$ | 8.0 | 10.3 | 27.2 |
| $d_{17}$ | 3.8 | 7.3 | 3.6 |

EXAMPLE 9

IH = 3.6 mm

| $r_1$ = 27.04 | $d_1$ = 1.0 | $n_{d1}$ = 1.90366 | $\nu_{d1}$ = 31.31 |
| $r_2$ = 17.99 | $d_2$ = 5.7 | $n_{d2}$ = 1.58313 | $\nu_{d2}$ = 59.38 |
| $r_3$ = −176.53 | $d_3$ = (Variable) | | |
| $r_4$ = −82.52 | $d_4$ = 0.9 | $n_{d3}$ = 1.883 | $\nu_{d3}$ = 40.76 |
| $r_5$ = 9.80 | $d_5$ = 3.0 | | |
| $r_6$ = −19.43 | $d_6$ = 0.9 | $n_{d4}$ = 1.883 | $\nu_{d4}$ = 40.76 |
| $r_7$ = 153.20 | $d_7$ = 0.3 | | |
| $r_8$ = 26.91 | $d_8$ = 2.3 | $n_{d5}$ = 1.92286 | $\nu_{d5}$ = 20.88 |
| $r_9$ = −46.89 | $d_9$ = (Variable) | | |
| $r_{10}$ = ∞(Stop) | $d_{10}$ = 0.8 | | |
| $r_{11}$ = 16.72(Aspheric) | $d_{11}$ = 2.0 | $n_{d6}$ = 1.6935 | $\nu_{d6}$ = 53.21 |
| $r_{12}$ = −27.19(Aspheric) | $d_{12}$ = 0.2 | | |
| $r_{13}$ = 5.77 | $d_{13}$ = 3.2 | $n_{d7}$ = 1.497 | $\nu_{d7}$ = 81.54 |
| $r_{14}$ = 14.61 | $d_{14}$ = 0.8 | $n_{d8}$ = 1.78472 | $\nu_{d8}$ = 25.68 |
| $r_{15}$ = 4.56 | $d_{15}$ = (Variable) | | |
| $r_{16}$ = 13.75(Aspheric) | $d_{16}$ = 2.4 | $n_{d9}$ = 1.6935 | $\nu_{d9}$ = 53.21 |
| $r_{17}$ = 125.60(Aspheric) | $d_{17}$ = (Variable) | | |
| $r_{18}$ = ∞ | $d_{18}$ = 0.9 | $n_{d10}$ = 1.54771 | $\nu_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $\nu_{d11}$ = 64.14 |
| $r_{21}$ = ∞ | $d_{21}$ = 0.6 | | |
| $r_{22}$ = ∞(Image plane) | | | |

-continued

Aspherical Coefficients

11th surface

K = 0.318
$A_4 = -2.18 \times 10^{-5}$
$A_6 = -1.54 \times 10^{-5}$
$A_8 = 6.86 \times 10^{-7}$
$A_{10} = -9.56 \times 10^{-9}$ 12th surface K = 3.8779
$A_4 = 1.07 \times 10^{-4}$
$A_6 = -1.61 \times 10^{-5}$
$A_8 = 7.49 \times 10^{-7}$
$A_{10} = -1.06 \times 10^{-8}$ 16th surface K = 0.2738
$A_4 = -1.22 \times 10^{-4}$
$A_6 = 6.37 \times 10^{-6}$
$A_8 = -8.03 \times 10^{-7}$
$A_{10} = 1.81 \times 10^{-8}$ 17th surface K = −39.6532
$A_4 = -1.43 \times 10^{-4}$
$A_6 = 8.49 \times 10^{-6}$
$A_8 = -1.08 \times 10^{-6}$
$A_{10} = 2.65 \times 10^{-8}$ Zooming Data (∞)

|  | WE | ST | TE |
|---|---|---|---|
| f (mm) | 6.5 | 20.1 | 62.6 |
| $F_{NO}$ | 2.9 | 3.5 | 4.4 |
| $d_3$ | 1.1 | 16.6 | 26.4 |
| $d_9$ | 26.5 | 8.8 | 1.5 |
| $d_{15}$ | 7.5 | 10.3 | 26.9 |
| $d_{17}$ | 3.8 | 7.2 | 3.4 |

EXAMPLE 10

IH = 3.6 mm

| $r_1$ = 26.18 | $d_1$ = 1.0 | $n_{d1}$ = 1.90366 | $\nu_{d1}$ = 31.31 |
| $r_2$ = 17.80 | $d_2$ = 5.4 | $n_{d2}$ = 1.58313 | $\nu_{d2}$ = 59.38 |
| $r_3$ = −249.10 | $d_3$ = (Variable) | | |
| $r_4$ = −105.86 | $d_4$ = 0.9 | $n_{d3}$ = 1.883 | $\nu_{d3}$ = 40.76 |
| $r_5$ = 9.81 | $d_5$ = 3.2 | | |
| $r_6$ = −19.11 | $d_6$ = 0.9 | $n_{d4}$ = 1.883 | $\nu_{d4}$ = 40.76 |
| $r_7$ = 203.24 | $d_7$ = 0.3 | | |
| $r_8$ = 29.48 | $d_8$ = 2.1 | $n_{d5}$ = 1.92286 | $\nu_{d5}$ = 20.88 |
| $r_9$ = −46.62 | $d_9$ = (Variable) | | |
| $r_{10}$ = ∞(Stop) | $d_{10}$ = 0.8 | | |
| $r_{11}$ = 16.60(Aspheric) | $d_{11}$ = 2.3 | $n_{d6}$ = 1.6935 | $\nu_{d6}$ = 53.21 |
| $r_{12}$ = −29.03(Aspheric) | $d_{12}$ = 0.2 | | |
| $r_{13}$ = 5.99 | $d_{13}$ = 3.2 | $n_{d7}$ = 1.497 | $\nu_{d7}$ = 81.54 |
| $r_{14}$ = 15.62 | $d_{14}$ = 0.8 | $n_{d8}$ = 1.78472 | $\nu_{d8}$ = 25.68 |
| $r_{15}$ = 4.89 | $d_{15}$ = (Variable) | | |
| $r_{16}$ = 14.08(Aspheric) | $d_{16}$ = 2.1 | $n_{d9}$ = 1.6935 | $\nu_{d9}$ = 53.21 |
| $r_{17}$ = 138.82(Aspheric) | $d_{17}$ = (Variable) | | |
| $r_{18}$ = ∞ | $d_{18}$ = 0.9 | $n_{d10}$ = 1.54771 | $\nu_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $\nu_{d11}$ = 64.14 |
| $r_{21}$ = ∞ | $d_{21}$ = 0.6 | | |
| $r_{22}$ = ∞(Image plane) | | | |

-continued

Aspherical Coefficients

11th surface

K = 0.519
$A_4 = -7.45 \times 10^{-6}$
$A_6 = -8.82 \times 10^{-6}$
$A_8 = 5.88 \times 10^{-7}$
$A_{10} = -4.76 \times 10^{-9}$ 12th surface K = 0
$A_4 = 1.02 \times 10^{-4}$
$A_6 = -8.89 \times 10^{-6}$
$A_8 = 5.92 \times 10^{-7}$
$A_{10} = -3.59 \times 10^{-9}$ 16th surface K = 0
$A_4 = -1.80 \times 10^{-4}$
$A_6 = -8.60 \times 10^{-6}$
$A_8 = 2.70 \times 10^{-7}$
$A_{10} = -1.54 \times 10^{-8}$ 17th surface K = 0
$A_4 = -2.56 \times 10^{-4}$
$A_6 = -3.77 \times 10^{-6}$
$A_8 = -7.30 \times 10^{-8}$
$A_{10} = -6.62 \times 10^{-9}$

Zooming Data (∞)

| | WE | ST | TE |
|---|---|---|---|
| f (mm) | 6.5 | 20.1 | 62.6 |
| $F_{NO}$ | 2.8 | 3.4 | 4.4 |
| $d_3$ | 1.0 | 16.5 | 26.1 |
| $d_9$ | 27.2 | 8.9 | 1.5 |
| $d_{15}$ | 8.3 | 10.7 | 27.4 |
| $d_{17}$ | 3.6 | 7.3 | 3.4 |

EXAMPLE 11

IH = 3.6 mm

| | | | |
|---|---|---|---|
| $r_1$ = 36.01 | $d_1$ = 1.2 | $n_{d1}$ = 1.84666 | $v_{d1}$ = 23.78 |
| $r_2$ = 24.94 | $d_2$ = 4.8 | $n_{d2}$ = 1.497 | $v_{d2}$ = 81.54 |
| $r_3$ = 388.81 | $d_3$ = 0.1 | | |
| $r_4$ = 26.05 | $d_4$ = 3.1 | $n_{d3}$ = 1.6228 | $v_{d3}$ = 57.05 |
| $r_5$ = 92.10 | $d_5$ = (Variable) | | |
| $r_6$ = 53.55 | $d_6$ = 1.0 | $n_{d4}$ = 1.834 | $v_{d4}$ = 37.16 |
| $r_7$ = 7.80 | $d_7$ = 4.9 | | |
| $r_8$ = −26.05 | $d_8$ = 0.9 | $n_{d5}$ = 1.51823 | $v_{d5}$ = 58.9 |
| $r_9$ = 10.22 | $d_9$ = 2.7 | $n_{d6}$ = 1.92286 | $v_{d6}$ = 20.88 |
| $r_{10}$ = 32.66 | $d_{10}$ = (Variable) | | |
| $r_{11}$ = ∞(Stop) | $d_{11}$ = 0.8 | | |
| $r_{12}$ = 12.32(Aspheric) | $d_{12}$ = 2.0 | $n_{d7}$ = 1.58313 | $v_{d7}$ = 59.46 |
| $r_{13}$ = −31.63 | $d_{13}$ = 0.4 | | |
| $r_{14}$ = 5.36 | $d_{14}$ = 2.2 | $n_{d8}$ = 1.497 | $v_{d8}$ = 81.54 |
| $r_{15}$ = 19.56 | $d_{15}$ = 0.9 | $n_{d9}$ = 1.72825 | $v_{d9}$ = 28.46 |
| $r_{16}$ = 4.38 | $d_{16}$ = (Variable) | | |
| $r_{17}$ = 13.15(Aspheric) | $d_{17}$ = 2.6 | $n_{d10}$ = 1.58313 | $v_{d10}$ = 59.46 |
| $r_{18}$ = −57.84(Aspheric) | $d_{18}$ = (Variable) | | |
| $r_{19}$ = ∞ | $d_{19}$ = 0.9 | $n_{d11}$ = 1.54771 | $v_{d11}$ = 62.84 |
| $r_{20}$ = ∞ | $d_{20}$ = 0.5 | | |
| $r_{21}$ = ∞ | $d_{21}$ = 0.5 | $n_{d12}$ = 1.51633 | $v_{d12}$ = 64.14 |
| $r_{22}$ = ∞ | $d_{22}$ = 0.6 | | |
| $r_{23}$ = ∞(Image plane) | | | |

Aspherical Coefficients

12th surface

K = −1.198
$A_4 = -2.67 \times 10^{-5}$
$A_6 = -7.61 \times 10^{-7}$
$A_8 = 2.49 \times 10^{-8}$
$A_{10} = 0.00$ 17th surface K = 0
$A_4 = -2.30 \times 10^{-4}$
$A_6 = 1.15 \times 10^{-5}$
$A_8 = -2.78 \times 10^{-7}$
$A_{10} = -1.12 \times 10^{-9}$ 18th surface K = 76.283
$A_4 = -2.19 \times 10^{-4}$
$A_6 = 1.16 \times 10^{-5}$
$A_8 = -2.89 \times 10^{-7}$
$A_{10} = 0.00$

Zooming Data (∞)

| | WE | ST | TE |
|---|---|---|---|
| f (mm) | 6.5 | 20.1 | 62.6 |
| $F_{NO}$ | 2.8 | 3.2 | 3.8 |
| $d_5$ | 0.3 | 12.4 | 21.0 |
| $d_{10}$ | 25.3 | 9.3 | 1.5 |
| $d_{16}$ | 6.3 | 7.2 | 16.3 |
| $d_{18}$ | 6.1 | 9.1 | 3.2 |

EXAMPLE 12

IH = 3.6 mm

| | | | |
|---|---|---|---|
| $r_1$ = 27.05 | $d_1$ = 1.0 | $n_{d1}$ = 1.90366 | $v_{d1}$ = 31.31 |
| $r_2$ = 18.00 | $d_2$ = 5.7 | $n_{d2}$ = 1.58313 | $v_{d2}$ = 59.38 |
| $r_3$ = −176.56 | $d_3$ = (Variable) | | |
| $r_4$ = −81.93 | $d_4$ = 0.9 | $n_{d3}$ = 1.883 | $v_{d3}$ = 40.76 |
| $r_5$ = 9.81 | $d_5$ = 3.0 | | |
| $r_6$ = −19.38 | $d_6$ = 0.9 | $n_{d4}$ = 1.883 | $v_{d4}$ = 40.76 |
| $r_7$ = 153.31 | $d_7$ = 0.3 | | |
| $r_8$ = 26.90 | $d_8$ = 2.4 | $n_{d5}$ = 1.92286 | $v_{d5}$ = 20.88 |
| $r_9$ = −46.81 | $d_9$ = (Variable) | | |
| $r_{10}$ = ∞(Stop) | $d_{10}$ = 0.8 | | |
| $r_{11}$ = 16.77(Aspheric) | $d_{11}$ = 2.0 | $n_{d6}$ = 1.6935 | $v_{d6}$ = −53.21 |
| $r_{12}$ = −27.11(Aspheric) | $d_{12}$ = 0.2 | | |
| $r_{13}$ = 5.75 | $d_{13}$ = 3.2 | $n_{d7}$ = 1.497 | $v_{d7}$ = 81.54 |
| $r_{14}$ = 14.61 | $d_{14}$ = 0.8 | $n_{d8}$ = 1.78472 | $v_{d8}$ = 25.68 |
| $r_{15}$ = 4.55 | $d_{15}$ = (Variable) | | |
| $r_{16}$ = 13.67(Aspheric) | $d_{16}$ = 2.4 | $n_{d9}$ = 1.6935 | $v_{d9}$ = 53.21 |
| $r_{17}$ = 118.93(Aspheric) | $d_{17}$ = (Variable) | | |
| $r_{18}$ = ∞ | $d_{18}$ = 0.9 | $n_{d10}$ = 1.54771 | $v_{d10}$ = 62.84 |
| $r_{19}$ = ∞ | $d_{19}$ = 0.5 | | |
| $r_{20}$ = ∞ | $d_{20}$ = 0.5 | $n_{d11}$ = 1.51633 | $v_{d11}$ = 64.14 |
| $r_{21}$ = ∞ | $d_{21}$ = 0.6 | | |
| $r_{22}$ = ∞(Image plane) | | | |

Aspherical Coefficients

11th surface

K = 0.318
$A_4 = -2.19 \times 10^{-5}$
$A_6 = -1.54 \times 10^{-5}$
$A_8 = 6.85 \times 10^{-7}$
$A_{10} = -9.65 \times 10^{-9}$ -continued 12th surface K = 3.8779
$A_4 = 1.08 \times 10^{-4}$
$A_6 = -1.61 \times 10^{-5}$
$A_8 = 7.49 \times 10^{-7}$
$A_{10} = -1.07 \times 10^{-8}$ 16th surface K = 0.2738
$A_4 = -1.22 \times 10^{-4}$
$A_6 = 6.35 \times 10^{-6}$
$A_8 = -8.03 \times 10^{-7}$
$A_{10} = 1.79 \times 10^{-8}$ 17th surface K = −39.6532
$A_4 = -1.43 \times 10^{-4}$
$A_6 = 8.51 \times 10^{-6}$
$A_8 = -1.08 \times 10^{-6}$
$A_{10} = 2.63 \times 10^{-8}$ Zooming Data (∞)

|  | WE | ST | TE |
|---|---|---|---|
| f (mm) | 6.4 | 20.1 | 62.6 |
| $F_{NO}$ | 2.9 | 3.5 | 4.4 |
| $d_3$ | 1.1 | 16.6 | 26.4 |
| $d_9$ | 26.5 | 8.8 | 1.5 |
| $d_{15}$ | 7.5 | 10.3 | 26.9 |
| $d_{17}$ | 3.8 | 7.2 | 3.4 |

Figure 13A:
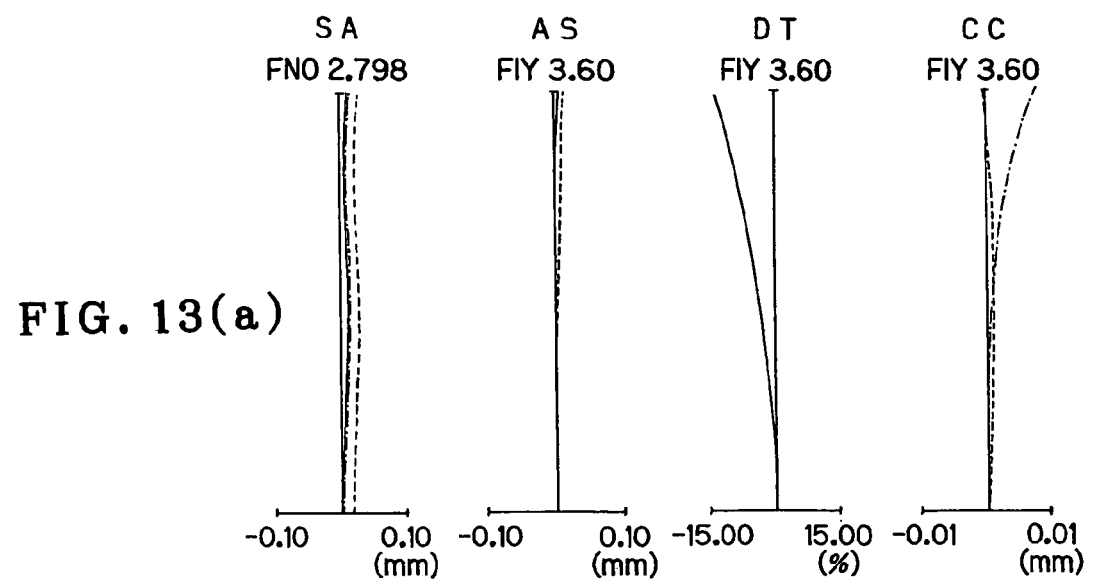
FIG. 13 is a set of aberration diagrams for Example 1 upon focusing on an infinite object point.
Figure 13B:
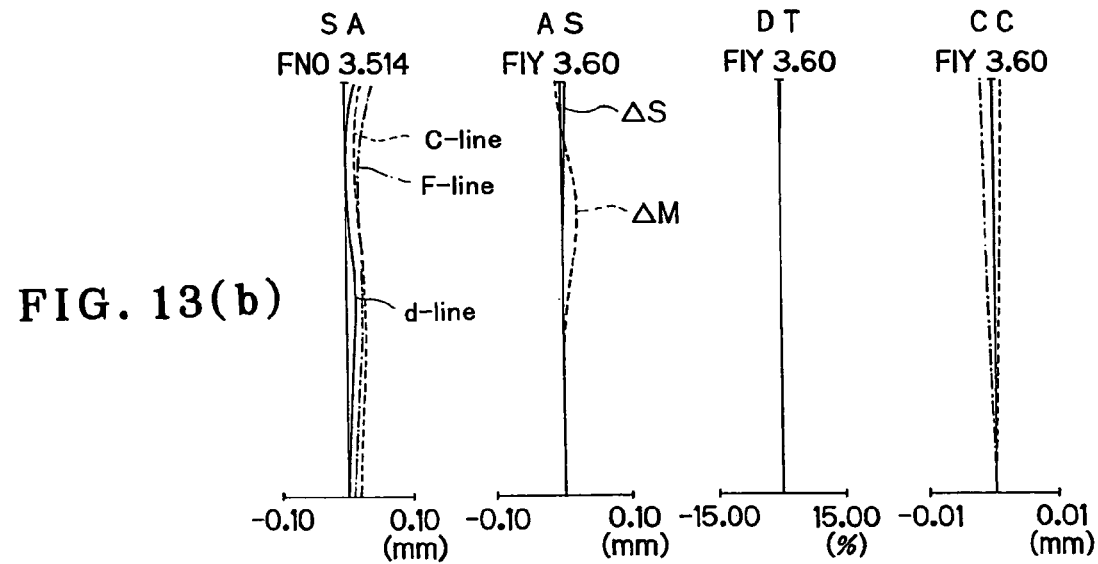
Figure 13C:
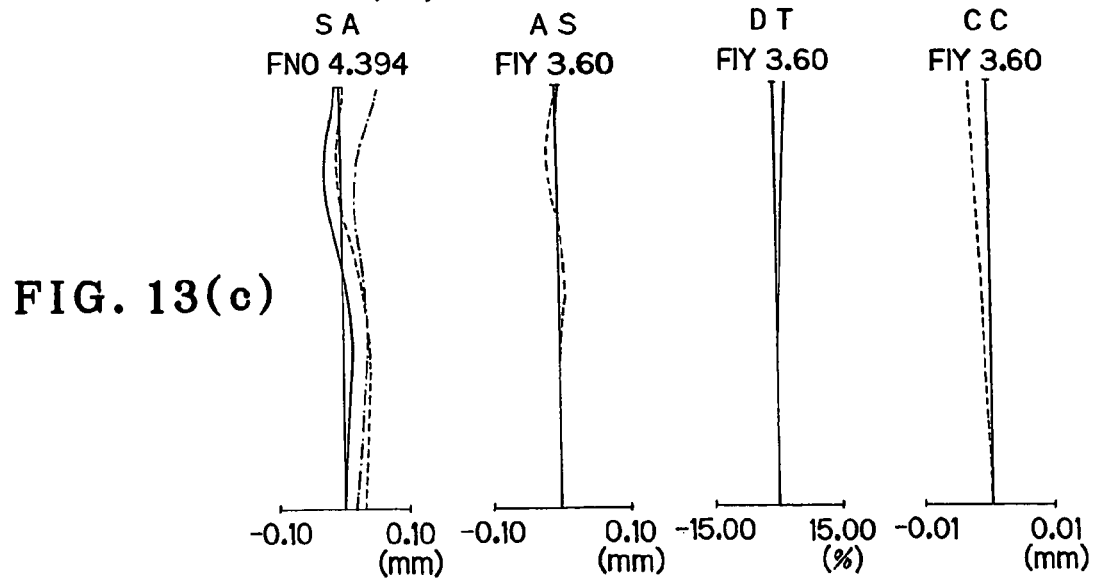
Figure 14A:
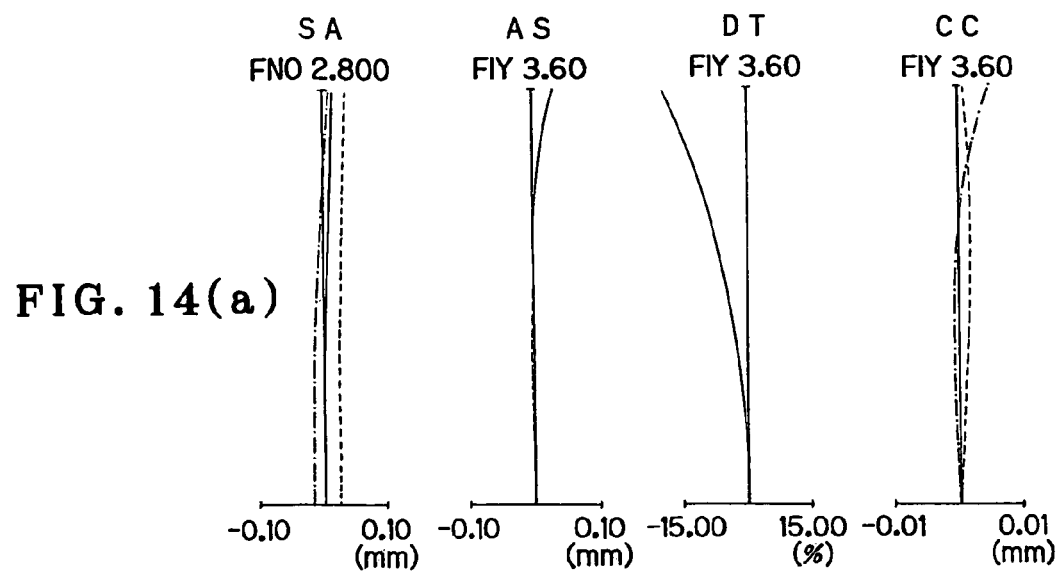
FIG. 14 is a set of aberration diagrams for Example 2 upon focusing on an infinite object point.
Figure 14B:
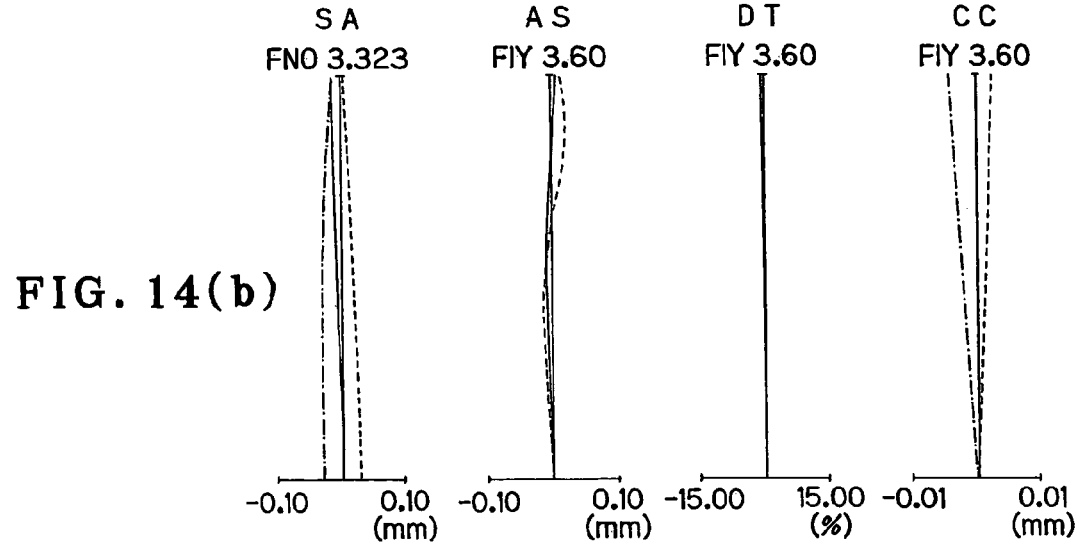
Figure 14C:
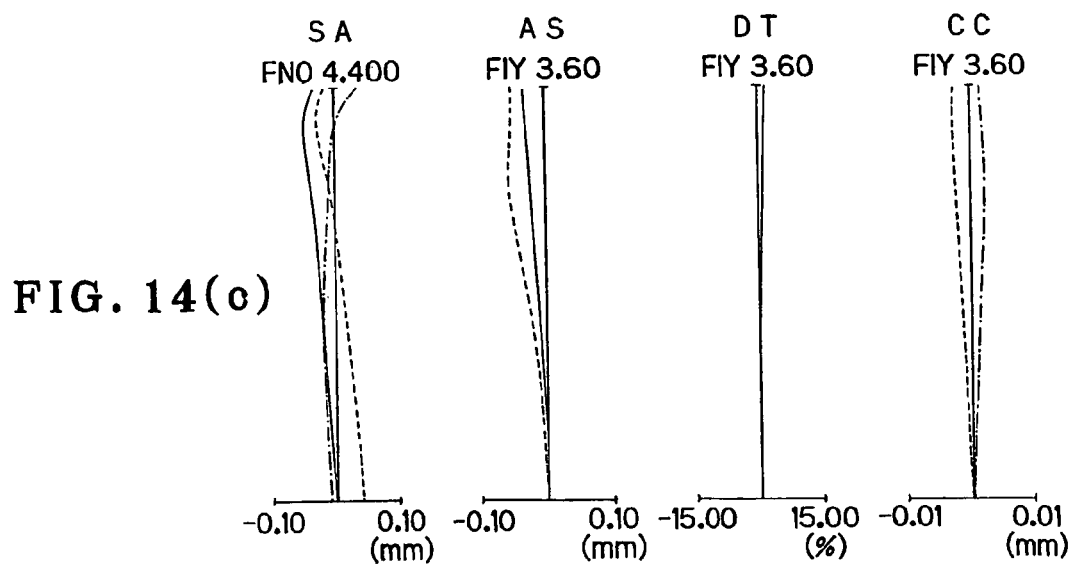
Figure 15A:
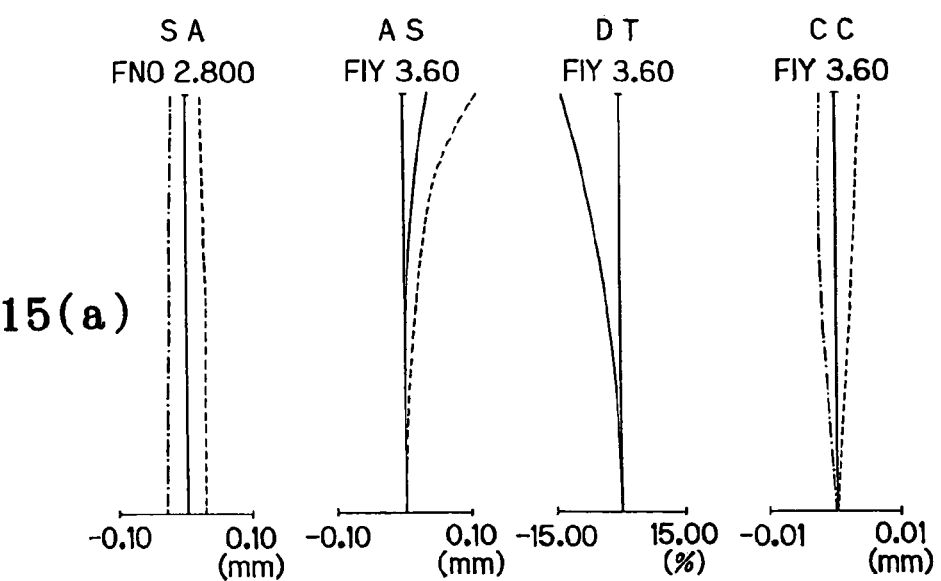
FIG. 15 is a set of aberration diagrams for Example 3 upon focusing on an infinite object point.
Figure 15B:
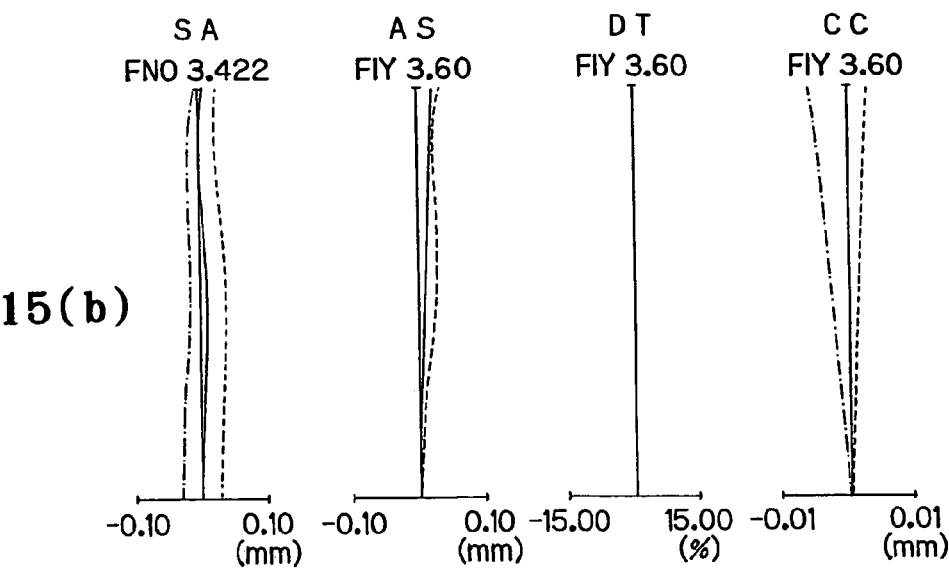
Figure 15C:
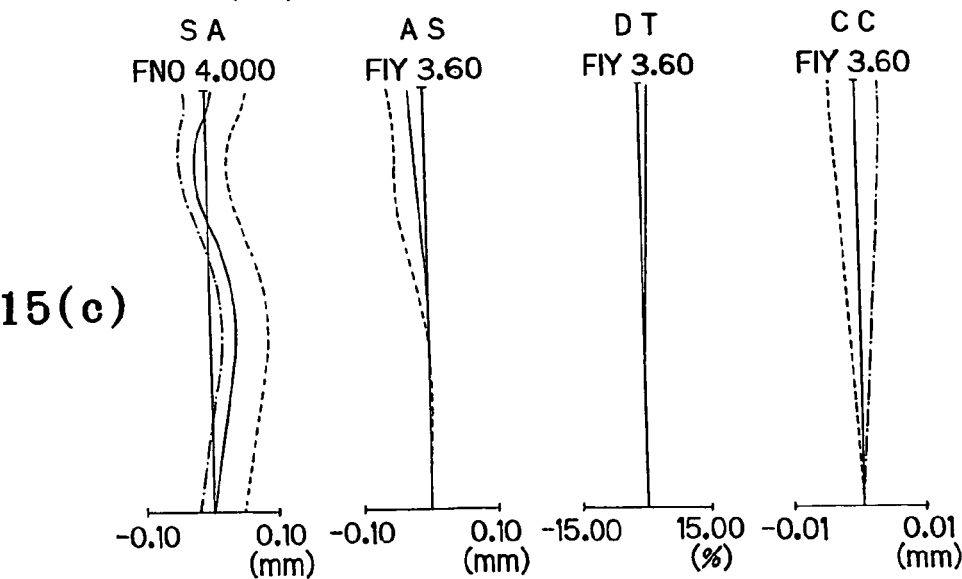
Figure 16A:
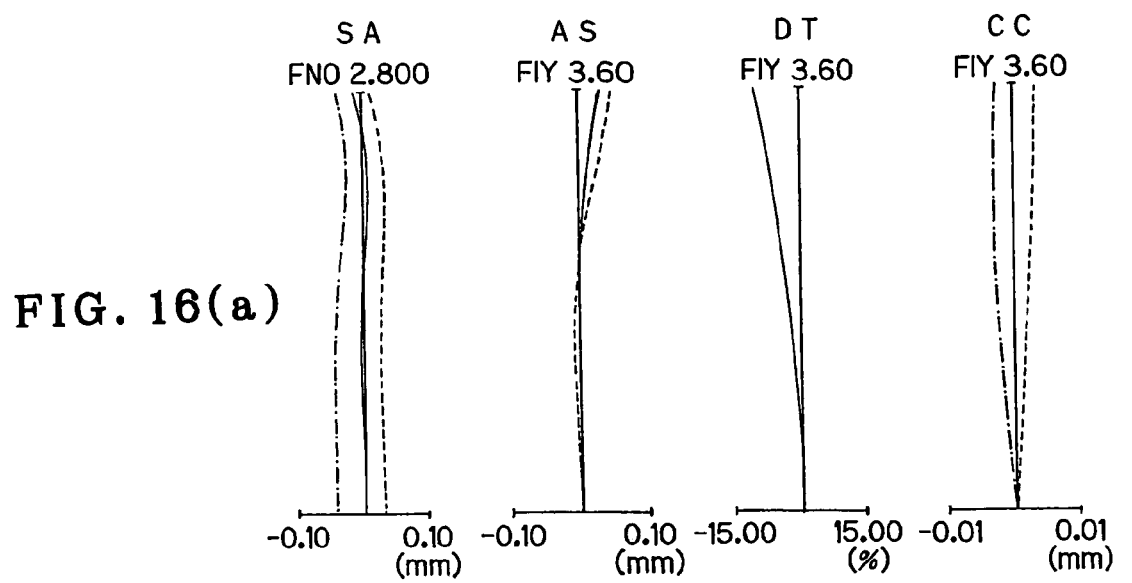
FIG. 16 is a set of aberration diagrams for Example 4 upon focusing on an infinite object point.
Figure 16B:
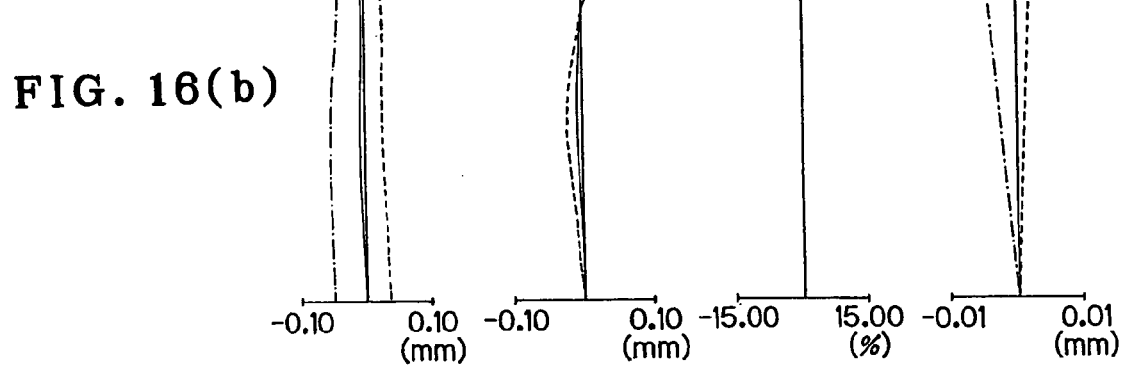
Figure 16C:
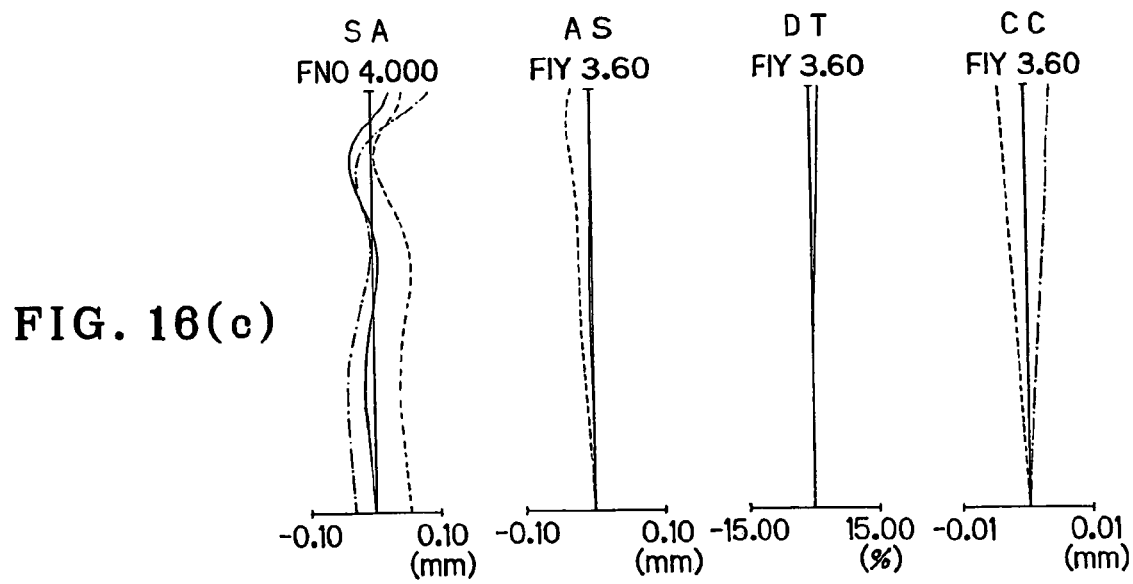
Figure 17A:
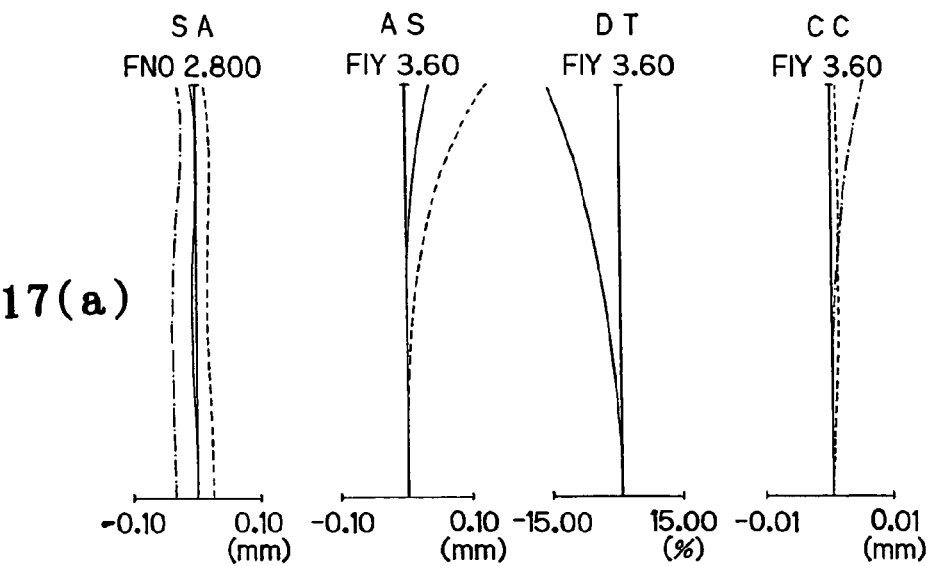
FIG. 17 is a set of aberration diagrams for Example 5 upon focusing on an infinite object point.
Figure 17B:
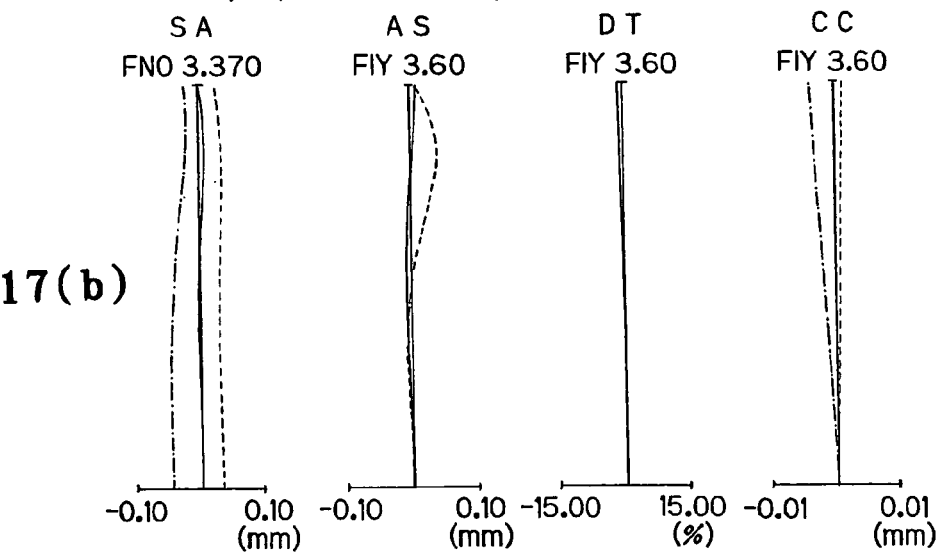
Figure 17C:
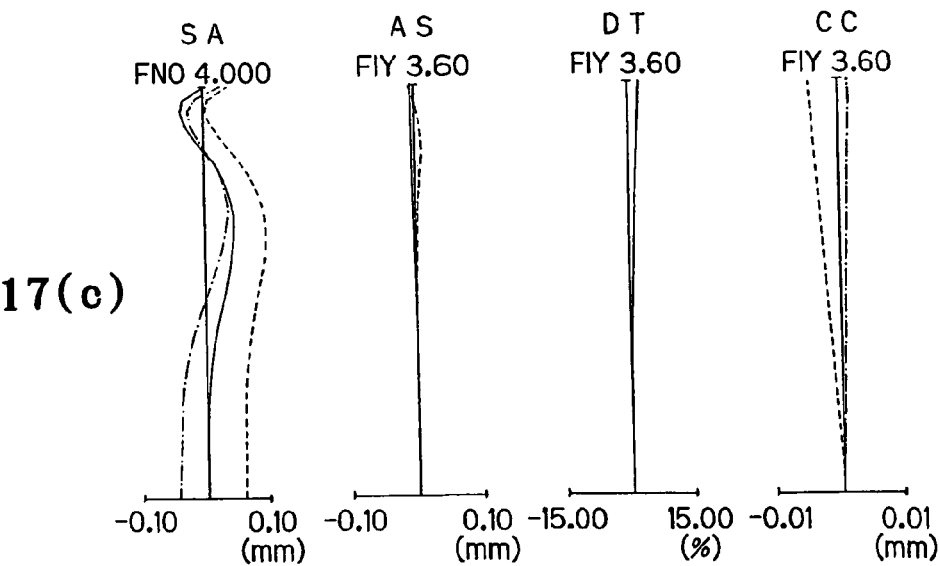
Figure 18A:
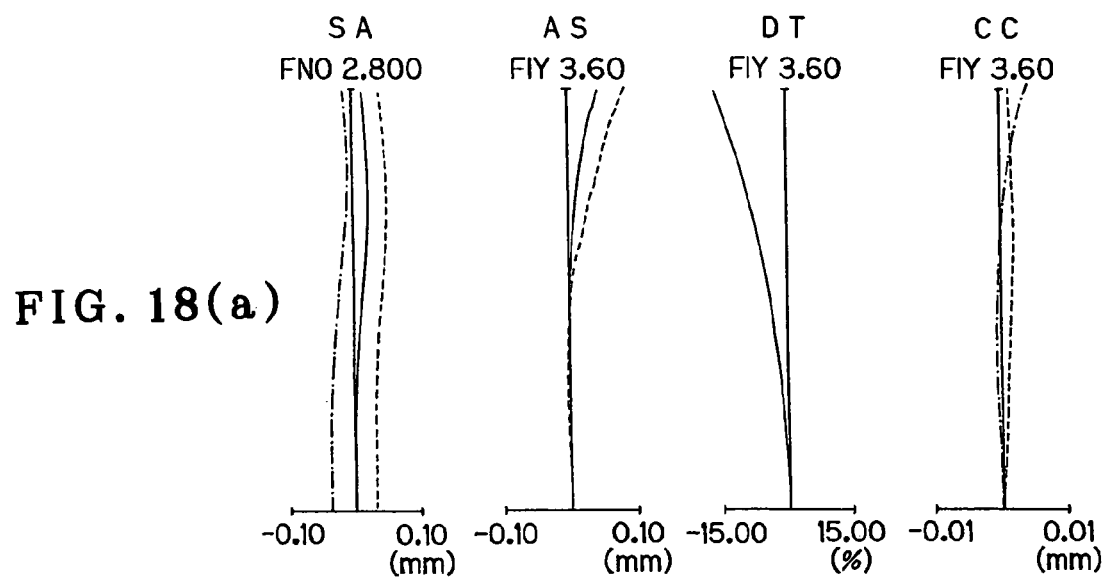
FIG. 18 is a set of aberration diagrams for Example 6 upon focusing on an infinite object point.
Figure 18B:
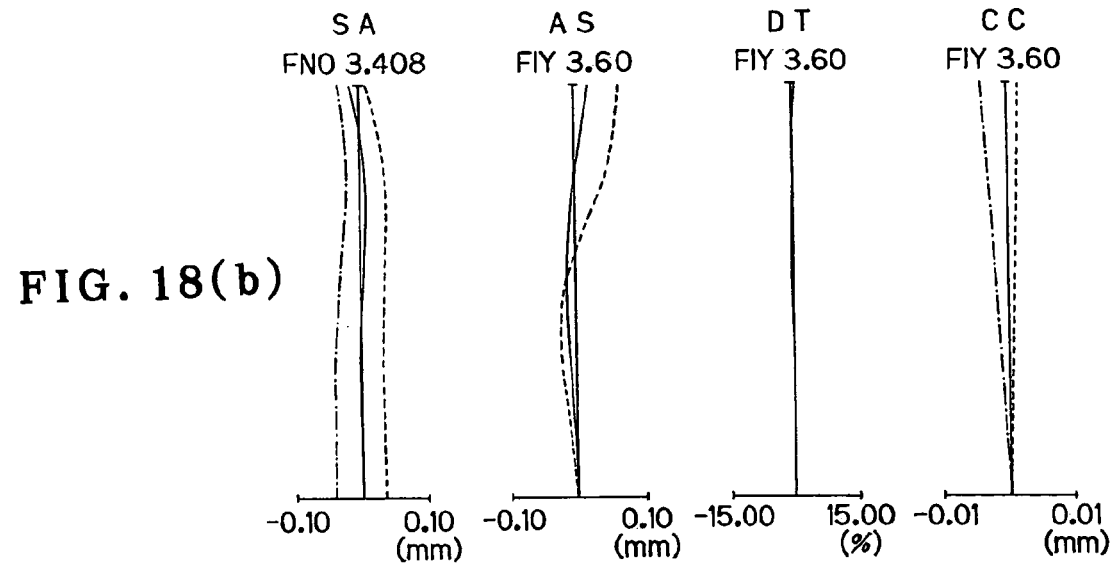
Figure 18C:
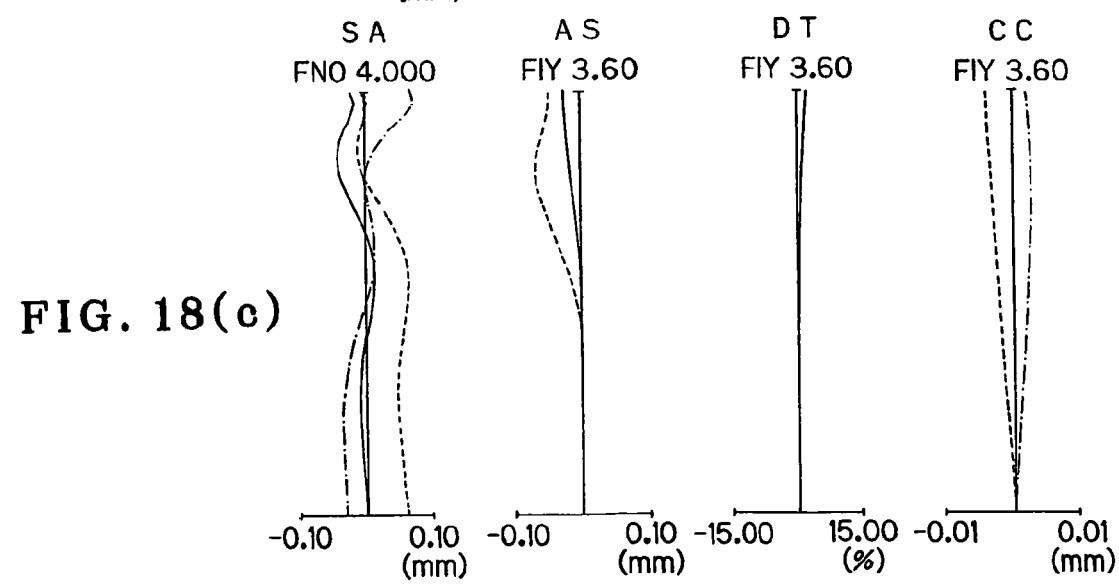
Figure 19A:
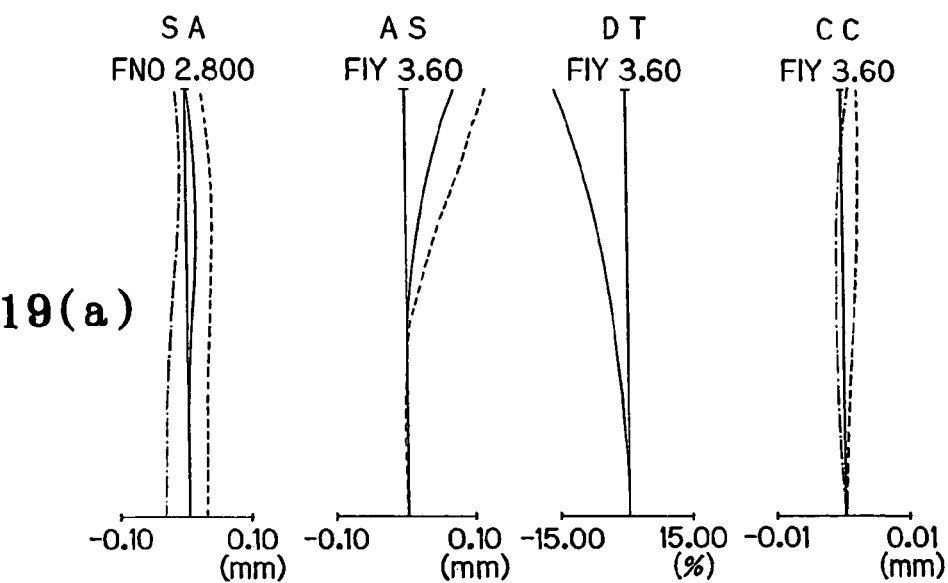
FIG. 19 is a set of aberration diagrams for Example 7 upon focusing on an infinite object point.
Figure 19B:
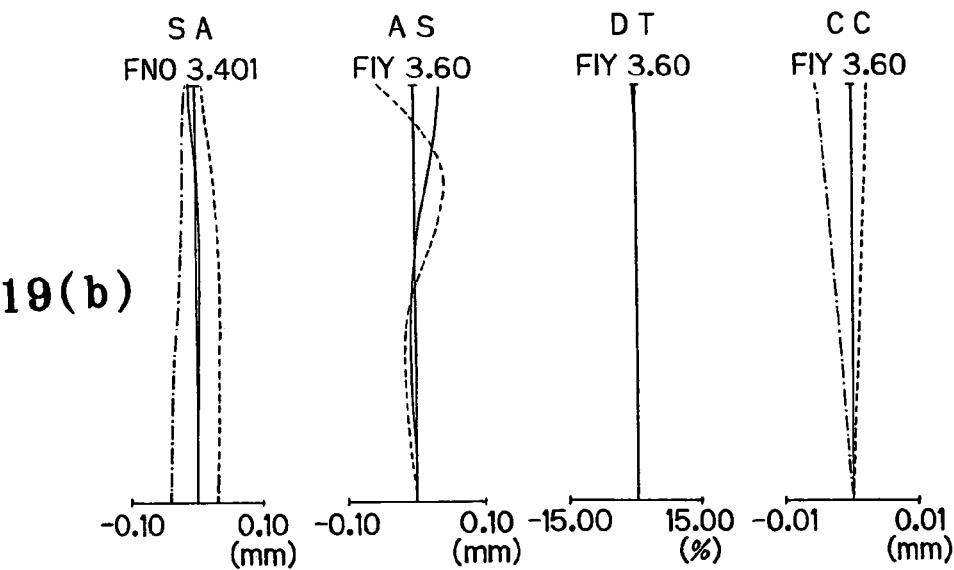
Figure 19C:
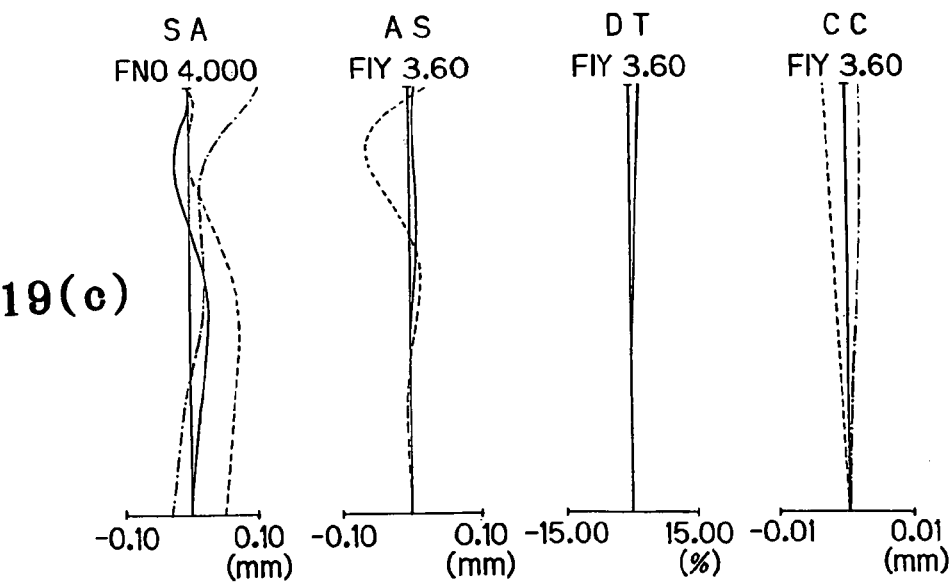
Figure 20A:
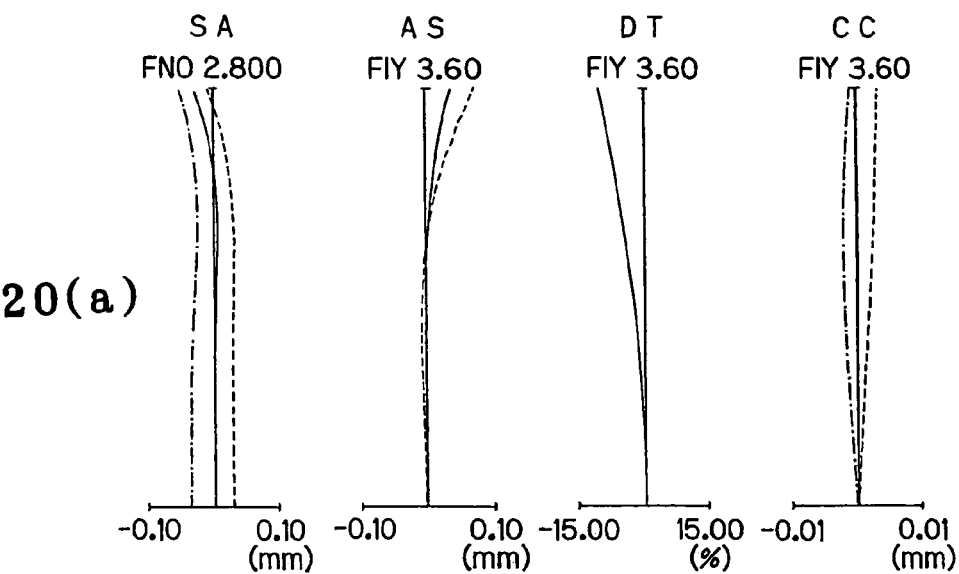
FIG. 20 is a set of aberration diagrams for Example 8 upon focusing on an infinite object point.
Figure 20B:
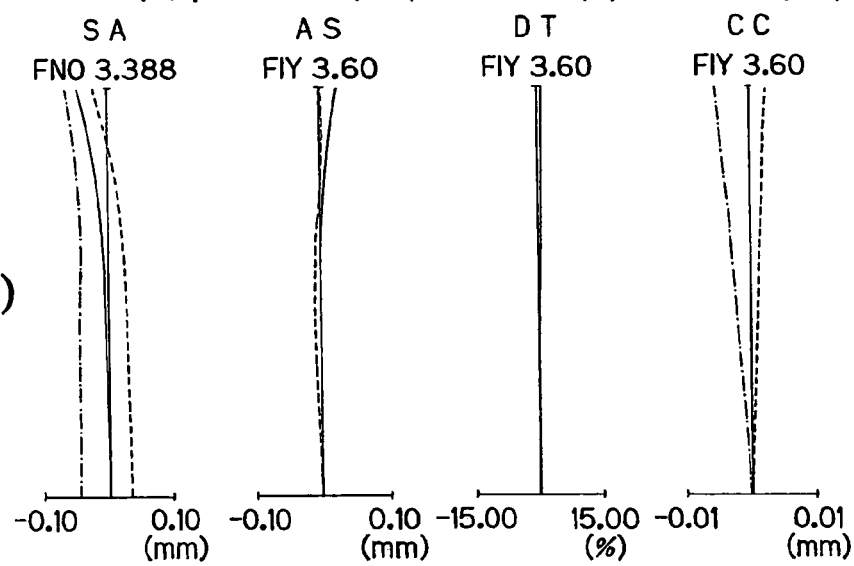
Figure 20C:
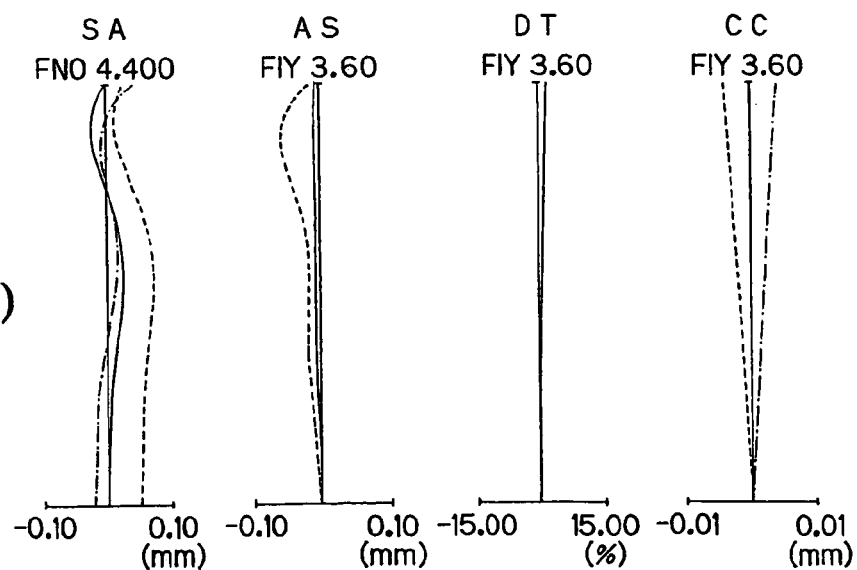
Figure 21A:
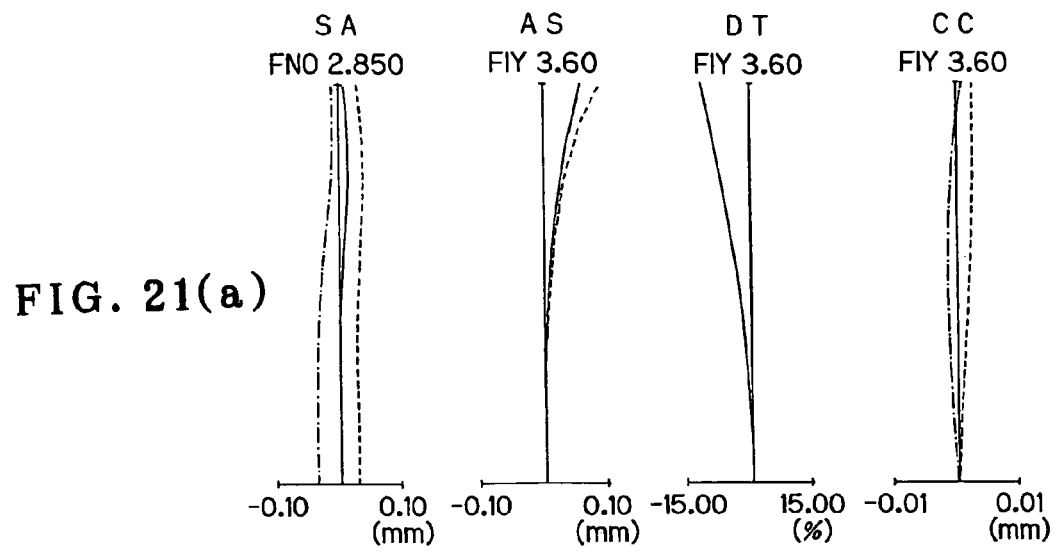
FIG. 21 is a set of aberration diagrams for Example 9 upon focusing on an infinite object point.
Figure 21B:
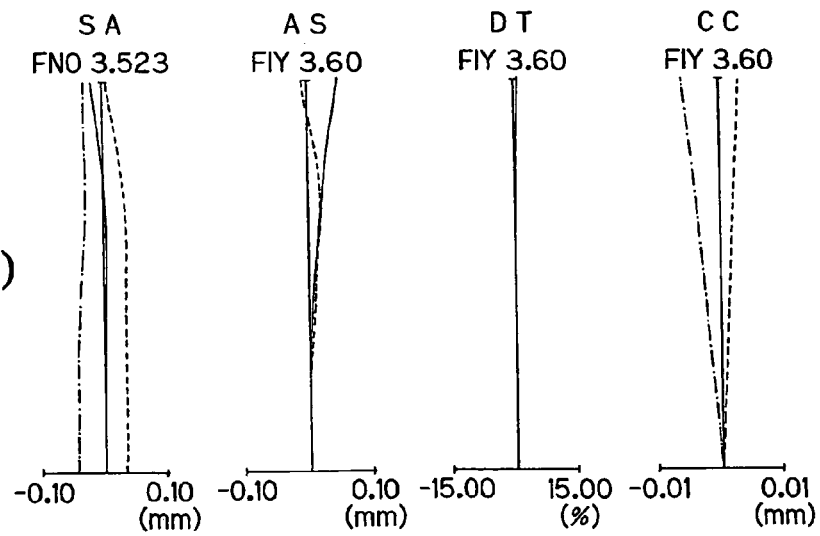
Figure 21C:
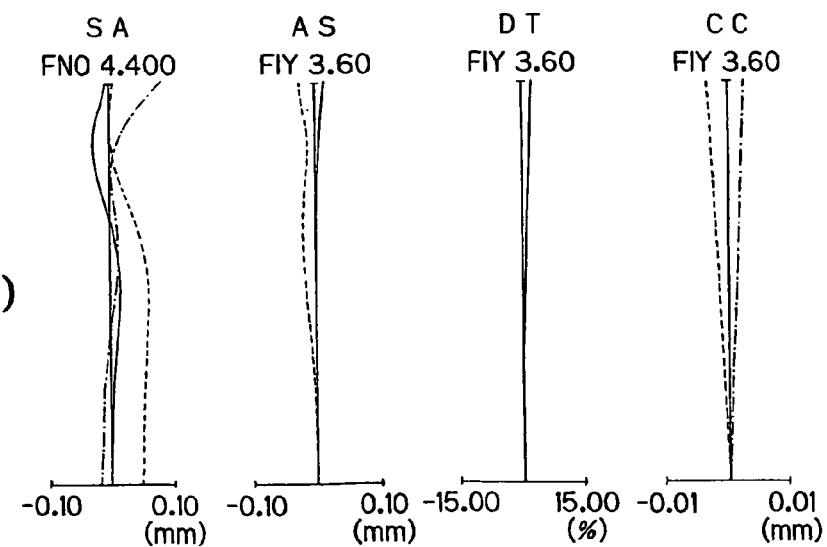
Figure 22A:
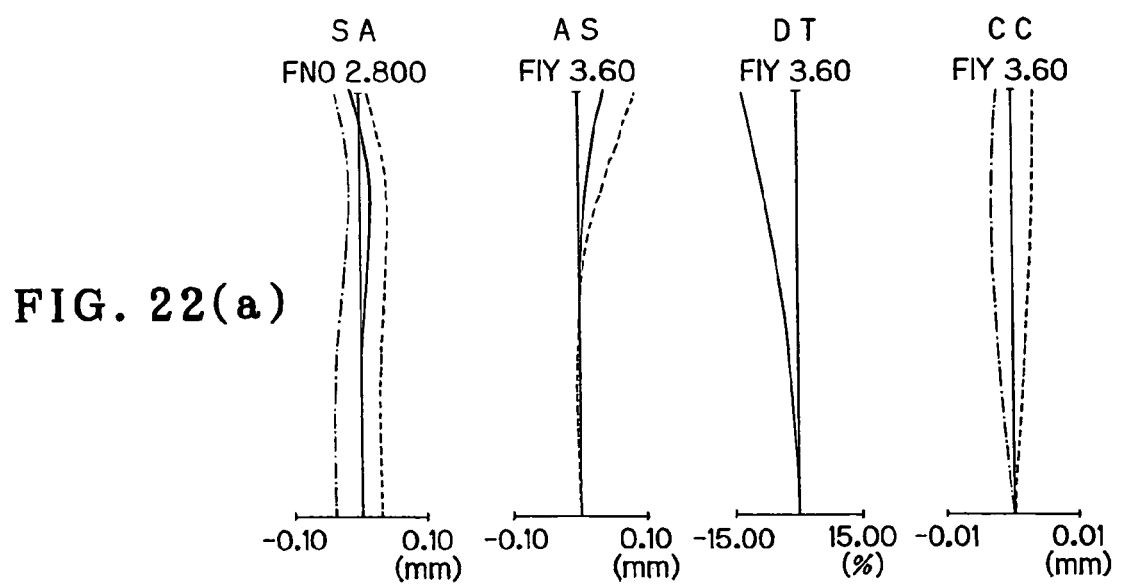
FIG. 22 is a set of aberration diagrams for Example 10 upon focusing on an infinite object point.
Figure 22B:
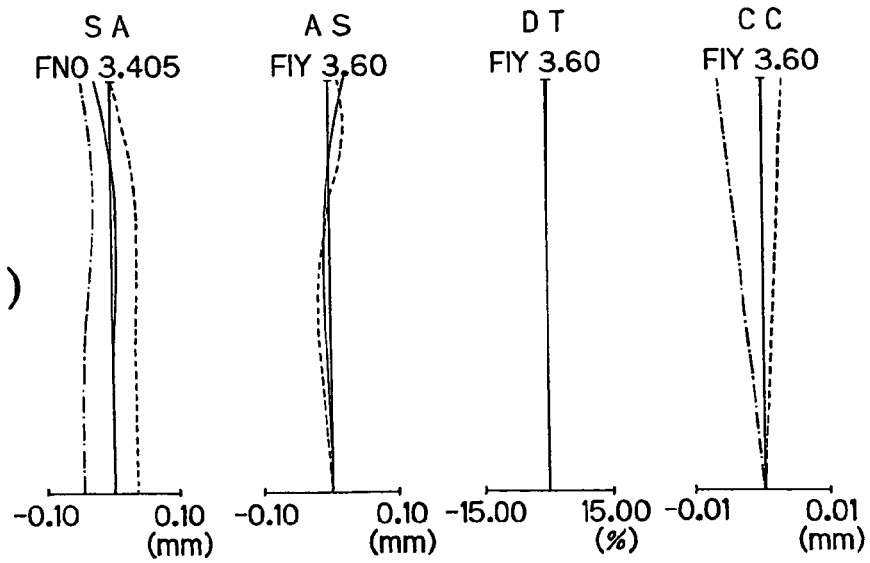
Figure 22C:
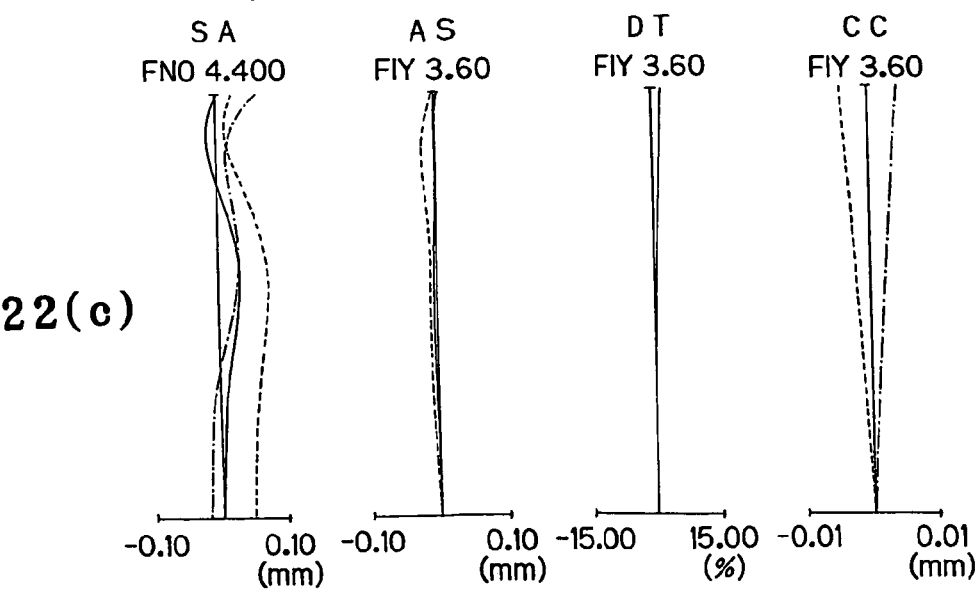

FIGS. 13(*a-c*)-24(*a-c*) are aberration diagrams for Examples 1-12 upon focusing on an infinite object point. These aberration diagrams are indicative of spherical aberrations (SA), astigmatism (AS), distortion (DT) and chromatic aberration of magnification (CC) at the wide-angle end (a), in the intermediate setting (b) and at the telephoto end (c).

Throughout FIGS. 13(*a-c*)-24(*a-c*), "FIY" stands for the maximum image height.

The angles of view and the values of conditions (1)-(27) and (31)-(46) in Examples 1-12 are enumerated below.

EXAMPLE

| Condition | 1 | 2 | 3 | 4 | 5 | 6 |
|---|---|---|---|---|---|---|
| (1) | 9.70 | 9.71 | 9.71 | 9.71 | 9.71 | 9.71 |
| (2) | 10.48 | 11.31 | 10.57 | 9.46 | 9.97 | 9.80 |
| (3) | 0.54 | 0.49 | 0.53 | 0.79 | 0.52 | 0.62 |
| (4) | 1.02 | 0.86 | 0.87 | 0.87 | 0.86 | 0.86 |
| (5) | 9.91 | 8.32 | 8.40 | 8.40 | 8.39 | 8.39 |
| (6) | 1.90 | 1.90 | 1.90 | 1.90 | 1.92 | 1.85 |
| (7) | 31.31 | 31.31 | 31.31 | 31.31 | 20.88 | 23.78 |
| (8) | 1.88 | 1.88 | 1.88 | 1.88 | 1.88 | 1.88 |
| (9) | 1.88 | 1.88 | 1.88 | 1.88 | 1.88 | 1.88 |
| (10) | 1.92 | 1.92 | 1.92 | 1.92 | 1.92 | 1.92 |
| (11) | −1.42 | −2.00 | −1.84 | −1.73 | −1.80 | −1.81 |
| (12) | 8.62 | 7.44 | 8.11 | 8.21 | 8.40 | 8.24 |
| (13) | 1.98 | 1.58 | 1.46 | 1.16 | 1.40 | 1.25 |
| (14) | 0.45 | 0.37 | 0.42 | 0.43 | 0.44 | 0.43 |
| (15) | 0.40 | 0.45 | 0.42 | 0.42 | 0.42 | 0.43 |
| (16) | 2.81 | 2.99 | 2.97 | 3.69 | 2.95 | 3.38 |
| (17) | 0.86 | 1.85 | 1.44 | 1.72 | 1.77 | 1.83 |
| (18) | 0.44 | 0.33 | 0.38 | 0.32 | 0.34 | 0.33 |
| (19) | 0.72 | 0.65 | 0.69 | 0.71 | 0.71 | 0.72 |
| (20) | 0.24 | 0.33 | 0.29 | 0.30 | 0.29 | 0.30 |
| (21) | 2.34 | 3.20 | 2.82 | 2.87 | 2.79 | 2.92 |
| (22) | 3.26 | 3.62 | 3.23 | 2.89 | 3.13 | 3.09 |

-continued

| Condition | 1 | 2 | 3 | 4 | 5 | 6 |
|---|---|---|---|---|---|---|
| (22) | 0.99 | 0.86 | 1.02 | 1.13 | 1.02 | 1.03 |
| (24) | 0.07 | 0.07 | 0.08 | 0.07 | 0.07 | 0.07 |
| (25) | 0.092 | 0.089 | 0.103 | 0.097 | 0.089 | 0.098 |
| (26) | 9.71 | 9.71 | 9.71 | 9.71 | 9.71 | 9.71 |
| (27) | −14.02 | −20.12 | −14.09 | −10.33 | −17.21 | −17.47 |
| (31) | 0.39 | 0.65 | 0.68 | 0.72 | 0.64 | 0.70 |
| (32) | −14.02 | −20.12 | −14.09 | −10.33 | −17.21 | −17.47 |
| (33) | 3.19 | 3.09 | 3.31 | 3.30 | 3.14 | 3.21 |
| (34) | 0.89 | 0.77 | 0.84 | 0.85 | 0.87 | 0.85 |
| (35) | −0.19 | −0.17 | −0.17 | −0.18 | −0.17 | −0.18 |
| (36) | 0.26 | 0.26 | 0.25 | 0.25 | 0.24 | 0.25 |
| (37) | 0.68 | 0.40 | 0.36 | 0.35 | 0.38 | 0.35 |
| (38) | 1.31 | 1.33 | 1.33 | 1.33 | 1.33 | 1.33 |
| (39) | 1.16 | 2.31 | 2.78 | 2.96 | 3.16 | 3.10 |
| (40) | 9.91 | 8.32 | 8.40 | 8.40 | 8.39 | 8.39 |
| (41) | 0.99 | 0.85 | 1.03 | 1.14 | 1.00 | 1.05 |
| (42) | 0.89 | 0.87 | 1.00 | 0.94 | 0.87 | 0.95 |
| (43) | 0.13 | 0.12 | 0.12 | 0.12 | 0.12 | 0.11 |
| (44) | 0.08 | 0.10 | 0.10 | 0.11 | 0.11 | 0.10 |
| (45) | 0.33 | 0.34 | 0.37 | 0.36 | 0.36 | 0.35 |
| (46) | 1.90 | 1.90 | 1.90 | 1.90 | 1.92 | 1.85 |

EXAMPLE

| Condition | 7 | 8 | 9 | 10 | 11 | 12 |
|---|---|---|---|---|---|---|
| (1) | 9.71 | 9.71 | 9.71 | 9.71 | 9.71 | 9.71 |
| (2) | 10.25 | 9.59 | 9.43 | 9.60 | 7.40 | 9.43 |
| (3) | 0.50 | 0.78 | 0.75 | 0.74 | 1.21 | 0.75 |
| (4) | 0.86 | 0.86 | 0.86 | 0.86 | 0.75 | 0.86 |
| (5) | 8.39 | 8.39 | 8.34 | 8.39 | 7.31 | 8.34 |
| (6) | 1.90 | 1.90 | 1.90 | 1.90 | 1.85 | 1.90 |
| (7) | 31.31 | 31.31 | 31.31 | 31.31 | 23.78 | 31.31 |
| (8) | 1.88 | 1.88 | 1.88 | 1.88 | 1.52 | 1.88 |
| (9) | 1.88 | 1.88 | 1.88 | 1.88 | 1.52 | 1.88 |
| (10) | 1.92 | 1.92 | 1.92 | 1.92 | 1.92 | 1.92 |
| (11) | −1.83 | −1.77 | −1.76 | −1.77 | −0.89 | −1.76 |
| (12) | 8.08 | 8.26 | 8.17 | 8.16 | 6.15 | 8.17 |
| (13) | 1.34 | 1.24 | 1.16 | 1.28 | 0.98 | 1.16 |
| (14) | 0.42 | 0.42 | 0.42 | 0.42 | 0.34 | 0.42 |
| (15) | 0.42 | 0.43 | 0.43 | 0.44 | 0.26 | 0.43 |
| (16) | 3.20 | 3.48 | 3.66 | 3.38 | 4.16 | 3.66 |
| (17) | 1.65 | 1.86 | 1.88 | 1.82 | 0.72 | 1.88 |
| (18) | 0.35 | 0.31 | 0.33 | 0.32 | 0.56 | 0.33 |
| (19) | 0.70 | 0.71 | 0.71 | 0.71 | 0.54 | 0.71 |
| (20) | 0.29 | 0.30 | 0.30 | 0.30 | 0.11 | 0.30 |
| (21) | 2.86 | 2.94 | 2.94 | 2.95 | 1.11 | 2.94 |
| (22) | 3.11 | 3.03 | 2.94 | 3.04 | 1.08 | 2.94 |
| (22) | 1.06 | 1.04 | 1.09 | 1.04 | 6.39 | 1.09 |
| (24) | 0.08 | 0.08 | 0.08 | 0.08 | 0.13 | 0.08 |
| (25) | 0.103 | 0.107 | 0.107 | 0.103 | 0.146 | 0.107 |
| (26) | 9.71 | 9.71 | 9.71 | 9.71 | 9.71 | 9.71 |
| (27) | −16.29 | −10.71 | −12.47 | −12.73 | −4.07 | −12.51 |
| (31) | 0.70 | 0.72 | 0.72 | 0.71 | — | 0.72 |
| (32) | −16.29 | −10.71 | −12.47 | −12.73 | — | −12.51 |
| (33) | 3.34 | 3.20 | 3.16 | 3.20 | — | 3.16 |
| (34) | 0.83 | 0.85 | 0.84 | 0.84 | — | 0.84 |
| (35) | −0.17 | −0.18 | −0.18 | −0.18 | — | −0.18 |
| (36) | 0.25 | 0.25 | 0.25 | 0.25 | — | 0.25 |
| (37) | 0.36 | 0.35 | 0.35 | 0.36 | — | 0.35 |
| (38) | 1.33 | 1.33 | 1.33 | 1.33 | — | 1.33 |
| (39) | 2.92 | 2.93 | 2.99 | 2.86 | — | 2.99 |
| (40) | 8.39 | 8.39 | 8.34 | 8.39 | — | 8.34 |
| (41) | 1.08 | 1.05 | 1.08 | 1.05 | — | 1.08 |
| (42) | 1.00 | 1.04 | 1.03 | 1.00 | — | 1.04 |
| (43) | 0.11 | 0.12 | 0.12 | 0.12 | — | 0.12 |
| (44) | 0.11 | 0.10 | 0.10 | 0.10 | — | 0.10 |
| (45) | 0.36 | 0.35 | 0.36 | 0.36 | — | 0.36 |
| (46) | 1.90 | 1.90 | 1.90 | 1.90 | — | 1.90 |

Figure 23A:
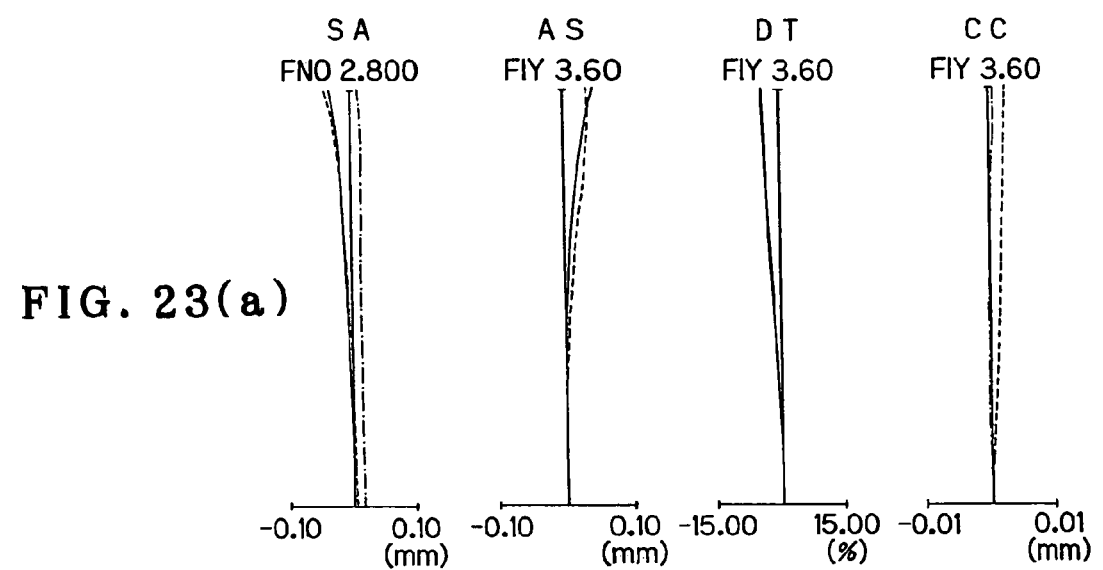
FIG. 23 is a set of aberration diagrams for Example 11 upon focusing on an infinite object point.
Figure 23B:
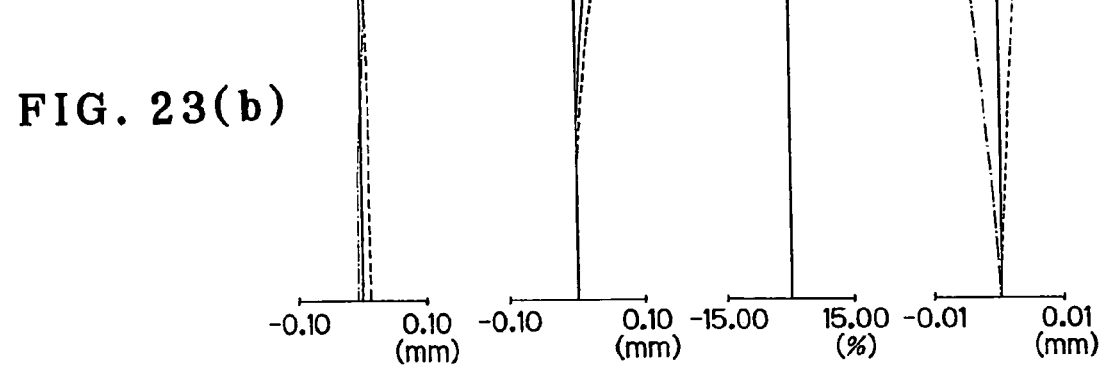
Figure 23C:
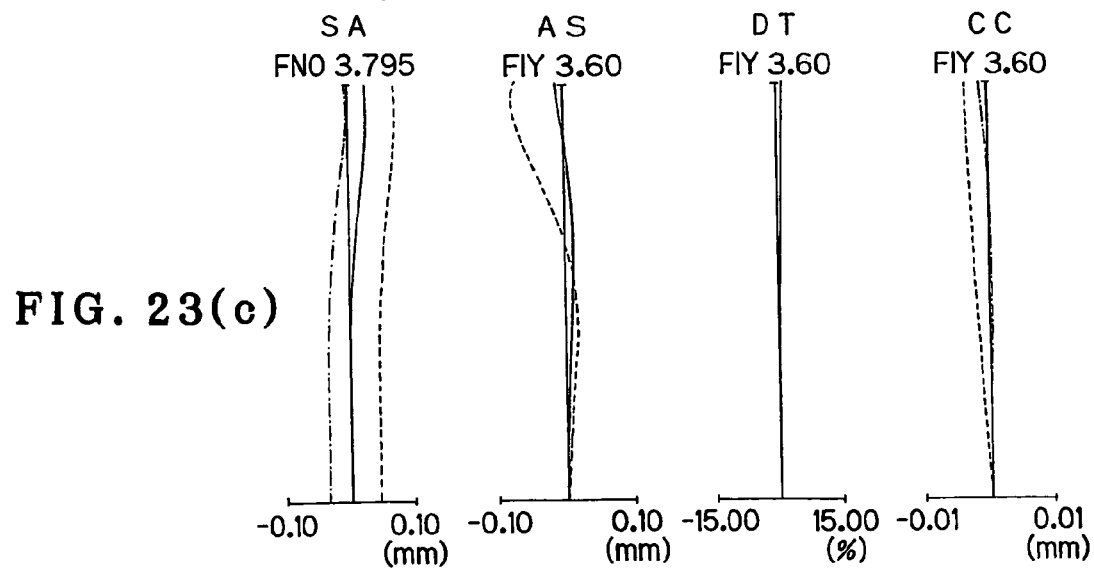
Figure 24A:
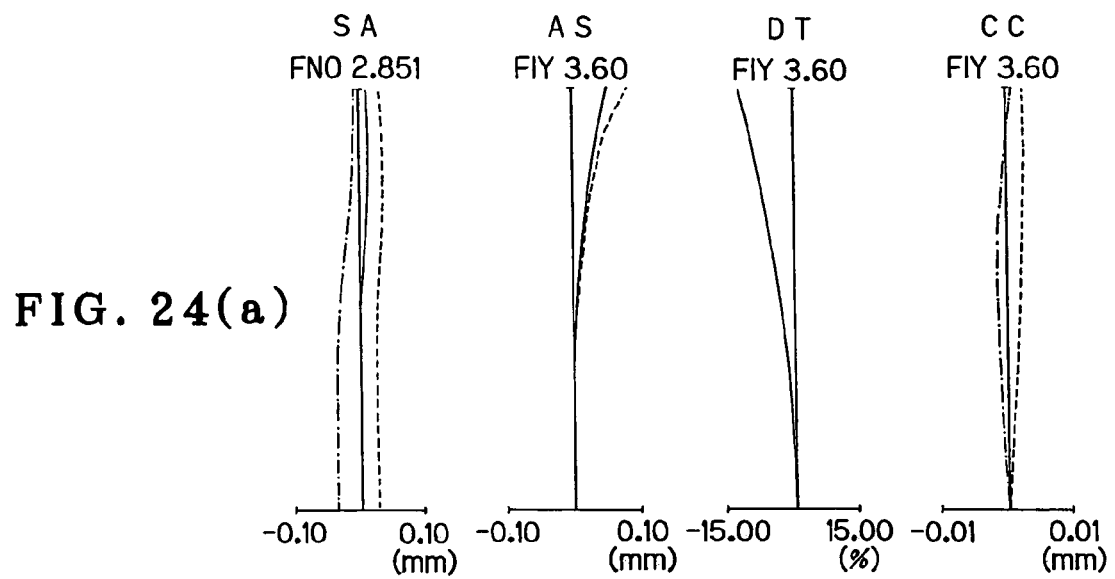
FIG. 24 is a set of aberration diagrams for Example 12 upon focusing on an infinite object point.
Figure 24B:
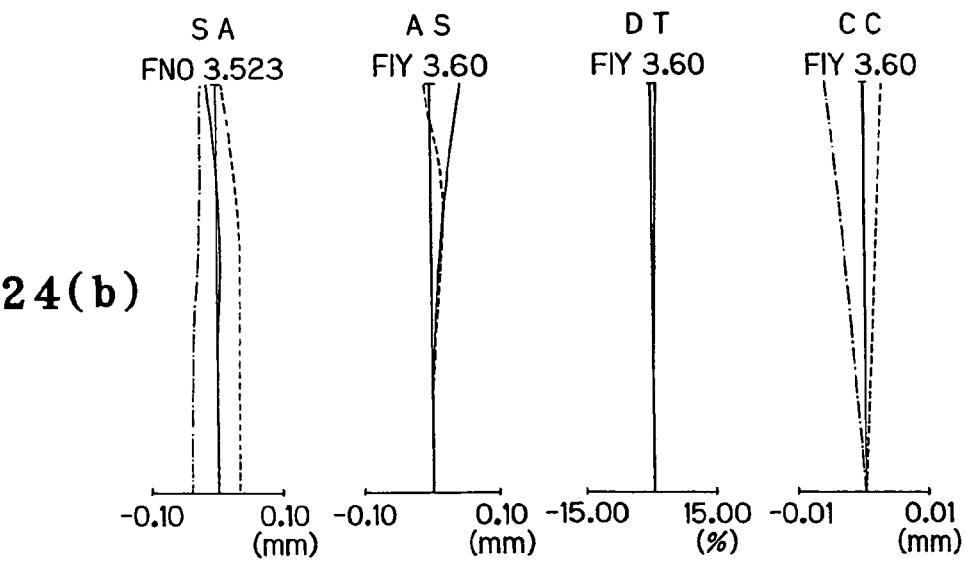
Figure 24C:
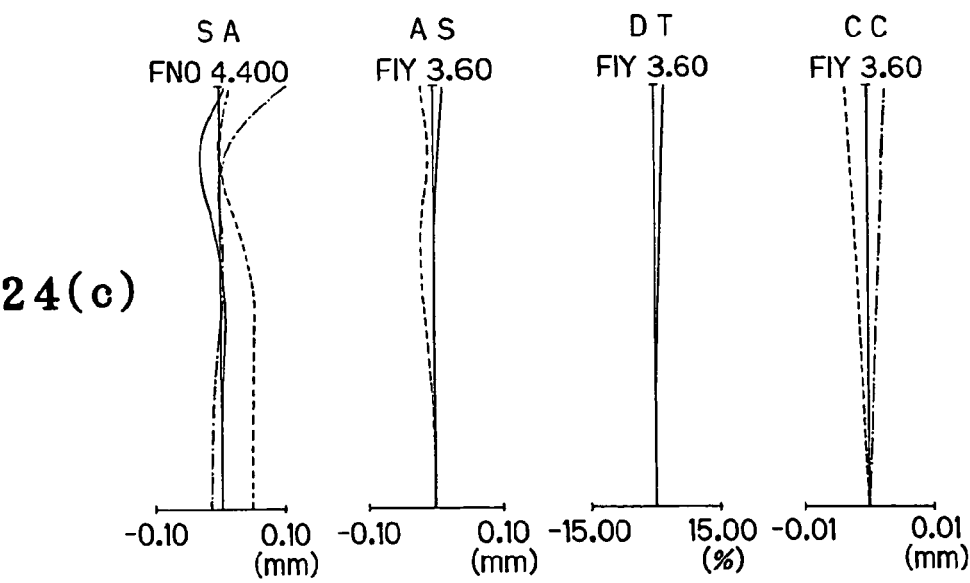
Figure 25:
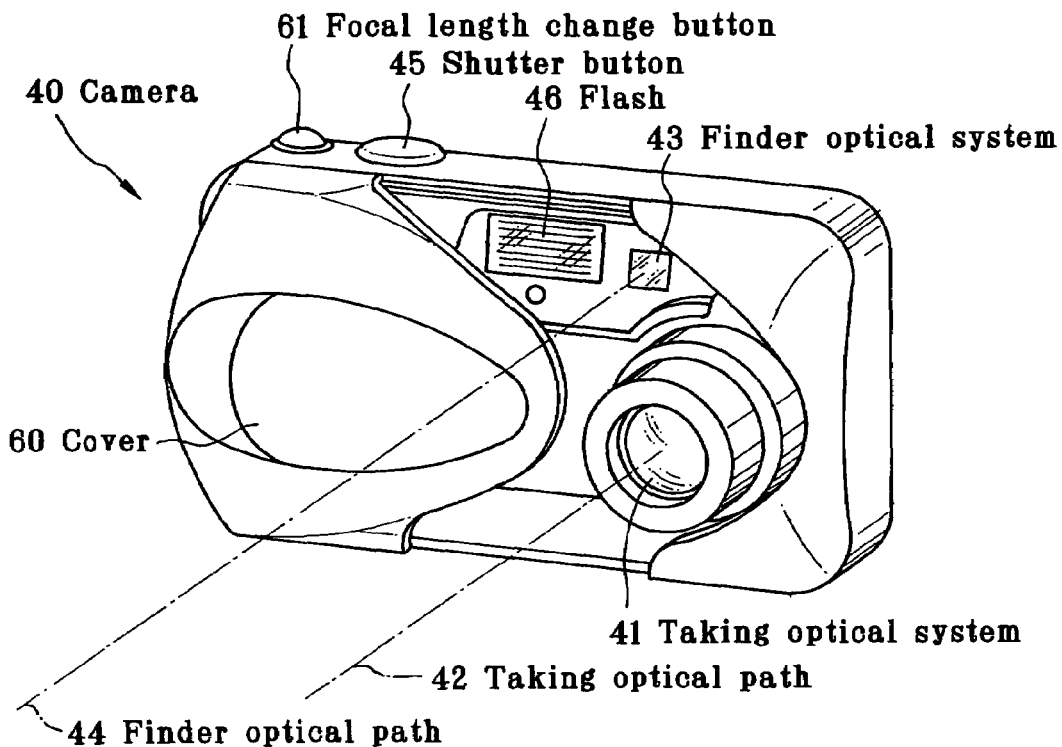
FIG. 25 is a front perspective view of the appearance of a digital camera according to the invention.
Figure 26:
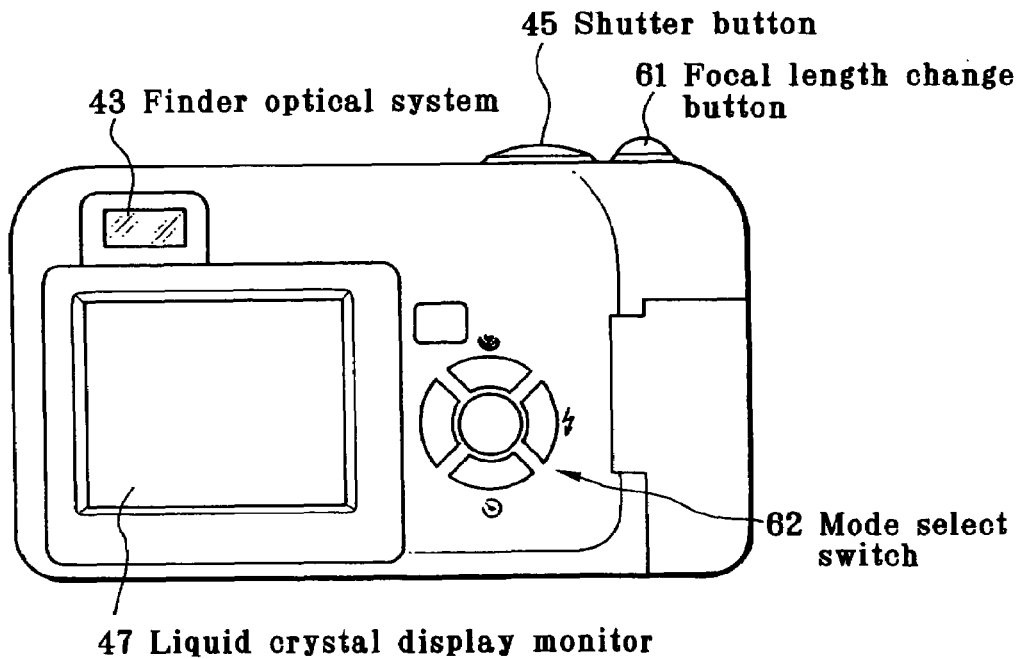
FIG. 26 is a rear perspective view of the digital camera of FIG. 25.
Figure 27:
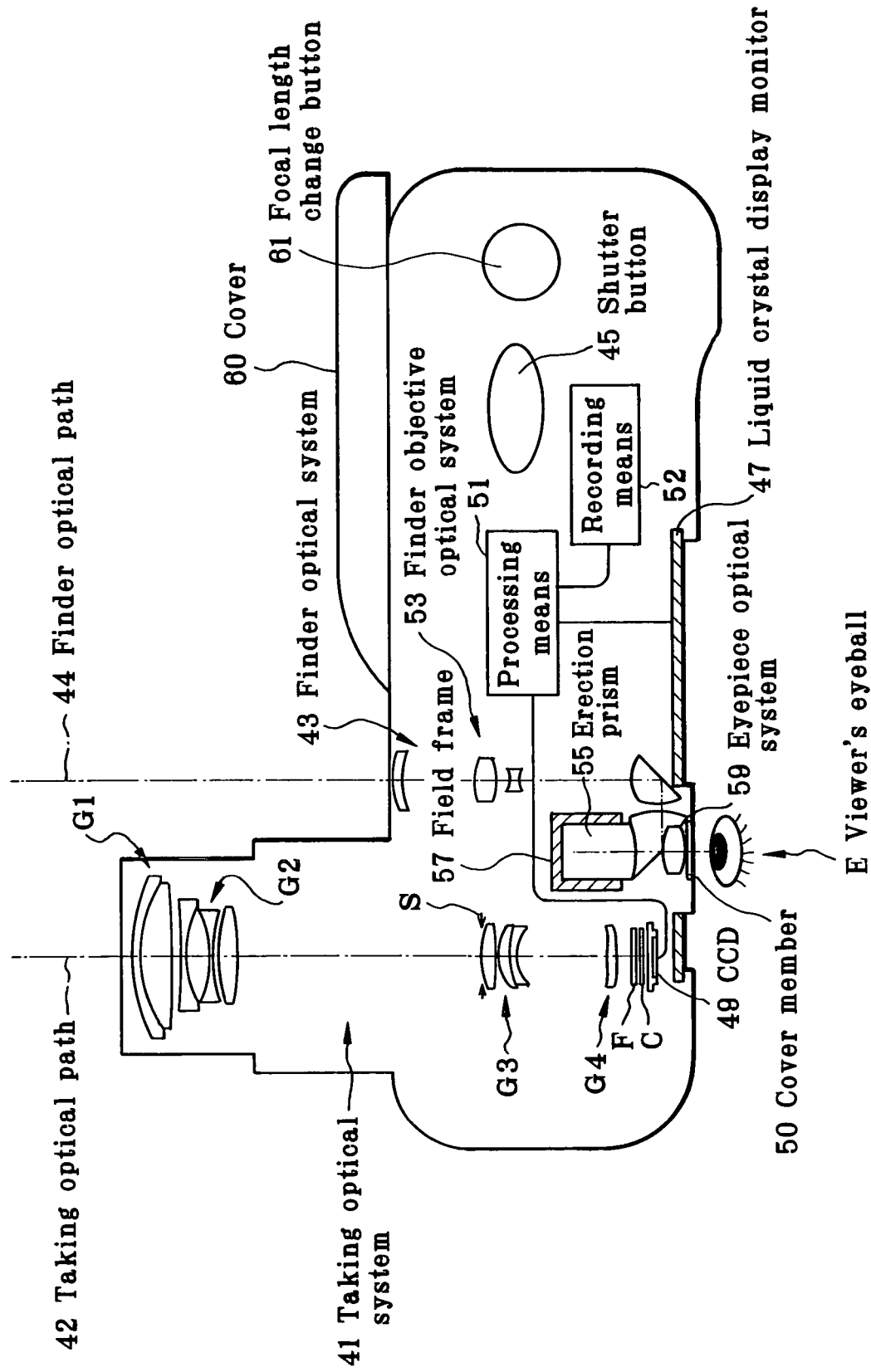
FIG. 27 is a side view of the digital camera of FIG. 25.

FIGS. 23, 24 and 25 are illustrative in conception of the construction of the inventive digital camera in which any one of the zoom lenses as described above is incorporated. Specifically, FIGS. 23 and 24 are a front perspective view and a rear front view of the appearance of the digital camera 40, and FIG. 25 is a schematically perspective plan view of the construction of the digital camera 40. In FIGS. 23 and 25, the zoom lens is shown as being received at a collapsible lens mount. Herein, the digital camera 40 comprises a taking optical system 41 having a taking optical path 42, a finder optical system 43 having a finder optical path 44, a shutter button 45, a flash 45, a liquid crystal display monitor 46, a focal length change button 61, a mode select switch 62, etc. Upon the taking optical system 41 received at a lens collapsible mount, a cover 60 is slid over the taking optical system 41, the finder optical system 43 and the flash 46. As the cover 60 is held open to put the camera 40 in a taking mode, the taking optical system 41 moves out of the collapsible lens mount, as shown in FIG. 25. As the shutter button 45 mounted on an upper portion of the camera 40 is pressed down, a subject image is taken through the taking optical system 41, for instance, the zoom lens of Example 1. An object image formed through the taking optical system 41 is then formed on the image pickup plane of a CCD 49 via a low-pass filter F applied with an IR cut coating and a cover glass C. The object image received at CCD 49 is displayed as an electronic image on the liquid crystal monitor 47 mounted on the back side of the camera via processing means 51. The processing means 51 could be connected with recording means 52 for recording the taken electronic image. Notice here that the recording means 52 could be provided separately from the processing means 51 or a floppy disk, a memory card, an MO or the like could be used for electronic writing/recording. This camera could be set up as a silver-halide camera by using a silver-halide film in place of CCD 49.

Further, a finder objective optical system 53 is mounted on the finder optical path 44. The finder objective optical system 53 comprises a zoom optical system that comprises a plurality of lens groups (three in FIGS. 23-25) and two prisms and has a focal length varying in association with the zoom lens that is the taking optical system 41. An object image formed through this finder objective optical system 53 is then formed on a field frame 57 of an erection prism 55 that is an image-erection member. In the rear of the erection prism 55, there is an eyepiece optical system 59 for guiding the erected image to a viewer's eyeball E. A cover member 50 is located on the exit side of the eyepiece optical system 59.

With the thus constructed digital camera 40, high performance and size reductions are achievable, because the taking optical system 41 according to the invention is much more reduced in thickness upon received at the collapsible lens mount, and has very stable image-formation capability all over the zoom range, albeit having high zoom ratios.

What we claim is:

1. A four-group zoom lens comprising, in order from an object side thereof, a first lens group of positive refracting power, a second lens group of negative refracting power, a third lens group of positive refracting power and a fourth lens group, wherein:

for zooming from a wide-angle end to a telephoto end of the zoom lens, said first lens group, said second lens group, said third lens group and said fourth lens group are each operable to move with a varying space between adjacent lens groups, said second lens group comprises three lenses, said zoom lens further comprises an aperture stop between said second lens group and said third lens group, wherein said aperture stop is positioned nearer to an image side of the zoom lens at the wide-angle end than at the telephoto end, and said zoom lens satisfies the following conditions:

$$7 < (\beta_{2t} \cdot \beta_{3t} \cdot \beta_{4w})/(\beta_{2w} \cdot \beta_{3w} \cdot \beta_{4t}) < 15 \quad (1)$$

$$7 < (\beta_{2t} \cdot \beta_{3t})/(\beta_{2w} \cdot \beta_{3w}) < 15 \quad (2)$$

where:

$\beta_{2t}$ is a magnification of the second lens group at the telephoto end, $\beta_{3t}$ is a magnification of the third lens group at the telephoto end, $\beta_{4t}$ is a magnification of the fourth lens group at the telephoto end, $\beta_{2w}$ is a magnification of the second lens group at the wide-angle end, $\beta_{3w}$ is a magnification of the third lens group at the wide-angle end, and $\beta_{4w}$ is a magnification of the fourth lens group at the wide-angle end.

2. The zoom lens according to claim 1, which further satisfies the following condition:

$$0.77 < (D_{1t} + D_{2w})/f_t < 0.99 \quad (4)$$

where:

$D_{1t}$ is an air separation between the first lens group and the second lens group at the telephoto end, $D_{2w}$ is an air separation between the second lens group and the third lens group at the wide-angle end, and $f_t$ is a focal length of a zoom lens system at the telephoto end.

3. The zoom lens according to claim 2, which satisfies the following condition:

$$8.03 < (D_{1t} + D_{2w})/f_w < 11 \quad (5)$$

where $f_w$ is a focal length of the zoom lens system at the wide-angle end.

4. The zoom lens according to claim 1, wherein said first lens group comprises concave lenses that satisfy the following condition:

$$1.86 < n_{d1N} \quad (6)$$

where $n_{d1N}$ is a d-line refractive index of a vitreous material of any one of the concave lenses in the first lens group.

5. The zoom lens according to claim 1, wherein said first lens group comprises concave lenses that satisfy the following condition:

$$25.8 < \nu_{d1N} \quad (7)$$

where $\nu_{d1n}$ is a d-line base Abbe constant of a vitreous material of any one of the concave lenses in the first lens group.

6. The zoom lens according to claim 1, wherein a first lens in said second lens group as counted from an object side thereof is a concave lens that satisfies the following condition:

$$1.78 < n_{d21} \quad (8)$$

where $n_{d21}$ is a d-line refractive index of a vitreous material of the first lens in the second lens group as counted from the object side thereof.

7. The zoom lens according to claim 1, wherein a second lens group in said second lens group as counted from an object side thereof is a concave lens that satisfies the following condition:

$$1.80 < n_{d22} \quad (9)$$

where $n_{d21}$ is a d-line refractive index of a vitreous material of the second lens in the second lens group as counted from the object side thereof.

8. The zoom lens according to claim 1, wherein a third lens in said second lens group as counted from an object side thereof is a convex lens that satisfies the following condition:

$$1.86 < n_{d23} \quad (10)$$

where $n_{d23}$ is a d-line refractive index of the third lens in the second lens group, as counted from the object side thereof.

9. The zoom lens according to claim 1, wherein said third lens group satisfies the following condition:

$$-2.1 < \beta_{3t} < -1.43 \quad (11).$$

10. The zoom lens according to claim 1, wherein said first lens group satisfies the following condition:

$$6.68 < f_1/f_w < 8.61 \quad (12)$$

where:
  $f_1$ is a composite focal length of the first lens group, and
  $f_w$ is a focal length of a zoom lens system at the wide-angle end.

11. The zoom lens according to claim 1, which further satisfies the following condition:

$$1.1 < D_{3w}/f_w < 1.55 \quad (13)$$

where:
  $D_{3w}$ is an air separation between the third lens group and the fourth lens group at the wide-angle end, and
  $f_w$ is a focal length of a zoom lens system at the wide-angle end.

12. The zoom lens according to claim 1, which further satisfies the following condition:

$$0.4 < D_{1t}/f_t < 0.53 \quad (14)$$

where:
  $D_{1t}$ is an air separation between the first lens group and the second lens group at the telephoto end, and
  $f_t$ is a focal length of a zoom lens system at the telephoto end.

13. The zoom lens according to claim 1, which further satisfies the following condition:

$$0.3 < D_{3t}/f_t < 0.45 \quad (15)$$

where:
  $D_{3t}$ is an air separation between the third lens group and the fourth lens group at the telephoto end, and
  $f_w$ is a focal length of a zoom lens system at the telephoto end.

14. The zoom lens according to claim 1, which further satisfies the following condition:

$$1.68 < D_{2w}/D_{3w} < 3.68 \quad (16)$$

where:
  $D_{2w}$ is an air separation between the second lens group and the third lens group at the wide-angle end, and
  $D_{3w}$ is an air separation between the third lens group and the fourth lens group at the wide-angle end.

15. The zoom lens according to claim 1, wherein said second lens group is moved nearer to the image side at the telephoto end than at the wide-angle end in such a way as to satisfy the following condition:

$$1.2 < \Delta_{s2g}/\Delta_{t2g} < 1.89 \quad (17)$$

where, on condition that an "intermediate focal length setting" is defined by a state that provides a geometric mean focal length of a wide-angle end focal length and a telephoto end focal length,
  $\Delta_{s2g}$ is an amount of movement of the second lens group from the wide-angle end to the intermediate focal length setting, and
  $\Delta_{t2g}$ is an amount of movement of the second lens group from the wide-angle end to the telephoto end with the proviso that the amount of movement in an object direction is taken as positive.

16. The zoom lens according to claim 1, wherein said third lens group is moved nearer to the image side at the telephoto end than at the wide-angle end in such a way as to satisfy the following condition:

$$0 < \Delta_{s3g}/\Delta_{t3g} < 0.44 \quad (18)$$

where, on condition that an "intermediate focal length setting" is defined by a state that provides a geometric mean focal length of a wide-angle end focal length and a telephoto end focal length,
  $\Delta_{s3g}$ is an amount of movement of the third lens group from the wide-angle end to the intermediate focal length setting, and
  $\Delta_{t3g}$ is an amount of movement of the third lens group from the wide-angle end to the telephoto end with the proviso that the amount of movement in an object direction is taken as positive.

17. The zoom lens according to claim 1, which further satisfies the following condition:

$$0.64 < f_2/f_3 < 0.73 \quad (19)$$

where:
  $f_2$ is a composite focal length of the second lens group, and
  $f_3$ is a composite focal length of the third lens group.

18. The zoom lens according to claim 1, wherein said third lens group satisfies the following condition:

$$0.26 < \Delta_{t3g}/f_t < 0.37 \quad (20)$$

where:
  $\Delta_{t3g}$ is an amount of movement of the third lens group from the wide-angle end to the telephoto end with the proviso that an amount of movement in an object direction is taken as positive, and
  $f_t$ is a focal length of a zoom lens system at the telephoto end.

19. The zoom lens according to claim 1, wherein said third lens group satisfies the following condition:

$$2.8 < \Delta_{t3g}/f_w < 3.21 \quad (21)$$

where:
  $\Delta_{t3g}$ is an amount of movement of the third lens group from the wide-angle end to the telephoto end with the proviso that an amount of movement in an object direction is taken as positive, and
  $f_w$ is a focal length of a zoom lens system at the wide-angle end.

20. The zoom lens according to claim 1, wherein said third lens group satisfies the following condition:

$$2.64 < (\beta_{3t}/\beta_{3w}) < 3.26 \quad (22).$$

21. The zoom lens according to claim 1, which further satisfies the following condition:

$$-0.17 < (\beta_{2t}/\beta_{2w})/(\beta_{3t}/\beta_{3w}) < 1.16 \quad (23).$$

22. The zoom lens according to claim 1, wherein said first lens group satisfies the following condition:

$$0 < \Sigma d_{1g}/L_t < 0.09 \quad (24)$$

where:
$\Sigma d_{1g}$ is an axial thickness of the first lens group from a lens surface nearest to an object side thereof to a lens surface nearest to an image side thereof, and
$L_t$ is a length of a zoom lens system from an entrance surface thereof to an image plane at the telephoto end.

23. The zoom lens according to claim 1, wherein said first lens group satisfies the following condition:

$$0 < \Sigma d_{1g}/f_t < 0.11 \quad (25)$$

where:
$\Sigma d_{1g}$ is an axial thickness of the first lens group from a lens surface nearest to an object side thereof to a lens surface nearest to an image side thereof, and
$f_t$ is a focal length of a zoom lens system at the telephoto end.

24. The zoom lens according to claim 1, which further comprises an aperture stop having an aperture diameter that is larger at the telephoto end than at the wide-angle end.

25. The zoom lens according to claim 1, which further satisfies the following condition:

$$7 < f_t/f_w < 15 \quad (26)$$

where:
$f_t$ is a focal length of a zoom lens system at the telephoto end, and
$f_w$ is a focal length of the zoom lens system at the wide-angle end.

26. The zoom lens according to claim 1, which further satisfies the following condition:

$$-21 < dt_{0.5dw} < -10.1 \quad (27)$$

where $dt_{0.5dw}$ is distortion in % of a maximum image height at the wide-angle end.

27. An electronic imaging system, comprising a zoom lens as recited in claim 1 and an electronic image pickup device located on an image side thereof.

* * * * *